United States Patent
Ohlen et al.

(10) Patent No.: US 12,540,953 B2
(45) Date of Patent: Feb. 3, 2026

(54) MEASUREMENT APPLICATION DEVICE, POSTPROCESSING DEVICE, METHOD AND NON-TRANSITORY COMPUTER-READABLE MEDIUM

(71) Applicant: ROHDE & SCHWARZ GMBH & CO. KG, Munich (DE)

(72) Inventors: Volker Ohlen, Pliening (DE); Stefan Diebenbusch, Fürstenfeldbruck (DE); Philip Diegmann, Munich (DE); Moritz Pfefferkorn, Munich (DE); Philipp Schreiber, Chemnitz (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 801 days.

(21) Appl. No.: 17/935,301

(22) Filed: Sep. 26, 2022

(65) Prior Publication Data
US 2024/0103043 A1    Mar. 28, 2024

(51) Int. Cl.
*G01R 13/02* (2006.01)
*G01R 13/00* (2006.01)
*G01R 13/34* (2006.01)

(52) U.S. Cl.
CPC .......... *G01R 13/0218* (2013.01); *G01R 13/00* (2013.01); *G01R 13/0272* (2013.01); *G01R 13/029* (2013.01); *G01R 13/345* (2013.01)

(58) Field of Classification Search
CPC .............. G01R 13/0218; G01R 13/029; G01R 13/0272; G01R 13/00; G01R 13/345
See application file for complete search history.

(56) References Cited

U.S. PATENT DOCUMENTS

| | | | |
|---|---|---|---|
| 6,693,576 B2 | 2/2004 | Azinger | |
| 2002/0147554 A1* | 10/2002 | Pickerd | G01R 13/345 702/66 |
| 2003/0095099 A1 | 5/2003 | Azinger | |
| 2010/0141657 A1 | 6/2010 | Gamper et al. | |
| 2019/0212369 A1 | 7/2019 | Wagner et al. | |

FOREIGN PATENT DOCUMENTS

| | | |
|---|---|---|
| DE | 102007053401 A1 | 5/2009 |
| EP | 3460490 B1 | 9/2022 |

* cited by examiner

*Primary Examiner* — Joseph J Lauture
(74) *Attorney, Agent, or Firm* — BROOKS KUSHMAN P.C.

(57) ABSTRACT

The present disclosure provides a measurement application device comprising at least one signal acquisition interface configured to acquire an analog input signal and output a digital input signal, a first decimator for each signal acquisition interface, each one of the first decimators being configured to reduce the number of samples of the respective digital input signal and output a first decimated digital input signal, at least one second decimator for each signal acquisition interface, each one of the second decimators being configured to reduce the number of samples of the respective digital input signal and output a second decimated digital input signal, and at least one decoder for each one of the second decimators, each one of the decoders being configured to decode the respective second decimated digital input signal according to a respective protocol and provide a respective decoded input signal.

55 Claims, 26 Drawing Sheets

MEASUREMENT APPLICATION DEVICE, POSTPROCESSING DEVICE, METHOD AND NON-TRANSITORY COMPUTER-READABLE MEDIUM

TECHNICAL FIELD

The disclosure relates to a measurement application device. Further, the present disclosure relates to a postprocessing device, method and non-transitory computer-readable medium.

BACKGROUND

Although applicable to any type of measurement application device, the present disclosure will mainly be described in conjunction with oscilloscopes.

When developing electronic circuits, a user usually needs to analyze and debug the electronic circuits. To this end, a user may, for example, use an oscilloscope to acquire waveforms of analog signals in the electronic circuits. In addition, in modern electronic circuits digital bus systems may be used to transmit data. Users may, therefore, analyze data in the digital bus systems with respective bus analyzers.

However, analyzing the analog signals and the data in digital bus systems separately only provides limited insights to the user about the respective electronic circuit.

Accordingly, there is a need for an improved data analysis.

SUMMARY

The above stated problem is solved by the features of the independent claims. It is understood, that independent claims of a claim category may be formed in analogy to the dependent claims of another claim category.

Accordingly, it is provided:

A measurement application device comprising at least one signal acquisition interface configured to acquire an analog input signal and output a digital input signal, a first decimator for each signal acquisition interface, each one of the first decimators being coupled to the respective one of the signal acquisition interfaces, each one of the first decimators being configured to reduce the number of samples of the respective digital input signal and output a first decimated digital input signal, at least one second decimator for each signal acquisition interface, each one of the second decimators being coupled to the respective one of the signal acquisition interfaces, each one of the second decimators being configured to reduce the number of samples of the respective digital input signal and output a second decimated digital input signal, and at least one decoder for each one of the second decimators, each one of the decoders being coupled to the respective one of the second decimators, and each one of the decoders being configured to decode the respective second decimated digital input signal according to a respective protocol and provide a respective decoded input signal.

Further, it is provided:

A postprocessing device for processing at least one digital input signal acquired in a digital communication system, the postprocessing device comprising a first decimator for each digital input signal, each one of the first decimators being configured to reduce the number of samples of the respective digital input signal and output a first decimated digital input signal, at least one second decimator for each digital input signal, each one of the second decimators being configured to reduce the number of samples of the respective digital input signal and output a second decimated digital input signal, and at least one decoder for each one of the second decimators, each one of the decoders being coupled to the respective one of the second decimators, and each one of the decoders being configured to decode the respective second decimated digital input signal according to a respective protocol and provide a respective decoded input signal.

Further, it is provided:

A method for processing at least one digital input signal acquired in a digital communication system, the method comprising reducing the number of samples of the at least one digital input signal and outputting a respective first decimated digital input signal for each digital input signal, reducing the number of samples of the at least one digital input signal and outputting a respective second decimated digital input signal for each digital input signal, decoding each one of the second decimated digital input signals according to a respective protocol, and providing a respective decoded input signal for each one of the second decimated digital input signals.

Further, it is provided:

A non-transitory computer-readable medium comprising instructions that when executed by a processor cause the processor to reduce the number of samples of the at least one digital input signal and output a respective first decimated digital input signal for each digital input signal, reduce the number of samples of the at least one digital input signal and output a respective second decimated digital input signal for each digital input signal, decode each one of the second decimated digital input signals according to a respective protocol, and provide a respective decoded input signal for each one of the second decimated digital input signals.

The present disclosure is based on the finding, that separately analyzing analog signals and digital signals in an application only provides limited insights. This is especially true, if the analog signals are acquired from a digital bus in the application but are then decoded and only used as digital data for further analysis.

The present disclosure, therefore, provides the measurement application device that allows acquiring an analog input signal e.g., from a digital bus system.

Instead of providing the decoded signal only, the measurement application device will, however, provide the analog signal in form of the digital input signal acquired by the signal acquisition interface, or especially, in the form of the time discrete and value discrete first decimated digital input signal provided by the first decimator.

At the same time, the measurement application device will further provide the decoded data that is transmitted in the digital bus system. To this end, the measurement application device comprises a second decimator for each one of the signal acquisition interfaces that provides a respective second decimated digital input signal.

The second decimated digital input signals are each provided to at least one decoder that decodes the respective second decimated digital input signal according to a respective protocol and provides a respective decoded input signal.

The measurement application device, therefore, provides the digital input signal, or the first decimated digital input signal, that allow a user to analyze the waveform of the analog input signal, and the decoded input signals, that allow the user to analyze the content of the data that is transmitted e.g., on a digital bus system, in parallel with the analog waveform.

The signal acquisition interface may be implemented as the frontend or signal acquisition circuitry of the measurement application device. A signal acquisition interface, frontend or signal acquisition circuitry may be part of a signal acquisition channel of the measurement application device. It is understood, that the measurement application device may comprise any number of signal acquisition channels. Consequently, a signal acquisition interface may be provided for each one of the signal acquisition channels of such a device.

The measurement application device may comprise any device that may be used in a measurement application to acquire the analog input signal. Such a measurement application device may comprise, for example, a signal acquisition device, an oscilloscope, especially a digital oscilloscope, or a vector network analyzer. Of course, a measurement application device may also comprise additional functionality, like a signal generation functionality, as will be explained in more detail below.

In embodiments, the measurement application device may also comprise pure data acquisition devices that are capable of acquiring the analog input signal and provide the acquired analog input signal as digital input signal to a respective data storage or application server. Such pure data acquisition devices not necessarily comprise a user interface or display. Instead, such pure data acquisition devices may be controlled remotely e.g., via a respective data interface, like a network interface or a USB interface.

The first decimators and the second decimators are provided downstream of the respective signal acquisition interfaces and process the digital input signal that is provided by the respective signal acquisition interface.

A decimator is to be understood as an element that reduces the total number of samples. A decimator may for example reduce the total number of samples by saving one data point for every x data points in the digital input signal, wherein the term 1/x may also be referred to as the decimation factor. The decimation factor in measurement devices, like oscilloscopes, usually comprises the ratio between the sample rate of the signal acquisition interface and the configured sample rate that a user configured in the measurement device.

In the measurement application device according to the present disclosure, two different types of decimators, the first decimators and the second decimators are provided. The first decimators serve the same purpose as decimators in traditional measurement devices and, especially, reduce the sample rate of the digital input signal to a sample rate configured by the user.

The second decimators, in contrast, reduce the digital input signal with a predetermined sample rate to a second decimated digital input signal with a sample rate that may then be processed by the respective at least one decoder that is provided for each one of the second decimators.

In the measurement application device, a first decimator is provided for each one of the signal acquisition interfaces. In addition, one or more second decimators are provided for each one of the signal acquisition interfaces. Each one of the second decimators is coupled to one or more decoders. In a simple embodiment, the measurement application device may, consequently, comprise only a single channel data acquisition interface with one first decimator and one second decimator with a respective single decoder.

In other embodiments, any number of data acquisition channels e.g., 2, 4, 8 or 16 data acquisition channels, may be provided in the measurement application device. Such a measurement application device will comprise one signal acquisition interface per channel and one first decimator for each signal acquisition interface. The measurement application device will also comprise at least one decimator for each one of the signal acquisition interfaces, and at least one decoder coupled to each one of the decimators. Such a measurement application device allows decoding multiple signal lines of e.g., a digital data bus, at the same time.

The method according to present disclosure may be performed on any adequate measurement application device, or on any adequate post processing device, wherein the postprocessing device may be formed according to any of the embodiments of the measurement application device, but may lack any signal acquisition interface. Such a postprocessing device may perform all analysis functions as disclosed for the measurement application device, but instead of acquiring the analog input signal, may operate on a stored digital input signal, a stored first decimated digital input signal, any stored second decimated digital input signal, or any stored decoded input signal.

To this end, the measurement application device may comprise a processor that may read computer readable instructions that when executed by the processor cause the processor to control the measurement application device to perform at least part of the method.

The processor may be provided as at least one of a dedicated processing element, like e.g., a processing unit, a microcontroller, a field programmable gate array, FPGA, a complex programmable logic device, CPLD, or the like. The processor may at least in part also be provided as a computer program product comprising computer readable instructions that may be executed by a processing element. In a further embodiment, the processor may be provided as addition or additional function or method to the firmware or operating system of a processing element that is already present in the respective application as respective computer readable instructions. Such computer readable instructions may be stored in a memory that is coupled to or integrated into the processing element. The processing element may load the computer readable instructions from the memory and execute them.

In addition, it is understood, that any required supporting or additional hardware may be provided like e.g., a power supply circuitry and clock generation circuitry.

In other embodiments, the method may be performed remotely from the measurement device that acquires the analog input signals. In such an embodiment, the method may, for example, be performed on a remote server. Such a server may be a dedicated server that may be implemented as a single hardware device. The server may also be implemented as a distributed system comprising a plurality of servers, optionally with a load balancer, that distributes the load over the servers. The server may also be provided as a so-called cloud or cloud-server system that implements the management server via virtualization methods independently of the underlying hardware.

The server may provide a respective interface or API for the device that acquires the analog signals to upload at least one of the respective digital input signals, the respective decimated digital input signals, and the decoded input signals.

With the measurement application device according to the present disclosure, it is possible to analyze the waveform and the decoded signal in a digital application or device under test concurrently. The at least two different decimated signals per channel may be provided independently of the acquisition sample rate of the signal acquisition interface. This is in contrast to, for example, bus analyzers that usually only acquire the input signal with a sample rate sufficient for decoding the input signal, but not for analyzing the waveform in detail.

The user of the measurement application device may, therefore, analyze digital signals in depth easily, and may to this end analyze the waveform as well as the decoded data at the same time.

Of course, the user may also use the postprocessing device according to the present disclosure or the method according to the present disclosure on a respective server or cloud service, and analyze at least one of stored digital input signals, first decimated input signals, second decimated input signal, and decoded input signals.

It is understood, that in the postprocessing device, the single elements, devices, units or functions may be implemented at least in part as computer readable instructions that may be executed by a processor or processing element. Such a postprocessing device may be implemented, for example, as an application that may be executed on a computer, as a server application on a server, or as a cloud application hosted on a cloud service.

It is understood, that the postprocessing device, the method, and the non-transitory computer-readable medium may each be embodied according to any of the embodiments disclosed for the measurement application device, but without the signal acquisition interface. The postprocessing device may comprise the same elements, components, or units as the measurement application device comprises in the respective embodiment, but without the signal acquisition interface.

The method, in such embodiments, comprises the steps as disclosed for the respective elements, components, or units of the measurement application device. The method may in embodiments also comprise a step of acquiring the at least one analog input signal, especially in a digital communication system or bus.

The non-transitory computer-readable medium may in embodiments comprise instructions that cause a processor to perform the steps as disclosed for the respective elements, components, or units of the measurement application device. The non-transitory computer-readable medium may in embodiments also comprise instructions that cause the processor to perform the acquisition of the at least one analog input signal, especially in a digital communication system or bus, at least in part. It is understood, that if it is stated that the processor is caused to perform something, the processor may also be caused to control any other element to perform the respective function.

Further embodiments of the present disclosure are subject of the further dependent claims and of the following description, referring to the drawings.

In the following, the dependent claims referring directly or indirectly to claim 1 are described in more detail. For the avoidance of doubt, the features of the dependent claims relating to the measurement application device can be combined in all variations with each other and the disclosure of the description is not limited to the claim dependencies as specified in the claim set. The features provided in the dependent claims referring to the measurement application device may also be implemented in the postprocessing device, the method, and the non-transitory computer-readable medium where adequate.

In an embodiment, which can be combined with all other embodiments of the measurement application device mentioned above or below, each one of the first decimators may operate on a first decimation factor, and each one of the second decimators may operate on a second decimation factor, wherein the second decimation factor is higher than the first decimation factor, especially two times higher, three times higher, five times higher, eight times higher, or ten times higher.

As explained above, the first decimators and the signal chain following the first decimator serve to process the waveform of the acquired analog input signal. Of course, analyzing the waveform requires providing the data that represents the waveform i.e., the first decimated digital input signal, with an adequate, high sample rate.

The second decimators and the following signal chain, as also explained above, serve to decode and process the data that is transported in the analog input signal e.g., via a digital bus system. In order to decoded an analog waveform that carries digital data in a digital system, a respectively lower sample rate than for analyzing an analog waveform in detail is sufficient.

Consequently, the decimation factor used by the second decimators is higher than the decimation factor used by the first decimators.

It is understood, that all first decimators may use the same first decimation factor, and that all second decimators may use the same second decimation factor. However, as alternative, different first decimators may at least in part use different first decimation factors, and different second decimators may at least in part use different second decimation factors.

If the same first decimation factor is used by all first decimators, and the same second decimation factor is used by all second decimators, the sample rate of all first decimated digital input signals and all second decimated digital input signals will be the same. This may simplify further processing. However, the size of the storage required to store the first decimated digital input signals and the second decimated digital input signals may increase.

In some applications, it may be sufficient to only acquire one analog input signal with the highest sample rate and process the resulting digital input signal with a high sample rate. Other channels may acquire analog input signals that do not require further processing with such a high sample rate. Such digital input signals may, therefore, be processed with a lower sample rate by applying a higher decimation factor. The required memory amount for storing the resulting first decimated digital input signals, second decimated digital input signals, and decoded input signals may, therefore, be optimized by applying different decimation factors.

It is understood, that applying a first decimation factor and a different second decimation factor to the same digital input signal will of course result in a first decimated digital input signal that has a different, especially higher, sample rate than the respective second decimated digital input signal.

In another embodiment, which can be combined with all other embodiments of the measurement application device mentioned above or below, the measurement application device may further comprise for at least one of the first decimators a first data memory that is configured to store the respective first decimated digital input signal.

The first data memory may be provided as a dedicated physical memory element for each one of the first decimators. As alternative, a common physical memory element may be provided that implements the first data memory for multiple or all of the first decimators. The single first data memories may, for example, be implemented as different sectors, arrays or variables in such a common physical memory element.

The first data memory may comprise any type of memory unit or memory device, like for example a RAM, ROM, E(E)PROM, a hard disk, an SSD disk or the like. The first data memory may also be provided as part of a memory that is already present in the respective application i.e., in the measurement application device. The first data memory may, for example, be provided as a variable or an array of variables that is stored in a memory of the measurement application device.

Each one of the first decimators with the respective first data memory may be seen as a signal analysis branch or at least as the first elements of such a signal analysis branch.

In a further embodiment, which can be combined with all other embodiments of the measurement application device mentioned above or below, the first data memory may comprise an acquisition memory of the measurement application device.

In measurement application devices, like oscilloscopes, the acquisition memory is a special kind of memory that is provided early in the digital section of the signal processing chain, and that serves for high-speed short time storage of the acquired data.

In embodiments, the acquisition memory may be provided as a kind of ring-buffer that permanently stores samples that are received by the acquisition memory from the first decimator. A respective trigger system may control the acquisition memory to stop storing and, therefore, overwriting samples in the ring-buffer, when a respectively configured event is detected by the trigger system in the acquired signal, as will be explained in more detail below. Of course, the content of the acquisition memory may be read-out for further processing.

In another further embodiment, which can be combined with all other embodiments of the measurement application device mentioned above or below, the measurement application device may further comprise for at least one of the decoders a second data memory that is configured to store the respective decoded input signal.

The second data memory may be provided as a dedicated memory element for each one of the decoders. As alternative, a common physical memory element may be provided for multiple or all of the decoders.

The second data memory may comprise any type of memory unit or memory device, like for example a RAM, ROM, E(E)PROM, a hard disk, an SSD disk or the like. The second data memory may also be provided as part of a memory that is already present in the respective application i.e., in the measurement application device. The second data memory may, for example, be provided as a variable or an array of variables that is stored in a memory of the measurement application device.

The analysis of the decoded digital data may be seen as a kind of event analysis, an event being specific data being present. Each one of the decoders with the respective second data memory may, therefore, be seen as an event analysis branch or at least as the first elements of such an event analysis branch.

In an embodiment, which can be combined with all other embodiments of the measurement application device mentioned above or below, the second data memory may comprise a remote memory that is coupled to the respective decoders via a data network.

The decoded input signal will usually comprise a lower data rate than the first decimated digital input signal, and will, consequently, be smaller in size than the first decimated digital input signal. The decoded input signal may, therefore, in embodiments be provided to e.g., streamed to, a remote memory. Such a memory may, for example, be provided as network attached storage or as data server or cloud service with a respective API.

Of course, the remote memory may be coupled to the measurement application device via a dedicated communication interface or any adequate communication interface that is present in the measurement application device.

In another further embodiment, which can be combined with all other embodiments of the measurement application device mentioned above or below, the second data memory may comprise a first memory section and a second memory section, wherein the second data memory may configured to alternatively store the respective decoded input signal in the first memory section and the second memory section, and output the respective decoded input signal from the memory section that is currently not written to during a read access to the second data memory.

The second data memory may, for example, comprise a control unit and a switching device, wherein the switching device may controllably couple a data input of the second data memory with either the first memory section or the second memory section, when the decoded input signal is written to the second data memory.

At the same time, the control unit may direct a read access that may be performed from other elements in the measurement application device to the second data memory to the memory section that is currently not written to.

With such a second data memory the digital data may be decoded from the respective second decimated digital input signal continuously without interruption. Since, even if the first memory section or the second memory section is full and need to be read out for further processing, the other memory section may be used to continue writing the second decimated digital input signal into the second data memory.

In another further embodiment, which can be combined with all other embodiments of the measurement application device mentioned above or below, the measurement application device may further comprise a first trigger signal generator for at least one of the decoders, wherein the first trigger signal generator may be coupled to the respective decoder for receiving the respective decoded input signal, and to the second data memory for controlling data storage in the second data memory.

In embodiments, the second data memory may comprise a ring-buffer-like memory similar to the first data memory as explained above. In such embodiments, the content of the second data memory is regularly overwritten by newly acquired decoded input signal data.

The first trigger signal generator may be seen as a control element that generates a control signal for the second data memory. The control signal may control the second data memory to continuously store new arriving decoded input signal data or to keep the currently stored data.

The first trigger signal generator may, for example, be configurable to identify specific patterns or specific data in the decoded input signal and may control the second data memory to stop storing new decoded input signal data after the specific patterns or data is identified. The first trigger signal generator may also control the second data memory to store a specific amount of decoded input signal data after the specific pattern or data is identified.

To this end, the first trigger signal generator may comprise a digital data input that may be coupled to the output of the respective decoder. In the first trigger signal generator, a processing element or processor may analyze the received decoded input signal and may generate a respective trigger signal on an output interface that may be coupled to the second data memory.

The processing element or processor may be provided as a dedicated processing element e.g., a processing unit, a microcontroller, a field programmable gate array, FPGA, a complex programmable logic device, CPLD, or the like. The processing element or processor may at least in part also be provided as a computer program product comprising computer readable instructions that may be executed by a processing element. In addition, it is understood, that any required supporting or additional hardware may be provided like e.g., a power supply circuitry and clock generation circuitry.

Of course, the processing element or processor may be configurable regarding the pattern or data that is to be identified in order to provide a trigger signal. A control interface may be provided in the first trigger signal generator for receiving respective control data or configuration data.

In an embodiment, which can be combined with all other embodiments of the measurement application device mentioned above or below, the measurement application device may comprise one of at least two first trigger signal generators coupled to the same one of the decoders, or at least two decoders coupled to the same one of the second decimators, and a first trigger signal generator for each one of the at least two decoders.

In analysis or measurement applications, it may be required to trigger on different conditions but on the same decoded input signal. The measurement application device may, therefore, be provided with the ability to generate multiple trigger events based on the same decoded input signal.

In an embodiment, two or more first trigger signal generators may be coupled to a single one of the decoders. The first trigger signal generators will receive the same decoded input signal but may be configured differently. Different trigger signals or trigger signals for different specific patterns or conditions may, therefore, be generated with the first trigger signal generators. Of course, multiple of the decoders may be provided with more than one first trigger signal generator.

In another embodiment, at least two decoders may be coupled to a single one of the second decimators, and a dedicated first trigger signal generator may be coupled to each one of these decoders.

This arrangement provides more flexibility, since the decoders may be provided with different configurations or, for example, clock signals. At the same time, different trigger events may be created based on the same acquired analog input signal or digital input signal.

In a further embodiment, which can be combined with all other embodiments of the measurement application device mentioned above or below, the measurement application device may further comprise a first trigger controller that may be coupled to an output of each one of the first trigger signal generators that are coupled to the same one of the decoders or to the at least two decoders that are coupled to the same one of the second decimators, and that is configured to generate a combined channel trigger signal.

The first trigger controller may be seen as a trigger management device that receives different trigger signals in the same signal processing channel of the measurement application device, and provides a combined channel trigger signal for the second data memory of that signal processing channel. The first trigger controller may, to this end, receive via respective signal inputs the output signals from the first trigger signal generators in the respective signal processing channel. These are in each case the first trigger signal generators that are coupled to the same decoder or that are coupled to decoders that are coupled to the same second decimator.

The first trigger controller may then perform specific calculations on the received trigger signals to generate the combined channel trigger signal, which may then be provided to the respective first data memory.

In another further embodiment, which can be combined with all other embodiments of the measurement application device mentioned above or below, the first trigger controller may comprise a first trigger logic circuitry that receives input trigger signals, and applies at least one of an OR function, an AND function, an IF function, a state machine, and a timer to the received input trigger signals to generate a combined trigger signal.

The first trigger logic circuitry may implement the respective functions at least in part as hardware, for example, using OR gates, AND gates and other circuitry. The if function, the state machine, and the timer may, for example, be implemented in an ASIC or an FPGA.

Of course, the first trigger logic circuitry may be configurable to configure the logic function(s) used to combine the input trigger signals from the first trigger signal generator(s) and the second trigger signal generator(s) into the combined trigger signal.

In an embodiment, which can be combined with all other embodiments of the measurement application device mentioned above or below, the measurement application device may further comprise for each one of the decoders a second data memory that is configured to store the respective decoded input signal, a first trigger signal generator for at least one of the decoders that is coupled to the respective decoder for receiving the respective decoded input signal and to the second data memory for controlling data storage in the second data memory, and a second trigger signal generator for at least one of the first decimators that is coupled to the respective first decimator for receiving the respective first decimated digital input signal and to the respective first data memory for controlling data storage in the respective first data memory.

Of course, the measurement application device may not only comprise a first trigger signal generator for triggering signal storage for the decoded input signal. The measurement application device may also comprise the second trigger signal generator for triggering signal storage for the first decimated digital input signal for further processing.

In a further embodiment, which can be combined with all other embodiments of the measurement application device mentioned above or below, the measurement application device may further comprise a second trigger controller that may be coupled to an output of at least one of the first trigger signal generators and an output of at least one of the second trigger signal generators, and that is configured to generate a combined trigger signal.

The second trigger controller may be seen as a central trigger management device that receives different trigger signals and provides a combined trigger signal. The second trigger controller may, to this end, receive via respective signal inputs at least one of the output signals from at least one, multiple or all of the first trigger signal generators, the first trigger controller, and of at least one, multiple or all of the second trigger signal generators. The second trigger controller may then perform specific calculations on the received trigger signals to generate the combined trigger signal, which may then be provided to the respective first data memories and second data memories.

The second trigger controller allows triggering first decimators together with second decimators, or the respective first and second data memories in a combined and controlled manner. It is, therefore, possible to store the waveform data in the first decimated digital input signal when a respective event is detected in the corresponding decoded input signal, or vice versa.

Of course, the second trigger controller may also be coupled to first decimators and decoders of different channels of the measurement application device.

In another further embodiment, which can be combined with all other embodiments of the measurement application device mentioned above or below, the second trigger controller may comprise a second trigger logic circuitry that receives input trigger signals, and may apply at least one of an OR function, an AND function, an IF function, a state machine, and a timer to the received input trigger signals to generate a combined trigger signal.

The second trigger logic circuitry may implement the respective functions at least in part as hardware, for example, using OR gates, AND gates and other circuitry. The if function the state machine and the timer may, for example, be implemented in an ASIC or an FPGA.

Of course, the second trigger logic circuitry may be configurable to configure the logic function(s) used to combine the input trigger signals from the first trigger signal generator(s) and the second trigger signal generator(s) into the combined trigger signal.

In an embodiment, which can be combined with all other embodiments of the measurement application device mentioned above or below, the measurement application device may comprise at least two signal acquisition interfaces, at least one second decimator for each one of the at least two signal acquisition interfaces, and at least one decoder for each one of the second decimators.

With a measurement application device that comprises two or more signal acquisition interfaces with respective second decimators and decoders, it is possible to acquire and decode analog input signals from two or more digital communication links, for example, digital data busses, at the same time.

The signal acquisition interfaces with respective second decimators and decoders may be seen as separate event analysis branches.

In embodiments, each one of the event analysis branches may operate with the same decimation factor in the respective decimators to provide second decimated digital input signals with the same sample rate. This is especially useful, if multiple digital communication links with the same sample rate or data rate are to be analyzed.

In other embodiments, at least two of the event analysis branches may operate with different decimation factors in the respective decimators. Such an embodiment, allows analyzing digital communication links with different data rates. With such a measurement application device a user may for example analyze a USB3 data link and a UART data link at the same time.

In a further embodiment, which can be combined with all other embodiments of the measurement application device mentioned above or below, the measurement application device may further comprise one first decimator for each one of the at least two signal acquisition interfaces.

The measurement application device may comprise a first decimator and a second decimator for each one of the at least two signal acquisition interfaces. This allows analyzing the waveform and the decoded data concurrently in every channel of the measurement application device.

The measurement application device may, for example, be provided in an oscilloscope with multiple channels. Each of the channels may in this embodiment be provided with the first decimator and the second decimator and may be capable of generating the first decimated digital input signal and the decoded input signal for each one of the channels.

Such embodiments allow analyzing e.g., bus protocols that require more than a single channel. Such protocols may, for example, comprise a clock and at least one data signal that are transmitted in separate data lines. The clock line and the different data lines may be acquired with separate signal acquisition interfaces of the measurement application device for analysis by the user.

In another further embodiment, which can be combined with all other embodiments of the measurement application device mentioned above or below, the measurement application device may comprise a signal bridge that provides the second decimated digital input signal from at least one of the second decimators or the decoded input signal from the respective at least one decoder to at least one other of the decoders.

As indicated above, protocols for digital data transmission may require multiple data lines, like a clock line and at least one data line. When such a protocol is applied, the clock signal is usually required to decode the data provided via the data lines.

The signal bridge may provide a specific signal, for example, the clock signal, after it is decimated or decoded from the respective channel of the measurement application device to the other channels that require the specific signal e.g., to the decoders that require the clock signal in order to correctly decode a data signal.

In an embodiment, which can be combined with all other embodiments of the measurement application device mentioned above or below, the measurement application device may further comprise a synchronization controller configured to timely synchronize at least one of the digital input signals, the first decimated digital input signals, the second decimated digital input signals, and the decoded input signals.

The synchronization controller may comprise a timer or counter that may generate time stamps for at least one of the digital input signals, the first decimated digital input signals, the second decimated digital input signals, and the decoded input signals.

The time stamps may, for example, be provided from the synchronization controller to the signal acquisition interfaces, the first decimators, the second decimators, or the decoders for these elements to add the respective time stamp to the respective signal.

As alternative, a dedicated time stamp processor may be provided in the respective signal branch that receives the time stamp from the synchronization controller and adds the time stamp to the respective signal prior to further processing of the respective signal.

If the signals in the measurement application device are time-stamped, the user may later analyze the different signals e.g., the first decimated digital input signal and the decoded signal, in a timely synchronized manner. This allows the user, for example, to identify in the waveform represented by the first decimated digital input signal sources for data errors in the decoded input signal.

In a further embodiment, which can be combined with all other embodiments of the measurement application device mentioned above or below, the measurement application device may further comprise a second data memory that is configured to store the respective decoded input signal for at least one of the decoders, and may further comprise a third data memory that is coupled to one of the first data memories and one of the second data memories that store data that is based on the same digital input signal.

The third memory may be provided to store the first decimated digital input signal together with the decoded input signal that results from the same digital input signal i.e., is processed in the same channel of the measurement application device, for later processing. Of course, the signals stored in the third data memory may also be time stamped or synchronized. Providing the relevant signals in a combined or common memory, allows easily accessing the relevant signals later.

It is understood, that the third data memory may be provided as a long term memory. In embodiments, the first data memory and the second data memory may for example be provided as volatile memory e.g., RAM. The third data memory, in contrast, may be provided as non-volatile memory. For example, an SSD or HDD memory may be provided as third data memory in the measurement application device. The second data memory may also be provided as a remote memory that may be coupled to the measurement application device via a dedicated communication interface or any adequate communication interface that is present in the measurement application device.

In another further embodiment, which can be combined with all other embodiments of the measurement application device mentioned above or below, the measurement application device may further comprise a waveform signal generator that is configured to generate one of the first decimated digital input signals based on at least part of one of the decoded input signals.

The waveform signal generator may use the content of the decoded input signal to generate one of the first decimated digital input signals that represents a waveform.

Of course, such a first decimated digital input signal may then be stored e.g., in the respective first data memory.

The waveform signal generator may use information from the respective decoded input signal that represents a value that is to serve as the basis for the first decimated digital input signal.

In an exemplary embodiment, the decoded input signal may comprise a temperature value, and the waveform signal generator may generate a first decimated digital input signal that resembles a temperature waveform, wherein the values of the temperature waveform are generated based on the temperature values in the decoded input signal.

It is understood, that after writing the first decimated digital input signal into the first data memory, any of the possible following elements may act on or functions may be performed with the first decimated digital input signal, like triggering based on the generated first decimated digital input signal.

It is understood, that the generated first decimated digital input signal may be provided in addition to the first decimated digital input signal that is generated based on the same digital input signal as the decoded input signal.

The generated first decimated digital input signal may, therefore, be seen as a virtual waveform signal. Such a virtual waveform signal allows visually correlating the effects of signal interference on the content in the decoded input signal.

In an embodiment, which can be combined with all other embodiments of the measurement application device mentioned above or below, the waveform signal generator may comprise a signal modification unit configured to apply a modification function to the generated first decimated digital input signal prior to outputting the generated first decimated digital input signal.

As explained above, the generated first decimated digital input signal may be generated based on content of the decoded input signal. However, since the content of the decoded input signal is provided in digital form as discrete values, the waveform resulting from the generated first decimated digital input signal would be very clean.

In real applications, such a waveform would at least comprise a certain amount of noise or the like. The signal modification unit may be provided to add such noise and/or other effects to the generated first decimated digital input signal.

It is understood, that the signal modification unit may, for example, be provided as a hardware element, like an ASIC, CPLD or FPGA, or at least in part as a software function comprising computer readable instructions. It is further understood, that the signal modification unit may be provided in any processing element that is already present in the measurement application device, if adequate.

In a further embodiment, which can be combined with all other embodiments of the measurement application device mentioned above or below, the measurement application device may further comprise a digital output signal generator that is configured to generate a digital output signal according to a predetermined protocol.

The digital output signal generator may be used to generate a digital output signal that conforms to the predetermined protocol. Such a protocol may be the same protocol as used by the decoders to decode the second decimated digital input signal or another protocol. The digital output signal generator may provide a kind of output bus interface or output bus controller for a bus according to the respective protocol.

It is understood, that the term "digital output signal" may refer to a digital representation of the digital output signal i.e., a binary representation in a memory, as well as to the physical representation i.e., voltages or currents on a physical signal line.

With the digital output signal generator, it is possible to synthesize a respective digital data signal. The measurement application device may, therefore, be used to send test data to a device under test, while the measurement application device may also acquire the data that the device under test generates based on the data received from the measurement application device.

It is understood, that the digital output signal may also be stored in the measurement application device. The stored digital output signal may then e.g., be displayed to a user or analyzed otherwise together with the first decimated digital input signals and the decoded input signals.

It is understood, that the digital output signal generator may, for example, be provided as a hardware element, like an ASIC, CPLD or FPGA, or at least in part as a software function comprising computer readable instructions. It is further understood, that the digital output signal generator may be provided in any processing element that is already present in the measurement application device, if adequate.

In another further embodiment, which can be combined with all other embodiments of the measurement application device mentioned above or below, the digital output signal generator may be configured to generate the digital output signal based on at least one of the decoded input signals.

With the digital output signal generator, it is possible to synthesize a respective digital data signal based on one or multiple of the decoded input signals. The measurement application device may, therefore, be used as a kind of signal repeater.

The digital output signal generator may generate the digital output signal based on the same or a different protocol than used in the decoded signals. The measurement application device with the digital output signal generator may, therefore, be used as a kind of bus bridge or gateway.

In an embodiment, which can be combined with all other embodiments of the measurement application device mentioned above or below, the digital output signal generator may comprise an event analyzer configured to analyze the at least one decoded input signal for the occurrence of a specific event, and activate the signal generation by the digital output signal generator if the specific event is detected or deactivate the signal generation by the digital output signal generator if the specific event is detected.

With the event analyzer, the digital output signal generator may be used as a tester for communication devices that actively reacts to data received from the respective communication device.

Of course, a configuration may be provided that defines the events to be identified and the data that should be sent in response to detecting such an event in the decoded input signal. Such a configuration may be provided by a user, the manufacturer of the measurement application device, or the developer of a specific protocol.

Activating the signal generation after detecting the event may also not only comprise generating an output signal comprising a data stream according to the predefined protocol. The signal generation may also comprise setting output signals to a constant value, like a voltage that represents a high or low signal.

In a further embodiment, which can be combined with all other embodiments of the measurement application device mentioned above or below, the digital output signal generator may comprise an encoder for encoding data according to the predetermined protocol and a waveform generator configured to generate the digital output signal based on the encoded data.

The encoder and the waveform generator may be seen as a kind of driver or bus controller for the respective protocol and may encode digital data into a respective signal or waveform for transmission to a communication device e.g., a device under test.

In another further embodiment, which can be combined with all other embodiments of the measurement application device mentioned above or below, the measurement application device may further comprise an error injector that is configured to introduce intentional signal deterioration in the digital output signal, wherein the signal deterioration may comprise at least one of a physical signal deterioration or a logical signal deterioration.

The error injector may be coupled to the encoder or to the waveform generator or both, and may control the encoder or the waveform generator to intentionally provide a wrong or at least deteriorated digital output signal. The error injector may be implemented similar to the signal modification unit. Therefore, the error injector may, for example, be provided as a hardware element, like an ASIC, CPLD or FPGA, or at least in part as a software function comprising computer readable instructions. It is further understood, that the error injector may be provided at least in part in any processing element that is already present in the measurement application device, if adequate.

Physical signal deteriorations in this regard may refer to the physical properties of the digital output signal e.g., the edge steepness or slope of the edges of the digital output signal, and the duration of signal levels of the digital output signal. The error injector may comprise any adequate combination of analog or digital signal processing elements, like filters, attenuators, and amplifiers. The error injector may in embodiments control the waveform generator to modify the digital output signal accordingly. In other embodiments, the error injector may operate on the output signal provided by the waveform generator.

Logical signal deteriorations in this regard may refer to the content of the data that is transported in the digital output signal. The error injector may, for example, control the encoder to provide a wrong checksum or modify other content, like status bits or the like. The error injector may also operate on the output provided by the encoder instead of controlling the encoder.

In an embodiment, which can be combined with all other embodiments of the measurement application device mentioned above or below, the measurement application device may further comprise an event-based configuration processor that is configured to analyze at least one of the decoded input signals or the first decimated digital input signal for the occurrence of a predefined event and configure the measurement application device according to a predefined configuration setting if the predefined event is detected in the respective decoded input signal.

The event-based configuration processor may operate directly on the decoded input signal as provided by the respective decoder. Alternatively, the event-based configuration processor may operate on the data stored in the respective second data memory or on the first decimated digital input signal.

The event-based configuration processor may be implemented similar to the above-mentioned signal modification unit. Therefore, the event-based configuration processor may, for example, be provided as a hardware element, like an ASIC, CPLD or FPGA, or at least in part as a software function comprising computer readable instructions. It is further understood, that the event-based configuration processor may be provided at least in part in any processing element that is already present in the measurement application device, if adequate.

The term "event" in this context may refer to specific data being provided in the respective decoded input signal or first decimated digital input signal, or to specific protocol information, like the type of protocol used to encode data in the analog input signal, checksums, status bits, and error flags, that may be present in the respective decoded input signal. It is understood, that any type of information that may be provided in the decoded input signal may be defined as a respective "event". This also applies to payload in the decoded input signal.

After detecting the predefined event in the decoded input signal, the event-based configuration processor may then perform a respective configuration in the measurement application device. Performing a configuration may refer to configuring any of the elements of the measurement application device according to a predefined configuration setting. The configuration setting may indicate the specific element of the measurement application device that is to be configured and may indicate how to configure the respective element.

The event may in an embodiment, refer to detecting a specific protocol being used to encode data in the analog input signal. The configuration may in such a case refer to configuring the decoder(s) to decode the second decimated digital input signal according to the detected protocol.

The event may for example refer to detecting a specific error rate or an error rate that is higher than a threshold value in the decoded input signal. The configuration may in such a case refer to configuring the voltage levels in the respective decoder for detecting a low or high signal.

If a protocol with a flexible data rate is used for the decoded input signal, detecting a specific error rate or an error rate that is higher than a threshold value in the decoded input signal may result in a reconfiguration of the data rate in the respective decoder.

In other embodiments, the event-based configuration processor may e.g., configure elements of the signal acquisition interface, like filters, attenuators, and amplifiers. The event-based configuration processor may, for example, set a group delay or filter frequency in a filter, an attenuation factor in an attenuator, or an amplification factor in an amplifier.

Other settings or configurations that may be performed by the event-based configuration processor may refer to the first data memory, especially the acquisition memory, and the second data memory. For example, the event-based configuration processor may detect an I2C signal in the decoded input signal. Since the I2C signal comprises a data packet every 25 μs, the event-based configuration processor may configure the first data memory and/or the second data memory to store segments with a duration of 25 μs. Generally, the segment size of the first data memory and/or the second data memory may be set.

The event-based configuration processor may in embodiments also configure the first trigger signal generator and/or the second trigger signal generator after detecting a respective event to trigger on specific data or on other parameters that may be detected in the respective signals.

Of course, multiple elements of the measurement application device may be configured concurrently by the event-based configuration processor. For example, the decoder may be configured at the same time as the signal acquisition interface.

It is understood, that the event-based configuration processor may receive a configuration via a respective configuration interface. Such a configuration may be provided or selected by a user. In embodiments, different configurations may be pre-stored in the measurement application device. The configurations may be part of specific measurement application settings and may be automatically loaded into the event-based configuration processor if the user selects the respective measurement application.

In a further embodiment, which can be combined with all other embodiments of the measurement application device mentioned above or below, the measurement application device may further comprise a data input interface configured to receive configuration data for the measurement application device and configured to configure the measurement application device according to the configuration data.

As already explained above, at least some of the elements of the measurement application device may be reconfigurable. Such elements may, for example comprise, but are not limited to the first decimator(s), the second decimator(s), the decoder(s), the first data memory, especially, the acquisition memory, the second data memory, the first trigger signal generator(s), the second trigger signal generator(s), the first trigger controller(s), the second trigger controller(s), the signal bridge(s), the synchronization controller(s), the third data memory, the waveform signal generator(s), signal modification unit(s), digital output signal generator(s), event analyzer(s), encoder(s), waveform generator(s), error injector(s), event-based configuration processor(s), or any other element of the event-based configuration processor that may be configured based on the configuration data received via the data input interface.

It is understood, that the data input interface may comprise any kind of wired and wireless communication interfaces, like for example a network communication interface, especially an Ethernet, wireless LAN or WIFI interface, a USB interface, a Bluetooth interface, an NFC interface, a visible or non-visible light based interface, especially an infrared interface.

It is further understood, that the data input interface and the source of the configuration data may communicate via an intermediary network with each other, and that such a network may comprise any type of network devices, like switches, hubs, routers, firewalls, and different types of network technologies.

It is understood, that the data input interface may comprise or may be comprised or may be coupled to a respective configuration processor that performs communication via the data input interface and configures the respective elements. Further, it is understood, that such a configuration processor may be provided as a dedicated processing element, like e.g., a processing unit, a microcontroller, a field programmable gate array, FPGA, a complex programmable logic device, CPLD, or the like. The configuration processor may at least in part also be provided as a computer program product comprising computer readable instructions that may be executed by a processing element. In a further embodiment, the configuration processor may be provided as addition or additional function or method to the firmware or operating system of a processing element that is already present in the respective application as respective computer readable instructions. Such computer readable instructions may be stored in a memory that is coupled to or integrated into the processing element. The processing element may load the computer readable instructions from the memory and execute them.

In applications, the data input interface may receive control data from an external tool, like a debugger, that is used by a user to debug a processing element in the respective application.

In another further embodiment, which can be combined with all other embodiments of the measurement application device mentioned above or below, the data input interface may be configured to receive a protocol definition and to configure at least one of the at least one second decimator and the at least one decoder according to the received bus definition.

The second decimators and the decoders are the elements of the measurement application device in the event analysis branch that are required to decode the data transmitted in the analog input signal.

Of course, the measurement application device may be used in different measurement applications that may require analyzing a digital input signal that is formed according to different protocols, like for example digital bus protocols, like the I2C bus, the SPI bus, a UART bus, just to name some possible examples.

Depending on the details of the respective protocol, it may be sufficient to only configure the respective decoder(s) or the respective second decimator(s) accordingly. Of course, it is also possible to reconfigure the respective decoder(s) and the respective second decimator(s) at the same time for a respective protocol.

With the data input interface, it is not only possible to load predefined protocol definitions into the measurement application device, which may be provided by the manufacturer of the measurement application device. With the data input interface, it is also possible for a user or a developer of a new protocol to define the respective protocol and provide the protocol definition to the measurement application device via the data input interface.

A user could, for example, write a definition of a Manchester code protocol that he uses in his application and provide the respective protocol definition to the measurement application device via the data input interface to analyze the respective application.

The data input interface in embodiments may be provided as a dedicated interface. In other embodiments the data input interface may be combined or comprised in a data interface that is present in the measurement application device. The data input interface may e.g., comprise any kind of wired and wireless communication interfaces, like for example a network communication interface, especially an Ethernet, wireless LAN or WIFI interface, a USB interface, a Bluetooth interface, an NFC interface, a visible or non-visible light based interface, especially an infrared interface.

In other embodiments, the data input interface may comprise a user interface that allows a user to select one of a plurality of pre-defined protocol definitions.

In an embodiment, which can be combined with all other embodiments of the measurement application device mentioned above or below, the measurement application device may further comprise a reconfigurable logic element that is configured to implement in a reconfigurable manner at least one of the at least one signal acquisition interface, the first decimator, the at least one second decimator, and the at least one decoder.

As already explained above, at least some of the elements of the measurement application device may be reconfigurable. Such elements may, for example comprise, but are not limited to the first decimator(s), the second decimator(s), the decoder(s), the first data memory, especially, the acquisition memory, the second data memory, the first trigger signal generator, the second trigger signal generator, the first trigger controller(s), the second trigger controller(s), the signal bridge(s), the synchronization controller(s), the third data memory, the waveform signal generator(s), signal modification unit(s), digital output signal generator(s), event analyzer(s), encoder(s), waveform generator(s), error injector(s), event-based configuration processor(s), or any other element of the event-based configuration processor. These elements may be configured based on the configuration data received via the data input interface.

In order to allow for all these elements to be reconfigured, at least some of these elements or at least some sub-components of at least some of these elements may be implemented as a reconfigurable logic element, like an FPGA or a CPLD.

The reconfigurable logic element may comprise a memory or may be coupled to a memory that stores at least one configuration or set of configuration parameters for each element that is implemented in the reconfigurable logic element in a reconfigurable fashion. The configuration data may in such an embodiment initiate the reconfigurable logic element selecting one of the respective configurations or sets of configuration data.

In addition, or as alternative, the configuration data may also comprise a new configuration or set of configuration parameters that may then be provided to the reconfigurable logic element.

In an embodiment, the configuration data may initiate or control at least one of the decoders of the measurement application device to load a specific configuration for a predetermined protocol. Such configuration data may be provided e.g., by a user via a user interface. In another embodiment, the configuration data may comprise a new configuration for one of the decoders that enables the decoder to decode a protocol that was not available for decoding prior to receiving the configuration data.

In a further embodiment, which can be combined with all other embodiments of the measurement application device mentioned above or below, the measurement application device may further comprise a data analysis processor configured to analyze at least one of the first decimated digital input signal and the decoded input signal, and output a respective analysis result.

It is understood, that the data analysis processor in any of the embodiments provided in this disclosure may also be provided as separate device and is meant to be explicitly disclosed as such a dedicated device.

The data analysis processor may be provided to further improve the analysis possibilities provided to a user by the measurement application device. Instead of only being provided with a view of the first decimated digital input signal and a view of the decoded input signal, especially in a human readable form, with the data analysis processor an automatic evaluation of the first decimated digital input signal and the decoded input signal is possible.

The data analysis processor may permanently monitor the first decimated digital input signal and the decoded input signal according to predefined parameters, and may output a respective analysis result.

The analysis result may be provided, for example, to a user. In addition, or as alternative, the analysis result may also be stored as a digital analysis result in a memory of the measurement application device or may be provided to any other element of the measurement application device.

As with other element described above, the data analysis processor may be provided as a dedicated processing element, like e.g., a processing unit, a microcontroller, a field programmable gate array, FPGA, a complex programmable logic device, CPLD, or the like. The data analysis processor may at least in part also be provided as a computer program product comprising computer readable instructions that may be executed by a processing element. In a further embodiment, the data analysis processor may be provided as addition or additional function or method to the firmware or operating system of a processing element that is already present in the respective application as respective computer readable instructions. Such computer readable instructions may be stored in a memory that is coupled to or integrated into the processing element. The processing element may load the computer readable instructions from the memory and execute them.

In an embodiment, which can be combined with all other embodiments of the measurement application device mentioned above or below, the measurement application device may further comprise a reference data memory configured to store reference bus data, wherein the data analysis processor may be configured to compare the stored reference bus data with bus data provided in the decoded input signal, and output a respective analysis result.

The reference data memory may be provided as a dedicated memory element or may be integrated in any of the other memory elements present in the measurement application device.

The term "reference bus data" in this context may refer to digital data as it may be provided in the analog input signal or to specific characteristics of single data messages that are provided in the analog input signal.

The analysis result in an embodiment may comprise the information if the reference bus data could be identified in the decoded input signal or not. Other possible types of analysis result will be described below.

In another further embodiment, which can be combined with all other embodiments of the measurement application device mentioned above or below, the data analysis processor may be configured to calculate a similarity characteristic between the stored reference bus data and the bus data provided in the decoded input signal, and output the similarity characteristic as analysis result.

The similarity characteristic may be seen as a kind of cross-correlation between the stored reference bus data and the bus data provided in the decoded signal. To determine the similarity characteristic, the data analysis processor may implement any adequate algorithm.

In embodiments, the data analysis processor may comprise a configurable mask that masks certain types of data for calculating the similarity characteristic.

For example, the data may be provided in the analog input signal according to a protocol that comprises a specific package format with preceding or header data, load data, and trailing data in every data package. The load data may, of course, change greatly from one data package to the other. However, the header data and the trailing data of each data package may be rather static or only change within certain limits. In such an embodiment, the configurable mask could be masked to mask-out the load data. The data analysis processor would then only use the header data and the trailing data for determining the similarity characteristic. Of course, other data, like changing checksums, may also be masked-out.

The calculation of the similarity characteristic may, for example, comprise counting the number of differing bits between data packets in the stored reference bus data and the bus data provided in the decoded signal without or without the mask applied.

In a further embodiment, which can be combined with all other embodiments of the measurement application device mentioned above or below, the data analysis processor may be configured to output a warning if the similarity characteristic is higher than a predetermined threshold value, or to output a warning if the similarity characteristic is lower than a predetermined threshold value.

If the similarity characteristic is too low, for example, when comparing the header data and trailing data of packets provided in the reference bus data with the header data and trailing data of packets provided in the decoded input signal, a warning may be output by the data analysis processor.

Of course, the warning may also be linked by the data analysis processor to the first decimated digital input signal and/or the decoded input signal e.g., via a time stamp.

In an embodiment, which can be combined with all other embodiments of the measurement application device mentioned above or below, the data analysis processor may be configured to filter the decoded input signal based on predefined filter criteria, and output the filtered decoded input signal as analysis result.

Filtering the decoded input signal may comprise filtering out specific data packages or sections or variables provided in the data packages from the digital data provided in the decoded input signal. The data analysis processor may, for example, filter out complete data packages based on specific filter criteria, like a message ID, a sender ID, and a receiver ID. The data analysis processor may also filter out single variables or sections in single data packages based on such filter criteria.

Just as an example, in an embodiment, the data packages provided in the decoded input signal may comprise multiple sensor values, for example, of different temperature sensors, wherein each one of the data packages is provided by a different machine that each comprise multiple temperature sensors. The data analysis processor may in an exemplary embodiment filter out the data packages from a specific one of the machines. In another embodiment, the data analysis processor may filter out only the temperature values of a specific one or a group of the temperature sensors.

The analysis result may comprise the filtered digital output signal, and may be treated by the elements of the measurement application device that follow the data analysis processor as the digital output signal. In other embodiments, the analysis result may only be used to display the filtered digital output signal to a user on a display of the measurement application device.

In another further embodiment, which can be combined with all other embodiments of the measurement application device mentioned above or below, the data analysis processor may be configured to analyze a bus health of a bus that provides the analog input signal by analyzing at least one of the first decimated digital input signal, and the decoded input signal, and output a bus health metric as analysis result.

Analyzing the bus health of a bus that provides the analog input signal may especially be used in measurement applications, where the analog input signal is acquired with the measurement application device in real time while the respective device under test is operating. In embodiments, analyzing the bus health may also be performed with a first decimated digital input signal, and a decoded input signal that is acquired and stored with a device under test, and later loaded into the measurement application device.

The data analysis processor may in embodiments analyze physical parameters in the first decimated digital input signal. Such physical parameters may, for example, comprise slopes or gradients of signal edges, signal level durations, bus idle timings, and other parameters that may be monitored in the waveform provided in the first decimated digital input signal.

In addition, or as alternative, the data analysis processor may in embodiments analyze the content of the digital data provided in the decoded input signal. Analyzing the content may refer to identifying checksum errors, ID errors or content errors in the data provided in the decoded input signal.

In embodiments, analyzing the bus health may also comprise verifying the compliance of the analog input signal that is represented by the digital output signal with the protocol that is used in the application that provides the analog input signal. In addition, or as alternative, In embodiments, analyzing the bus health may also comprise verifying the compliance of the decoded input signal with the protocol that is used in the application that provides the analog input signal.

The bus health metric may in an embodiment comprise a binary value, wherein one binary value e.g., a 1 or TRUE, may refer to the bus being free of errors, and while the other binary value e.g., a 0 or FALSE, may refer to the bus comprising errors or vice versa.

In other embodiments, the data analysis processor may comprise a counter. Such a counter may, for example, be incremented with every detected error. The bus health metric may comprise the value of the counter. Of course, the value of the counter may also be reduced every given amount of time, if no error is detected in that amount of time.

In embodiments, the data analysis processor may output a warning, if the bus health metric indicates bad bus health, with a binary bus health metric, or raises above a predetermined threshold, with a counter-based bus health metric or another kind of non-binary bus health metric.

The bus health analysis may be performed by the data analysis processor automatically whenever a first decimated digital input signal and/or a decoded input signal is available, or upon specific activation by a user.

In embodiments, the data analysis processor may identify which communication device on the bus causes the low bus health metric.

For a user, it is usually very difficult to concurrently monitor a plurality of parameters provided by the measurement application device. The bus health metric, therefore, provides the user with a supporting tool that is permanently calculated in the background. By providing an alarm, if the bus health metric indicates accordingly, the user is only directed to a bad bus health metric if problems are actually identified.

Situations indicating a bad bus health metric may be indicated to a user via a respective warning or icon on a display of the measurement application device. In addition, or as alternative, a message, especially an e-mail or messenger message, may be sent to a user or a group of users in such a situation wherein the maximum number or frequency of messages may be limited. In addition, or as alternative, such situations may be recorded in a long term memory and may, for example, be time-stamped for later relating the recorded situation to the first decimated digital input signal or the decoded input signal.

In a further embodiment, which can be combined with all other embodiments of the measurement application device mentioned above or below, the data analysis processor may be configured to analyze the content of the decoded input signal, and determine functions performed in a receiving device of the content based on the received content, and output the determined functions as analysis result.

The data or content provided in decoded input signal may serve to simply transmit information, like sensor values. In other situations, the data or content provided in the decoded input signal may serve to configure a receiving device that receives the content.

For example, internal registers of the receiving device may be set or programmed by respective content in the decoded input signal. To this end, specific data or content formats may be defined. For example, a preamble in the content may instruct the receiving device to handle the following data as configuration data. In the configuration data an address or number of such an internal register may be provided together with the data that is to be written into that internal register. Of course, instead of internal registers any other destination may be present in the receiving device.

Such registers or other destinations may, in some examples, serve to configure the communication interface of the receiving device, or other functionality of the receiving device. If the receiving device is a sensor, the sensor may e.g., comprise registers that allow configuring a measurement range, an output unit e.g., degree or radians, or Fahrenheit or Celsius. If the receiving device is an interfacing unit, like a serial to parallel converter configuration options may refer to activating pull-up or pull-down resistors on the parallel port pins, an output voltage at the parallel port pins, or any parameter of the communication interface.

When determining the functions that are performed in the receiving device, the data analysis processor may e.g., indicate which internal register or destination of the receiving device is programmed with which data. The data analysis processor may also determine, which commands are sent to the receiving device.

In an embodiment, which can be combined with all other embodiments of the measurement application device mentioned above or below, the data analysis processor may comprise a device description comprising information about specific content and the functions performed by the receiving device based on the received content.

The device description may in embodiments comprise a command table comprising the commands that the receiving device may react to. The device description may in addition, or as alternative comprise a destination map or register map for the receiving device that indicates possible addresses of destinations or registers for the content in the receiving device.

With this information, the data analysis processor may easily determine which commands serve to set specific parameters in the receiving device and what content is written to the receiving device with a specific content provided in the decoded input signal.

In embodiments, the device description may also comprise a human readable description of the destinations or registers of the receiving device, and the parameters that may be set by writing data to the respective destinations or registers. The data analysis processor may in such an embodiment output the human readable information together with the identified commands and data in the analysis result.

It is understood, that the device description may be pre-stored in the measurement application device. Of course, it is also understood, that a user may provide user-generated device descriptions to the measurement application device. To this end, a user interface of the measurement application device may be used. The device descriptions may also be provided via an external device database and via a respective communication interface of the measurement application device.

In another further embodiment, which can be combined with all other embodiments of the measurement application device mentioned above or below, the data analysis processor may be coupled to a device description database and may be configured to retrieve a respective device description via the device database.

The measurement application device may be coupled to the device description database that comprises a plurality of device descriptions via any communication interface that may already be present in the measurement application device, or may comprise a dedicated communication interface. A user may then load the required device description into the measurement application device on demand.

In addition, or as alternative, the data analysis processor may identify a receiving device e.g., based in IDs or other identification data provided by the receiving device, and automatically retrieve the respective device description from the device description database.

In a further embodiment, which can be combined with all other embodiments of the measurement application device mentioned above or below, the data analysis processor may be configured to analyze bus member characteristics of at least one bus member that provides the analog input signal by analyzing at least one of the first decimated digital input signal, and the decoded input signal, and output a bus member characteristic data as analysis result.

The measurement application device may be coupled to a bus that has one or more bus members e.g., communication devices, to analyze different characteristics of the respective bus members. The term "bus member" in this regard may refer to any type of device that communicates on the bus. The measurement application device in such an embodiment may be coupled to the bus lines of the bus, and not necessarily needs to be coupled to one of the bus members.

As already indicated above, in a communication bus, each bus member may comprise specific IDs, preambles in the data frames, or other kinds of addresses or identification details. The data analysis processor may, therefore, identify single bus members based on the respective identification data, and analyze bus member characteristics for the single bus members. If all bus members are monitored by the data analysis processor, a full communication bus monitoring may be implemented.

The characteristics that the data analysis processor may determine for the single bus members may refer to conformance to the protocol definition of the communication protocol used on the communication bus, especially to timing constraints of the communication protocol, to status signaling requirements, error signaling requirements, and data integrity requirements defined by the communication protocol.

Timing constraints may, for example, refer to timing regarding the waveform represented by the first decimated digital input signal, for example skew, slope, and setup and hold timing of waveforms representing digital data. The timing constraints may also refer to digital data in the decoded input signal being required to be sent at specific points in time.

Status signaling requirements may refer to status bits that the bus members are required to provide in the data packages transmitted over the communication bus. Error signaling requirements may refer to specific reactions to bus errors or internal errors that the bus members are required to initiate. Data integrity requirements may refer to checksums and other data that serves to protect data integrity and needs to be sent by the bus members in the data packets.

The data analysis processor may in embodiments collect data about the conformance of the single bus members to the respective communication protocol. In regards to timing constraints, the data analysis processor may for example compile statistical data about the deviation from the required timings for the single bus members. Regarding other data, like the status signaling requirements, error signaling requirements, and data integrity requirements, the data analysis processor may implement a counter that counts the number or frequency of non-conformance of a bus members with the respective requirements.

In addition, or as alternative, the data analysis processor may implement or comprise or be coupled to a machine-learning based bus member analyzer. Such a machine-learning based bus member analyzer may comprise a pretrained machine-learning algorithm or system that is trained with the data of bus members that are qualified as fully operational and error free. The machine-learning based bus member analyzer may continuously be provided with data about the bus members to assess or characterize their state or conformance to the communication protocol. The data provided to the machine-learning based bus member analyzer may comprise the first decimated digital input signal or the decoded input signal, or pre-processed data, like the above-mentioned timing details or information about conformance to status signaling requirements, error signaling requirements, and data integrity requirements of the communication protocol.

In an embodiment, which can be combined with all other embodiments of the measurement application device mentioned above or below, the data analysis processor may be configured to analyze a bus member state of at least one bus member that communicates over a bus that provides the analog input signal by analyzing the decoded input signal, and output a bus member state information as analysis result.

The term "bus member state" in this context may refer to the specific configuration of the respective bus member as it may be configured by messages or the content of the data transmitted to the or from the respective bus member. For example, a bus member may be a temperature sensor, and may be configured via respective bus messages to output a temperature in degree Celsius or in degree Fahrenheit. In another example, a 1000 Base T1 controller may comprise states like idle, sleep, training, negotiating, and the like.

The data analysis processor may comprise a description of the possible states of respective bus members, and the conditions required for the respective bus members to enter a state or transition into another state. Such a description may be provided in a form that may be similar to a state machine with the states and the transition conditions. The data analysis processor may then monitor the data provided in the decoded input signal and compare the data with the transition conditions provided in the description to identify the state of the respective bus member.

In embodiments, the data analysis processor may identify different bus members automatically based on the data provided in the decoded input signal. In other embodiments, a user may provide the information about all present bus members or about which bus members to monitor.

The states of the respective bus members may be documented, for example, in tabular form in a file and/or on a display of the measurement application device, especially together with time stamps. In addition, or as alternative a user may manually select a bus member, for example, on a display of the measurement application device, and the current state of the respective bus member may be shown to the user.

In another further embodiment, which can be combined with all other embodiments of the measurement application device mentioned above or below, the data analysis processor may be configured to analyze time-based relations between the first decimated digital input signal and the respective decoded input signal, and output information about the time-based relations as analysis result.

Specific data in the decoded input signal may lead to specific signal waveforms in the first decimated digital input signal being required or adequate. Therefore, in reaction to specific events in the decoded input signal, the data analysis processor may analyze specific time-based relations between the decoded input signal and the first decimated digital input signal. Specific data in the first decimated digital input signal may also lead to specific content in the decoded input signal being required or adequate. Therefore, in reaction to specific events in first decimated digital input signal, the data analysis processor may analyze specific time-based relations between the first decimated digital input signal and the decoded input signal.

The term "time-based relations" in this regard may refer to any relation to the first decimated digital input signal that may be implied by a specific decoded input signal or vice versa. Such a time-based relation may, for example, define setup and hold times that are required for the waveforms in the first decimated digital input signal, skew, clock signals, and maximum minimum durations between data packets or events.

For example, the occurrence of a raising edge in the first decimated digital input signal after a specific silent time in the first decimated digital input signal may require a specific package preamble to be transmitted in the decoded input signal. Or a specific suffix of a data package in the decoded input signal may require a specific silent time in the first decimated digital input signal i.e., a timeslot or duration that comprises no active signal component in the first decimated digital input signal, apart from noise, or possible erroneous signals which would be identified by the data analysis processor.

Since specific time-based relations may be defined for a specific measurement application, the data analysis processor may output information about the time-based relations as analysis result. Information about the time-based relations may comprise any type of information that a user or an automated system may then analyze to identify possible faults or problems in the system that is tested.

The information may, for example, indicate that a time-based constraint is met. Such a time-based constraint may, for example, refer to a setup time or duration of a signal level in the first decimated digital input signal, or at least indirectly to a slope or skew of the respective flank of the signal in the first decimated digital input signal.

Another example of a time-based relation may refer to a down-time or silent time being required on a bus after a data package is sent and before the next data package is sent. In such exemplary embodiments, the data analysis processor may detect the end of a data package in the decoded input signal e.g., based on a package suffix, and may then monitor the silent time from the last waveform section that pertains to the respective data package to the first waveform section that pertains to the next data package in the first decimated digital input signal.

In a further embodiment, which can be combined with all other embodiments of the measurement application device mentioned above or below, the data analysis processor may comprise a constraint database that comprises constraints for the time-based relations, wherein the data analysis processor may be configured to output information about the time-based relations meeting the respective constraints or not as analysis result.

The constraint database may provide constraints for specific ones of the time-based relations. Such constraints may, for example, define a maximum duration or a minimum duration or both. For example, for the duration of a signal level change from a level denoting a logic 0 to a level denoting a logic 1, a minimum and a maximum duration may be given in the constraint database. For another constraint, like a silent time, only a minimum duration may be provided in embodiments, although providing a minimum duration and a maximum duration is also possible.

With the constraint database and the constraints provided therein, it is possible to automatically monitor the system that is being tested with the measurement application device. The user is not required to manually select specific sections of the first decimated digital input signal and set markers for measuring timings. Instead, the user may be informed if one of the time-based relations does not meet the respective constraint.

It is understood, that the content of the constraint database may be prefilled for at least some different protocols or communication systems. Of course, it is also understood, that a user may provide user-generated constraints to the measurement application device. To this end, a user interface of the measurement application device may be used. The constraints may also be provided via an external constraint database and via a respective communication interface of the measurement application device.

By allowing users to define their own constraints, the users may, for example, take into account specific tolerances of the system they are currently analyzing.

In an embodiment, which can be combined with all other embodiments of the measurement application device mentioned above or below, the measurement application device may further comprise a communication interface that is at least one of couped at least to the at least one decoder and configured to output the respective decoded input signal, and configured to output information about predefined events that are present in the decoded input signal.

The communication interface may be coupled to one or more of the decoders, if present, and serve mainly to output at least the decoded input signal. The decoded input signal may, for example, be provided to a respective server or cloud service that receives the decoded input signal for further processing.

It is understood, that in embodiments, the communication interface may also serve to output other data, for example, the first decimated digital input signal and/or the second decimated digital input signal. However, depending on the bandwidth of the communication interface, this option may surpass the available bandwidth. In contrast, the decoded input signal has a reduced data rate or bandwidth and may be transmitted via the communication interface with less bandwidth requirements.

To further reduce the required bandwidth, the communication interface may only transmit information about predefined events that are present in the decoded input signal. Such events may be detected by any of the processing elements of the measurement application device that have access to the decoded input signal. Such an element may, especially, comprise the above-disclosed event analyzer or an additional or dedicated event analyzer. The explanations provided above regarding possible events also apply to the events in the context of the communication interface.

The information about the predefined events may, for example, comprise at least one of the type of event that is detected, a time stamp for the occurrence of the event, parameters that are detected for the event, like data values, and signal parameters of the respective section in the first decimated digital input signal.

By outputting the decoded input signal or information about the predefined events, processing of the decoded input signal or information may be offloaded to a respective server or cloud service.

It is understood, that the communication interface may comprise any kind of wired and wireless communication interfaces, like for example a network communication interface, especially an Ethernet, wireless LAN or WIFI interface, a USB interface, a Bluetooth interface, an NFC interface, a visible or non-visible light based interface, especially an infrared interface.

It is further understood, that the measurement application device and the external servers or cloud services may communicate via an intermediary network with each other, and that such a network may comprise any type of network devices, like switches, hubs, routers, firewalls, and different types of network technologies.

In another further embodiment, which can be combined with all other embodiments of the measurement application device mentioned above or below, the communication interface may further be configured to receive configuration commands in response to the data that is output.

As indicated above, after transmitting the decoded input signal and/or the information about the predefined events, the data may be analyzed externally, for example, by a cloud service. Such an external analysis may result in the requirement to reconfigure the measurement application device or single elements of the measurement application device.

Such an external service may, therefore, provide the same functionality as the above-mentioned event-based configuration processor and may replace the local event-based configuration processor or provide additional functionality. Such additional functionality may, for example, result in more or more recent configuration data being available at a server or cloud service, that may then be provided to the measurement application device.

As explained above, the data that is output by the communication interface may comprise the decoded input signal and/or information about the predefined events.

In a further embodiment, which can be combined with all other embodiments of the measurement application device mentioned above or below, the measurement application device may further comprise a synchronization interface configured to synchronize the measurement application device with at least one further measurement application device.

The synchronization interface may comprise a dedicated interface or may be integrated into or be implemented by the above-mentioned communication interface. As a dedicated interface, the synchronization interface may use any adequate technology that allows high-precision synchronization of electronic devices. For example, a dedicated clock interface may be provided as synchronization interface that allows coupling two or more measurement application devices e.g., via BNC connectors. Exemplary other technologies may comprise, for example, the Ethernet-based White Rabbit technology developed by CERN and GSI Helmholtz Centre for Heavy Ion Research, or the PTP or Precision Time Protocol. With such technologies it is possible to achieve synchronization within the nanosecond or picosecond range.

Where possible, such technologies may be used via the communication interface alongside other communications that are performed via the communication interface.

With the synchronization interface the number of measurement or data acquisition ports of the measurement application device may easily be extended via one or more further measurement application devices. Further, it is possible to measure signals in systems that comprise multiple different bus protocols and perform all the timing and event analysis as described within this disclosure with the synchronized measurement application devices. Such systems may for example comprise bus bridges, like integrated CAN, FlexRay, and LIN bridges, hubs, or gateways.

In an embodiment, which can be combined with all other embodiments of the measurement application device mentioned above or below, the measurement application device may further comprise a message filter configured to filter out unwanted data packets from the decoded input signal.

In modern communication bus systems, a plurality of messages is communicated, while a user may only be interested in specific ones of the data messages. Wherein the term "message" is used synonymously for the terms packets or data packets.

The message filter may be provided to allow a user to filter out unwanted messages from the decoded input signal. In embodiments, the message filter may be provided directly after the decoder and filter out the unwanted messages prior to any other element of the measurement application device processing the decoded input signal.

The message filter may also filter the first decimated digital input signal. However, in this regard, the term "filter" is to be understood as blending or cutting out respective sections of the first decimated digital input signal.

In other embodiments, the message filter may only be implemented for displaying data to a user, for example, with the below-mentioned display unit. In such embodiments, the full decoded input signal is processed and possibly stored in the measurement application device, while only the filtered messages are shown to the user.

Of course, the filter may be user configurable, and a user may configure the filter via a user interface of the measurement application device or via any other interface that allows the measurement application device to receive the user configuration. Such an interface may be a communication interface that is coupled to a central server or service, that allows the user to manage one or multiple measurement application devices.

In another further embodiment, which can be combined with all other embodiments of the measurement application device mentioned above or below, the measurement application device may further comprise a display unit configured to display a message sequence chart based on the decoded input signal.

The display unit may in embodiments be a display of the measurement application device. It is understood, that the expression of the display unit being configured to display specific information, is meant to also comprise the display unit being controlled by any other unit, element or processing device in the measurement application device to display the respective information. A dedicated display controller that is coupled to the respective elements in the measurement application device, retrieves the required information, and controls the display unit is also possible.

The display unit being configured to display a message sequence chart may therefore comprise a processing element in the display unit determining the content of the message sequence chart, or alternatively, any other element of the measurement application device determining the content of the message sequence chart and controlling the display unit accordingly. The content of a message sequence chart may, for example, be determined by the above-mentioned data analysis processor, and the display unit may be controlled by the data analysis processor to display the message sequence chart.

In embodiments of the measurement application device that comprise the above-mentioned digital output signal generator, the content of the digital output signal may also be included in the message sequence chart, as if the measurement application device would be another communication device.

It is understood, that the message sequence chart may be displayed in a horizontal or a vertical form.

Further, a user may configure if messages of different communication devices should be shown in separate columns or rows or in a single common column or row.

In a further embodiment, which can be combined with all other embodiments of the measurement application device mentioned above or below, the display unit may further be configured to continuously update the display of the message sequence chart based on the decoded input signal.

The message sequence chart may be scrolled up, down, left or right to update the message sequence chart.

Of course, since the decoder may be a hardware unit that may operate directly on the second decimated digital input signal, the scrolling message sequence chart may be shown in real time, and if required, in parallel to a scrolling view of the first decimated digital input signal.

In an embodiment, which can be combined with all other embodiments of the measurement application device mentioned above or below, the measurement application device may further comprise a display unit configured to display at least one of a communication protocol detected in the analog input signal, data content detected in the decoded input signal, and a data rate of the decoded input signal, and to continuously update the display.

The data to be displayed may be shown to a user in a small section of the display device to give a quick indication to a user about the used communication protocol and some parameters of the communication. Oscilloscopes may, for example, in the lower section of the display comprise information boxes that each show information about one of the data acquisition channels of the oscilloscope. The information about the communication protocol and the actually performed communication may be shown in a further one of such boxes.

This allows the user to quickly identify parameters of the communication that he may deem relevant.

In another further embodiment, which can be combined with all other embodiments of the measurement application device mentioned above or below, the measurement application device may further comprise a display unit configured to display at least one of the first decimated digital input signal and the decoded input signal, and to display information that is based on the decoded input signal in a timely synchronized fashion with the at least one of the first decimated digital input signal and the decoded input signal.

As indicated above, the display unit may in embodiments be a display of the measurement application device. It is understood, that the expression of the display unit being configured to display specific information, is meant to also comprise the display unit being controlled by any other unit, element or processing device in the measurement application device to display the respective information. A dedicated display controller that is coupled to the respective elements in the measurement application device, retrieves the required information, and controls the display unit is also possible.

In embodiments, the display unit may display the first decimated digital input signal in form of a waveform. At the points of the waveform that initiate or terminate a specific piece of data in the decoded input signal or between these points the information may be shown in the form of a marker, label or flag that may be displayed, that has a content that is based on the decoded input signal.

A user may open e.g., by clicking, the marker, label or flag and may be presented with additional information about the data provided in the decoded input signal.

A specific piece of data may, for example, comprise a data packet or specific content, like a sensor measurement value, or a configuration command. The user may also be provided with a possibility to define, which specific pieces of data should be labeled on the display in the waveform of the first decimated digital input signal. The user may, for example, define that every occurrence of a specific control command, or every transmission of a sensor value should be labeled in the waveform of the first decimated digital input signal.

As already explained above, in the measurement application device a protocol description or specification may be provided, and the respective pieces of data may be identified in the decoded input signal based on the protocol description or specification.

In embodiments, a marker, label or flag may also be attached to a display of the decoded input signal, for example, in a message sequence chart or a data package list or chart. The marker, label or flag may also be provided in other views of the first decimated digital input signal or the decoded input signal, like a spectrogram, a track diagram or a histogram.

The content of the marker, label or flag may in embodiments comprise a predetermined text or icon. In embodiments, the content may as alternative, or in addition, comprise content or data of the decoded input signal.

In a further embodiment, which can be combined with all other embodiments of the measurement application device mentioned above or below, the measurement application device may further comprise a display control interface configured to receive a control command indicating a time stamp and to control a display unit of the measurement application device to display at least one of the first decimated digital input signal, second decimated digital input signal, and the decoded input signal at the point in time as indicated by the time stamp.

The display control interface may be combined with any of the embodiments of the measurement application device that comprises a display unit or a display and may control the measurement application device to display any of the first decimated digital input signal, the second decimated digital input signal, and the decoded input signal according to a received time stamp.

This function may, for example, be used in combination with external analysis tools. In an exemplary embodiment, the measurement application device may be configured to decode, with the decoder an IP data stream up to the IP layer and provide that IP data stream to an external tool, for example, the Wireshark tool. If not present already, the measurement application device may add time-stamps to the IP data stream that is sent to the external tool.

This further tool may be used to decode higher layers in the IP data stream. If in those layers an interesting section is identified by a user, the Wireshark tool may send the respective time-stamp to the measurement application device, for example, to the display control interface. The user may then be presented, for example, with the first decimated digital input signal at the relevant point in time.

In embodiments, at least some of the elements of the measurement application device may be implemented in a configurable logic device, like an FPGA or a CPLD. Especially, those elements of the measurement application device that may be reconfigured according to a respective measurement application, may be implemented as such a configurable logic device. Reconfiguration may then be performed easily by loading a respective configuration into the configurable logic device.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments which are specified in the schematic figures of the drawings, in which.

In the figures like reference signs denote like elements unless stated otherwise.

DETAILED DESCRIPTION OF THE DRAWINGS

Figure 1:
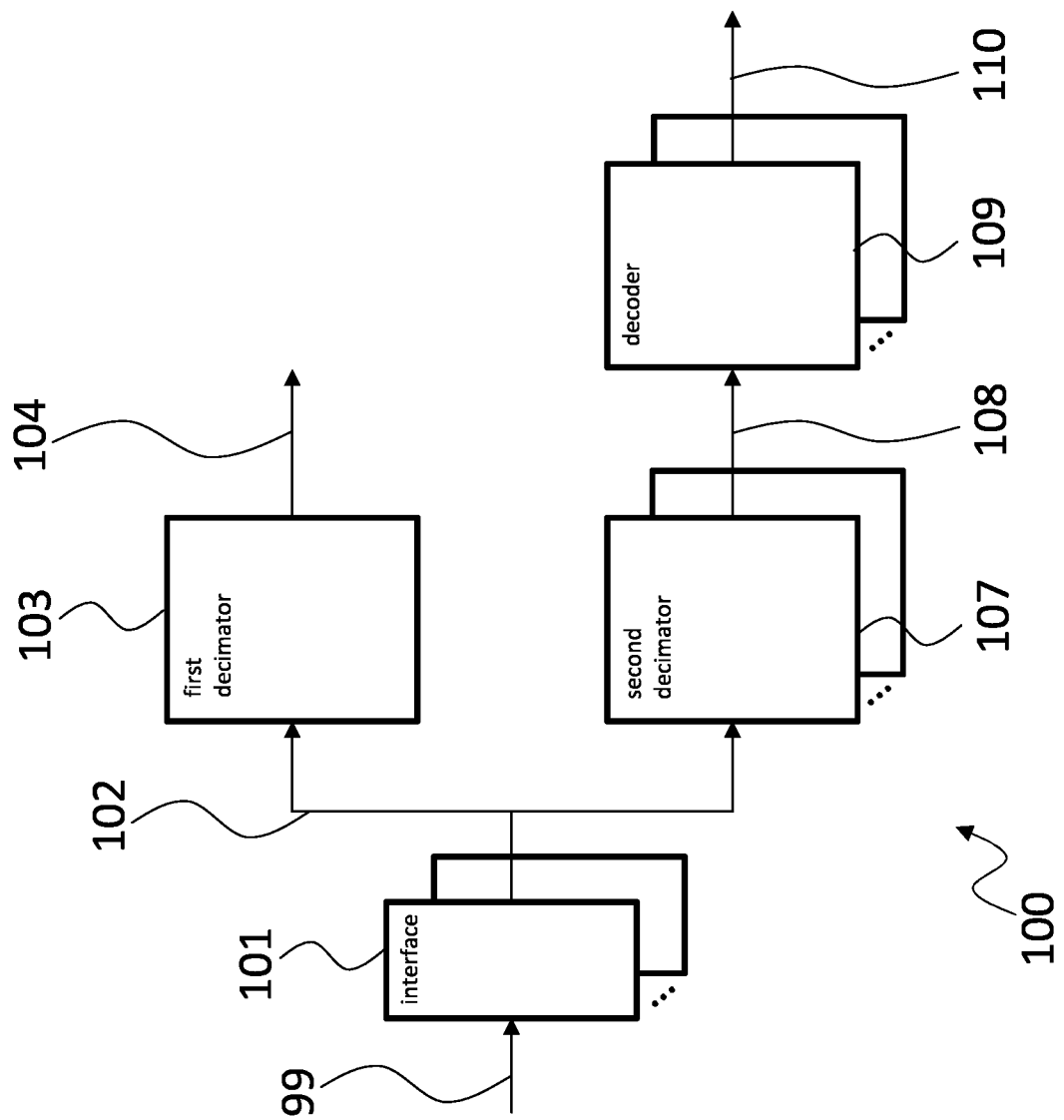
FIG. 1 shows a block diagram of an embodiment of a measurement application device according to the present disclosure.

FIG. 1 shows a measurement application device 100 for processing an analog input signal 99. The measurement application device 100 comprises a signal acquisition interface 101 that is coupled to a first decimator 103 and a second decimator 107. The second decimator 107 is coupled to a decoder 109. Although only one signal acquisition interface 101 is shown, more are possible as indicated by three dots. Although a single second decimator 107 is shown, one signal acquisition interface 101 may be coupled to more than one second decimator 107 as indicated by three dots. In addition, each second decimator 107 may be coupled to more than one decoder 109, as indicated by three dots. It is understood, that the measurement application device 100 may be implemented as any type of device that may acquire an analog input signal 99. Such a device may for example be an oscilloscope.

The signal acquisition interface 101 acquires the analog input signal 99, converts the analog input signal 99 into a digital input signal 102 and outputs the digital input signal 102 to the first decimator 103 and the second decimator 107. The signal acquisition interface 101 may at least in part be implemented in the signal acquisition frontend of a measurement device, like an oscilloscope.

The first decimator 103 reduces the number of samples of the respective digital input signal 102 and outputs a first decimated digital input signal 104. The first decimator 103 may operate with a first decimation factor.

The second decimator 107 reduces the number of samples of the respective digital input signal 102 and outputs a second decimated digital input signal 108. The second decimator 107 may use a second decimation factor, which may especially be higher than the first decimation factor. The second decimation factor may, for example, be two times, three times, four times, five times, eight times, or ten times higher than the first decimation factor. That means that the first decimated digital input signal 104 will have a higher sample rate than the second decimated digital input signal 108.

The decoder 109 decodes the respective second decimated digital input signal 108 according to a respective protocol and provides a respective decoded input signal 110.

As already indicated above, the measurement application device 100 may be implemented in a measurement device, like an oscilloscope. In other embodiments, the measurement application device 100 may also be implemented as measurement-only device that is only capable of acquiring one or more analog input signals 99. Such a measurement-only device may comprise the elements of the measurement application device 100 and a communication interface to provide at least one of the first decimated digital input signal 104, the second decimated digital input signal 108, and the decoded input signal 110 to another device, like a server, network storage or cloud service. Any of the function described herein as being performed on at least one of the first decimated digital input signal 104, the second decimated digital input signal 108 and the decoded input signal 110 may be performed by such a receiving device.

With the measurement application device 100 it is possible to acquire the content of the data that is transmitted via the analog input signal 99 according to the specific protocol at the same time as acquiring the first decimated digital input signal 104. During development or debugging of an electronic application both types of information being available provides valuable insights to a user.

A user may, for example, identify problems in the second decimated digital input signal 108 or the decoded input signal 110 and directly relate that problems to the waveform of the first decimated digital input signal 104.

Figure 2:
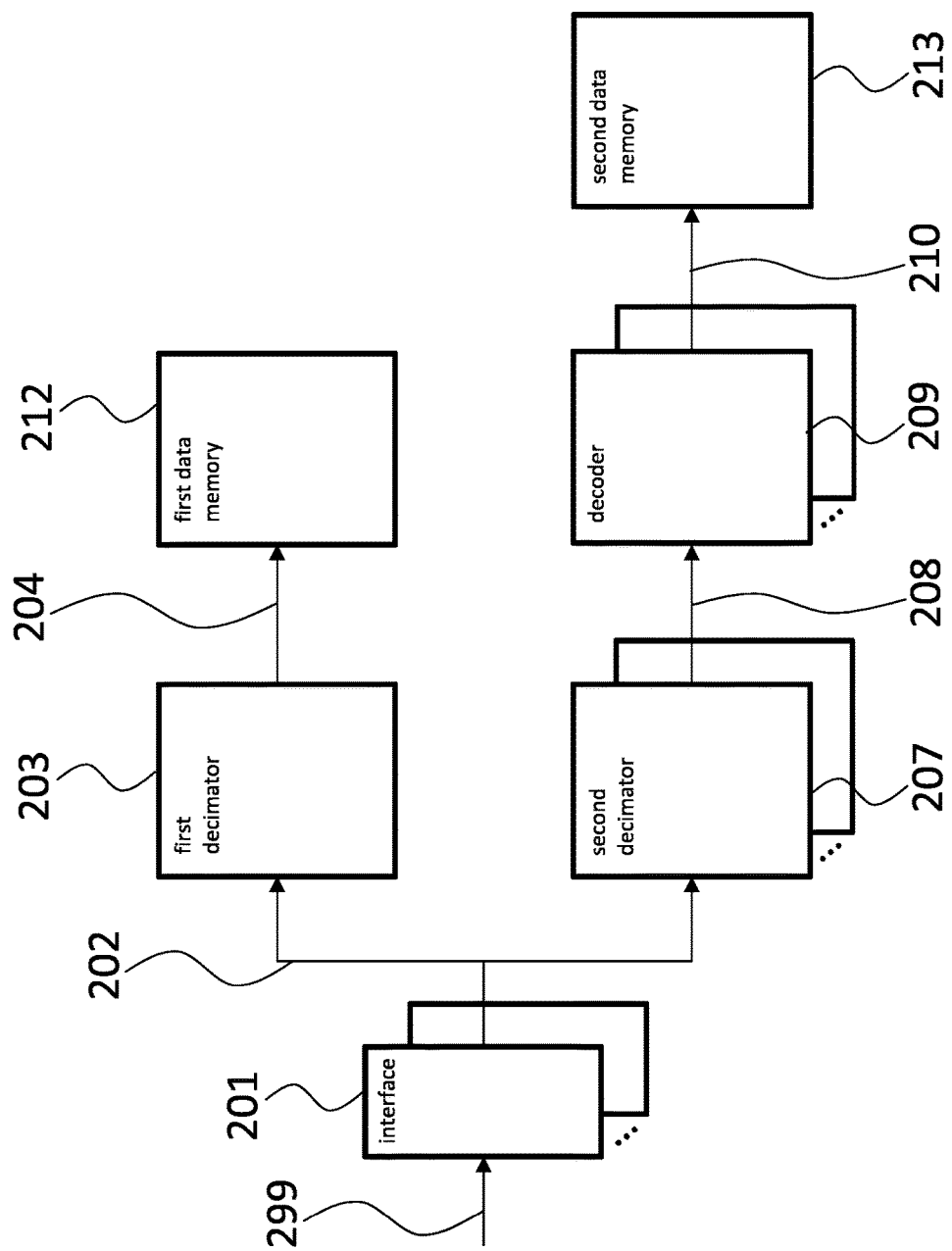
FIG. 2 shows a block diagram of another embodiment of a measurement application device according to the present disclosure.

FIG. 2 shows a block diagram of another measurement application device 200. The measurement application device 200 is based on the measurement application device 100. Therefore, the measurement application device 200 comprises a signal acquisition interface 201 that is coupled to a first decimator 203 and a second decimator 207. The second decimator 207 is coupled to a decoder 209. The explanations provided above, regarding the measurement application device 100 also apply to the measurement application device 200 mutatis mutandis.

The measurement application device 200 further comprises a first data memory 212 that is coupled to the first decimator 203 and receives the first decimated digital input signal 204 for storing the first decimated digital input signal 204.

The first data memory 212 may be provided in the form of an acquisition memory of the measurement application device 200. An acquisition memory 212 may be provided as a kind of ring-buffer that permanently stores samples that are received by the acquisition memory 212 from the first decimator 203. A respective trigger system may control the acquisition memory 212 to stop storing and, therefore, overwriting samples in the ring-buffer, when a respectively configured event is detected by the trigger system in the acquired signal.

The measurement application device 200 further comprises a second data memory 213. The second data memory 213 is coupled to the decoder 209 and receives the decoded input signal 210 for storing the decoded input signal 210. The second data memory 213 may be implemented as a kind of ring-buffer that stores a predetermined number of samples and, when being filled, overwrites the stored samples starting from the first stored sample.

The second data memory 213 may be provided as internal memory of the measurement application device 200. In other embodiments, the second data memory 213 may also be provided as external or remote memory that may be coupled to the measurement application device 200 via a respective interface, for example, a network connection, a USB connection, or a memory card slot.

Since the data rate of the decoded input signal 210 is lower than the data rate of the first decimated digital input signal 204, the second data memory 213 not necessarily needs to be provided as an acquisition memory. Instead, the second data memory 213 may be provided as a normal computer memory that allows storing and loading data, like for example a RAM memory, or an SSD or HDD memory.

The measurement application device 200 is shown with both, the first data memory 212 and the second data memory 213. It is understood, that in other embodiments, the measurement application device 200 may comprise only the first data memory 212 or the second data memory 213.

Figure 3:
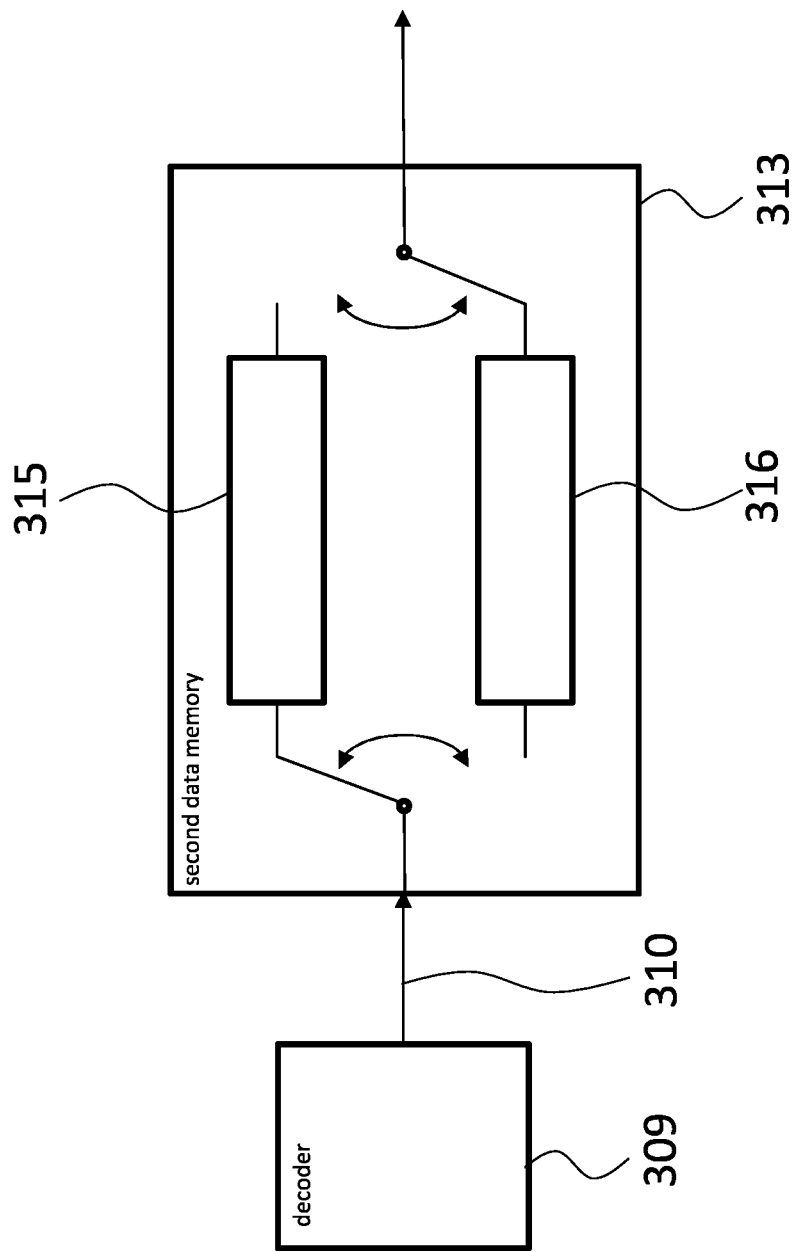
FIG. 3 shows a block diagram of a section of an embodiment of a measurement application device according to the present disclosure.

FIG. 3 shows a block diagram of a section, especially the second data memory 313 of a measurement application device. The second data memory 313 is coupled to a decoder 309 that provides the decoded input signal 310.

The second data memory 313 comprises a first data section 315 and a second data section 316. The decoded input signal 310 is alternatively written to the first data section 315 and the second data section 316, while the decoded input signal 310 is read from that one of the memory sections 315, 316 that is currently not written to during a read access to the second data memory 313.

In the second data memory 313 a switching device on the input side, and a switching device on the output side are schematically shown. It is understood, that any adequate switching circuitry or memory controller may be provided to control the write and read operations on the second data memory 313.

With the second data memory 313, continuous recording of the decoded input signal 310 is possible, since no single second data memory unit is blocked by writing or reading access, and the second data memory 313 may at any time be written to and read from at the same time.

After filling one of the first data section 315 and the second data section 316, the other data section 315, 316 may be overwritten from the beginning. However, the data from the data section 315, 316 that is then written to, may already be read out.

Figure 4:
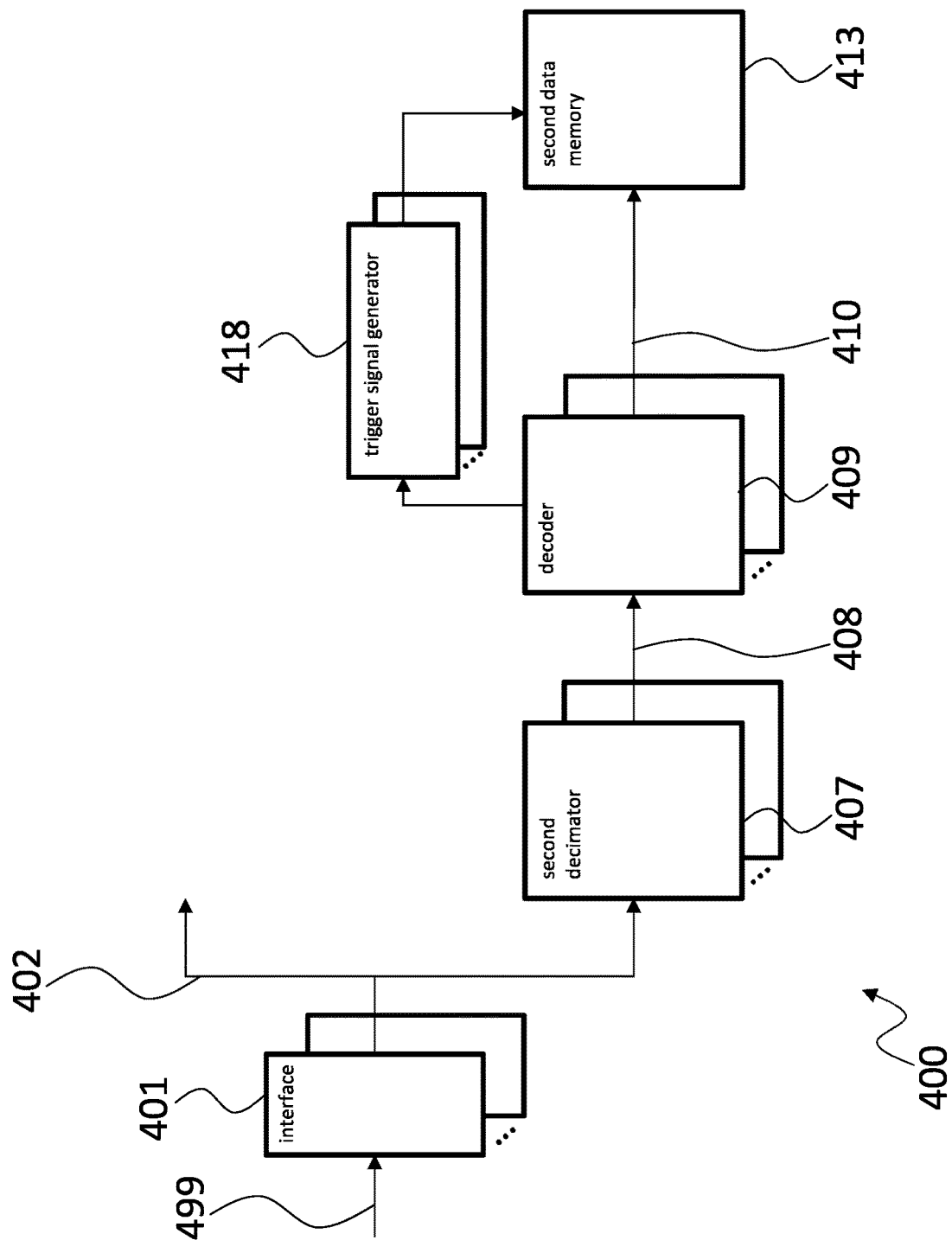
FIG. 4 shows a block diagram of an embodiment of a measurement application device according to the present disclosure.

FIG. 4 shows a block diagram of a measurement application device 400. The measurement application device 400 is based on the measurement application device 100. Therefore, the measurement application device 400 comprises a signal acquisition interface 401 that is coupled to a first decimator (not shown) and a second decimator 407. The second decimator 407 is coupled to a decoder 409 and provides the second decimated digital input signal 408 to the decoder 409. The decoder 409 is coupled to a second data memory 413 for storing the decoded input signal 410 provided by the decoder 409. The explanations provided above, regarding the measurement application device 100 apply mutatis mutandis.

The measurement application device 400 further comprises a first trigger signal generator 418. The first trigger signal generator 418 serves for controlling the storing of the decoded input signal 410 in the second data memory 413 based on the decoded input signal 410. The first trigger signal generator 418 may be seen in analogy to a tradition trigger system in an oscilloscope, but adapted to operate on the decoded input signal 410.

The first trigger signal generator 418 may, therefore, be configured to detect specific events in the decoded input signal 410. As soon as such an event is detected, the first trigger signal generator 418 may trigger the second data memory 413 to stop recording the decoded input signal 410. The decoded input signal 410 that is stored in the second data memory 413 up to this point in time, may then be completely read out from the second data memory 413 for further processing, without the data being overwritten by newly acquired decoded input signal 410 data.

In the measurement application device 400 a single first trigger signal generator 418 is shown, that is coupled to a single decoder 409. In other embodiments, multiple decoders may be provided, and a trigger signal generator may be provided for each one of the decoders. For example, at least two decoders may be coupled to the same one of the second decimators, and a first trigger signal generator for each one of the at least two decoders may be provided. In embodiments, more than one first trigger signal generator may be coupled to a single decoder to trigger on different events.

Figure 5:
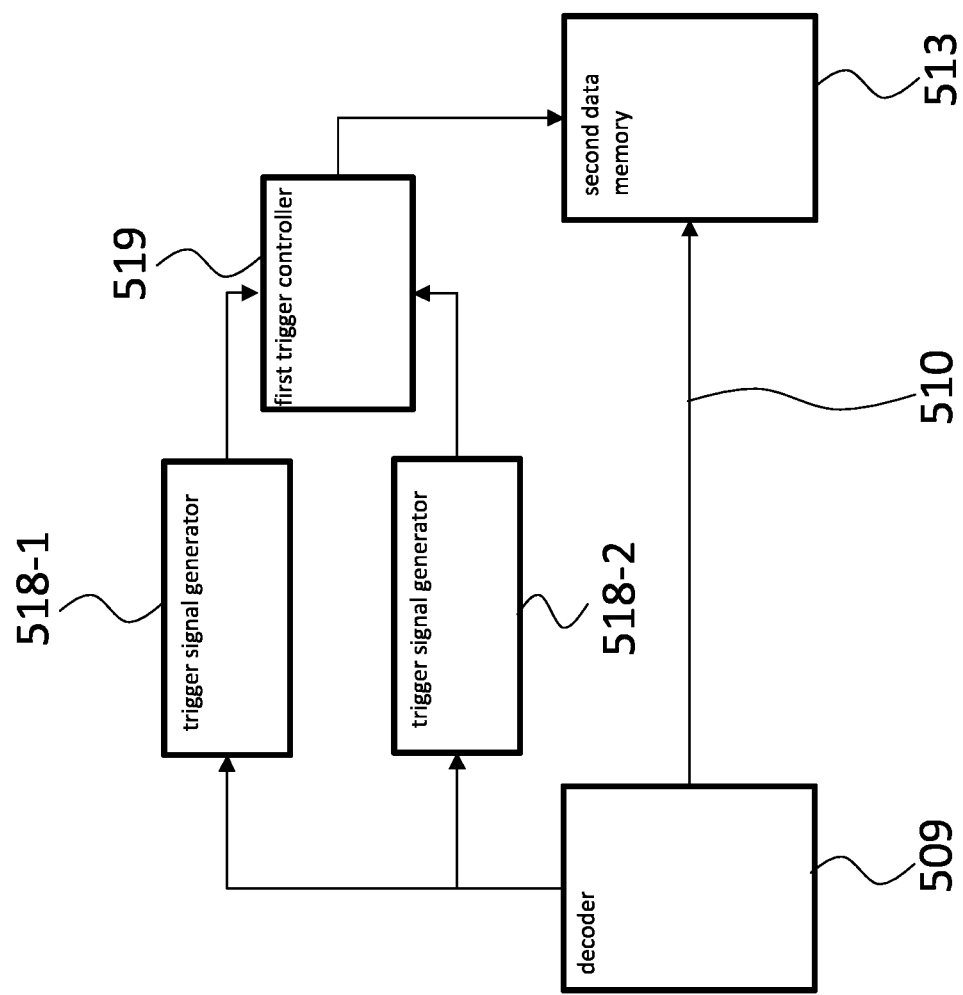
FIG. 5 shows a block diagram of a section of an embodiment of a measurement application device according to the present disclosure.

FIG. 5 shows a section of a measurement application device with a decoder 509 that provides a decoded input signal 510 to a second data memory 513. Further, two first trigger signal generators 518-1, 518-2 are coupled to the decoder 509, and a first trigger controller 519 is coupled to the two first trigger signal generators 518-1, 518-2 and to the second data memory 513.

The first trigger controller 519 receives the output signals from the two first trigger signal generators 518-1, 518-2 and generates a single combined trigger signal for the second data memory 513.

To this end, the first trigger controller 519 may comprise a first trigger logic circuitry that receives input trigger signals, and applies a respective logic function to the input trigger signals to generate the combined trigger signal. Possible logic functions comprise, but are not limited to, at least one of an OR function, an AND function, an IF function, a state machine, and a timer to the received input trigger signals to generate a combined trigger signal.

Figure 6:
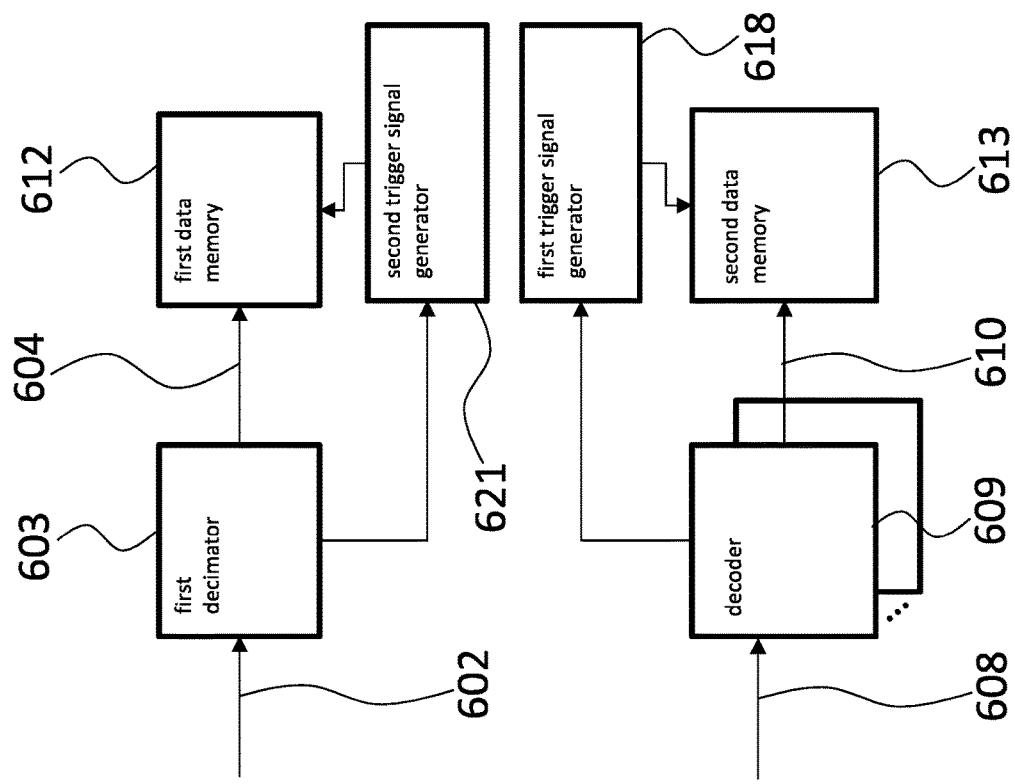
FIG. 6 shows a block diagram of another section of an embodiment of a measurement application device according to the present disclosure.

FIG. 6 shows another section of a measurement application device. The section shown in FIG. 6 is based on the measurement application device 400 but does not show the signal acquisition interface 401, and the second decimator 407. The section, therefore, shows a decoder 609 that receives a second decimated digital input signal 608, wherein more possible decoders are hinted at by three dots. The decoder 609 is coupled to a second data memory 613, and a first trigger signal generator 618 is coupled to the decoder 609 and the second data memory 613.

In addition, the section of FIG. 6 shows a first decimator 603 that receives the digital input signal 602 and provides the first decimated digital input signal 604 to a first data memory 612. A second trigger signal generator 621 is coupled to the first decimator 603 to receive the first decimated digital input signal 604, and to the first data memory 612 to provide a trigger signal.

It is understood, that the explanations provided above regarding the second data memory and the first trigger signal generator apply mutatis mutandis to the second data memory 613 and the first trigger signal generator 618.

With a measurement application device that implements a trigger for the decoded input signal 610 and the first decimated digital input signal 604, a user may flexibly trigger on events in the analog signal domain as well as the digital data domain.

It is understood, that instead of a single first trigger signal generator 618 or a single second trigger signal generator 621, multiple first trigger signal generators 618 or second trigger signal generators 621 with respective trigger signal controllers, as described with regard to FIG. 5, may be provided.

Figure 7:
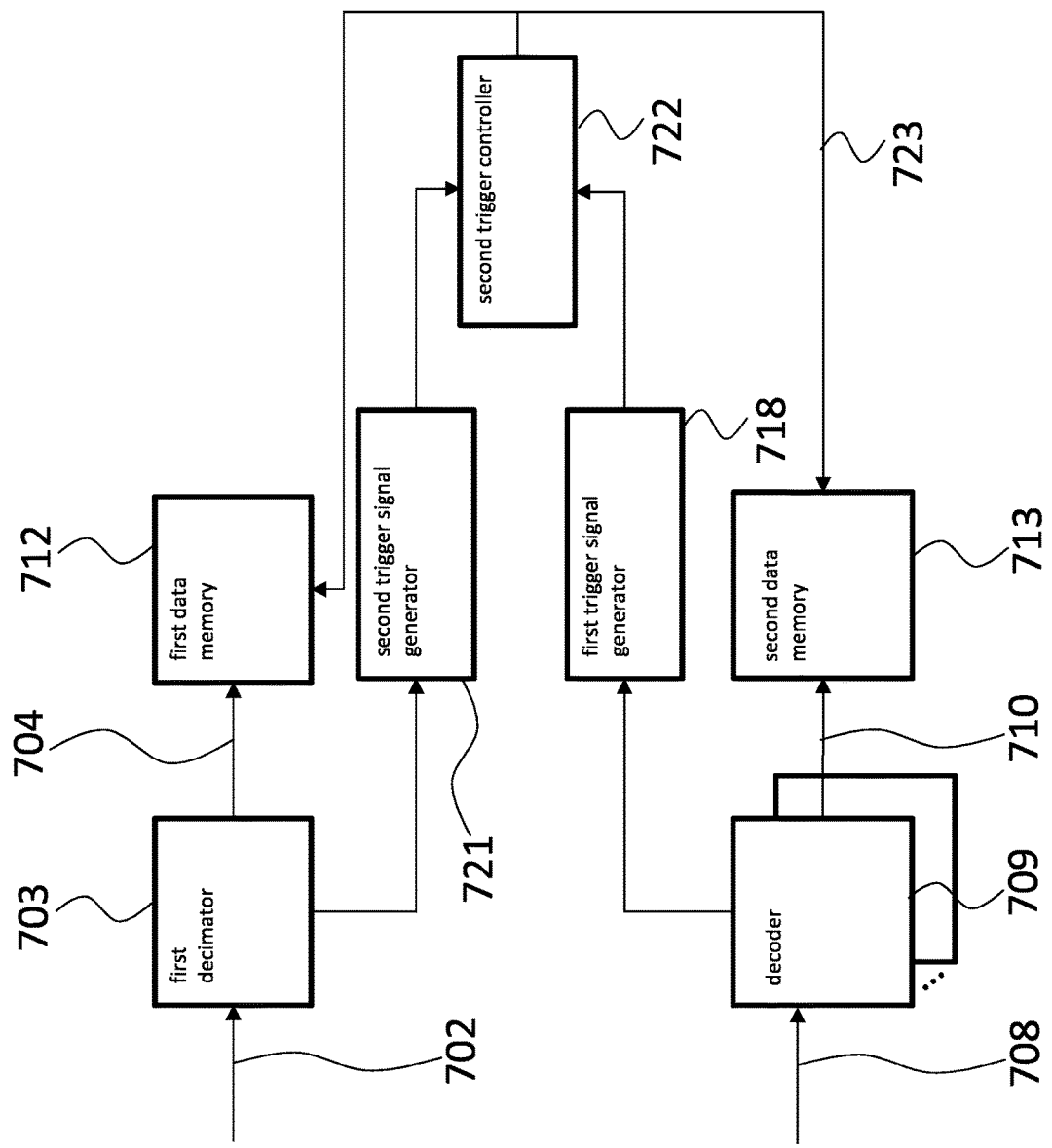
FIG. 7 shows a block diagram of a further section of an embodiment of a measurement application device according to the present disclosure.

FIG. 7 shows a section of a measurement application device that is based on the section shown in FIG. 6. The section, therefore, comprises a first decimator 703 that receives the digital input signal 702 and provides the first decimated digital input signal 704 to a first data memory 712. A second trigger signal generator 721 is coupled to the first decimator 703 to receive the first decimated digital input signal 704. Further, a decoder 709 receives a second decimated digital input signal 708, wherein more possible decoders are hinted at by three dots. The decoder 709 is coupled to a second data memory 713, and a first trigger signal generator 718 is coupled to the decoder 709.

The first trigger signal generator 718 and the second trigger signal generator 721 are both coupled to a second trigger controller 722 that receives the output trigger signals from the first trigger signal generator 718 and the second trigger signal generator 721 and outputs a combined output trigger signal to at least one of the first data memory 712, and the second data memory 713.

To this end, the second trigger controller 722 may comprise a trigger logic circuitry that receives the input trigger signals, and applies a respective logic function to the input trigger signals to generate the combined output trigger signal. Possible logic functions comprise, but are not limited to, at least one of an OR function, an AND function, an IF function, a state machine, and a timer to the received input trigger signals to generate a combined trigger signal.

It is understood, that the same or different logic functions may be provided for the output trigger signals that are provided to the first data memory 712 and the second data memory 713.

Figure 8:
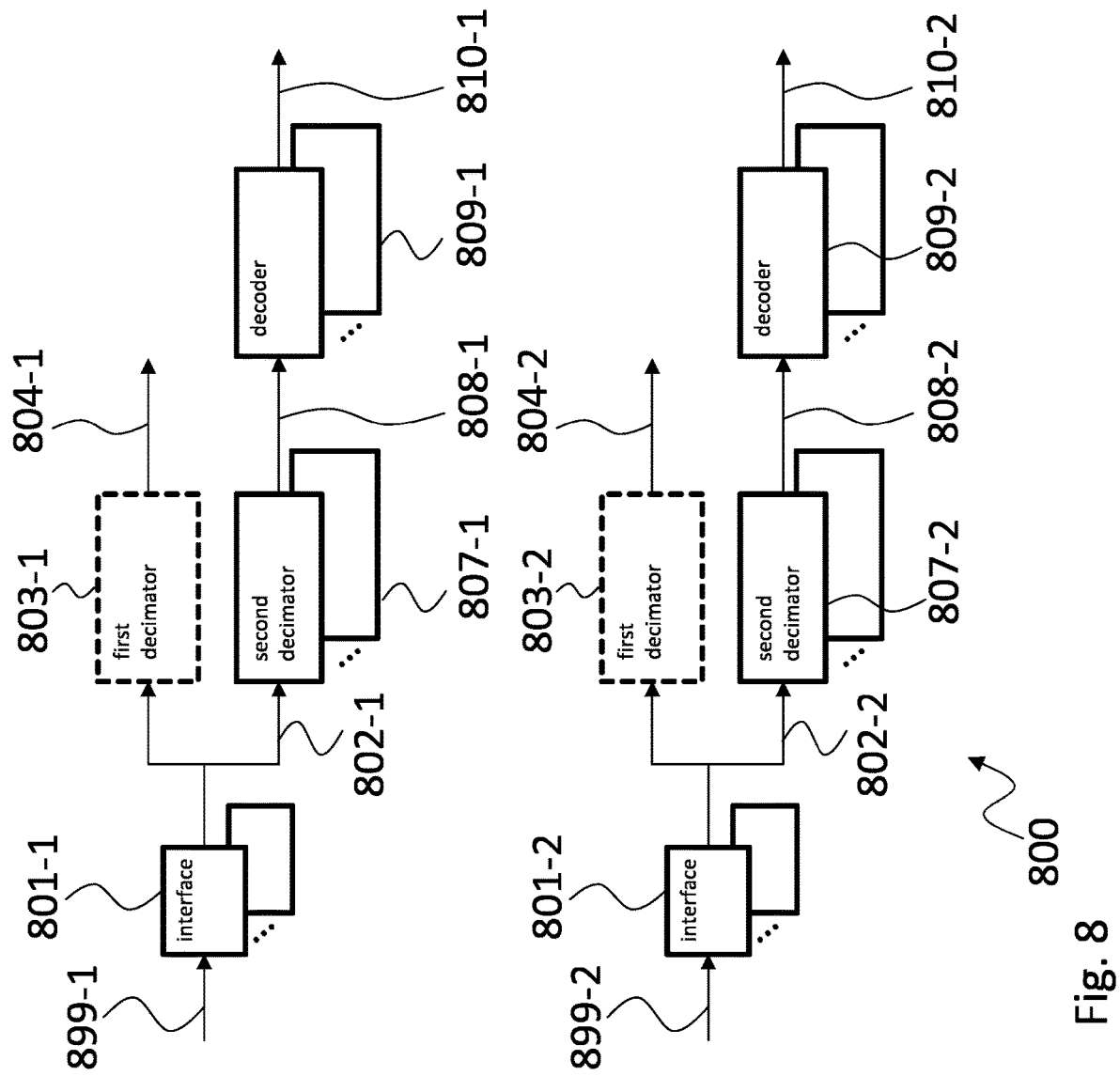
FIG. 8 shows a block diagram of a further embodiment of a measurement application device according to the present disclosure.

FIG. 8 shows a block diagram of a measurement application device 800 that is based on measurement application device 100 but comprises two signal processing channels. The measurement application device 800, therefore, comprises in a first signal processing channel a signal acquisition interface 801-1 for acquiring a first analog input signal 899-1. The signal acquisition interface 801-1 is coupled to a first decimator 803-1 and a second decimator 807-1. The second decimator 807-1 is coupled to a decoder 809-1. In a second signal processing channel, the measurement application device 800 comprises a signal acquisition interface 801-2 for acquiring a second analog input signal 899-2. The signal acquisition interface 801-2 is coupled to a first decimator 803-2 and a second decimator 807-2. The second decimator 807-2 is coupled to a decoder 809-2. The explanations provided above, regarding the measurement application device 100 apply mutatis mutandis.

It is understood, that each one of the signal processing channels of the measurement application device 800 may be implemented according to any of the embodiments described in this disclosure, and that the explanations provided regarding the measurement application device 100 or any other measurement application device with only one signal processing channel apply to each one of the signal processing channels of the measurement application device 800 mutatis mutandis.

Although two signal processing channels are shown in the measurement application device 800, any other number of measurement application device 800 is also possible.

Figure 9:
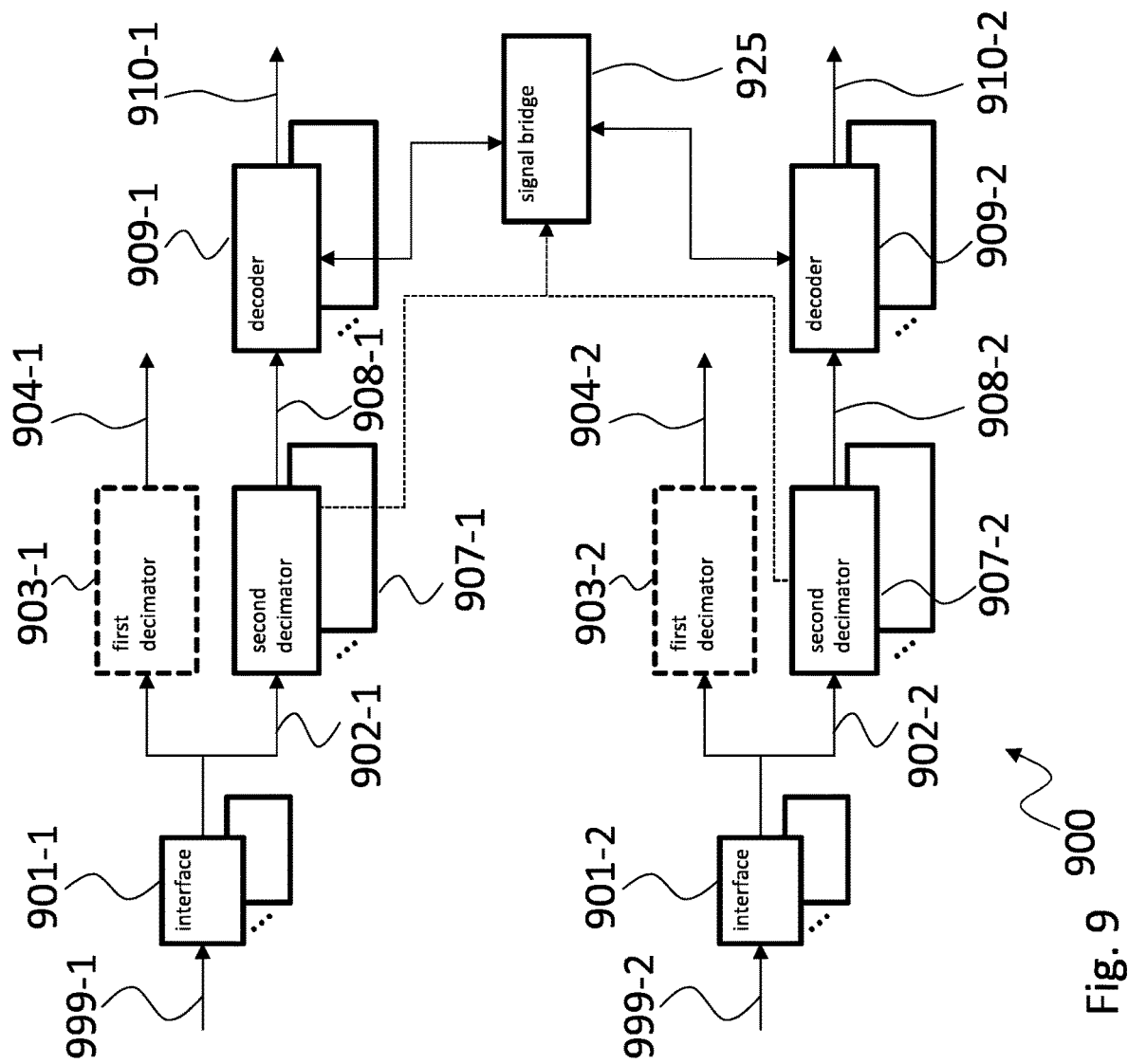
FIG. 9 shows a block diagram of another embodiment of a measurement application device according to the present disclosure.

FIG. 9 shows a block diagram a measurement application device 900. The measurement application device 900 is based on the measurement application device 800. Therefore, the measurement application device 900 comprises in a first signal processing channel a signal acquisition interface 901-1 for acquiring a first analog input signal 999-1. The signal acquisition interface 901-1 is coupled to a first decimator 903-1 and a second decimator 907-1. The second decimator 907-1 is coupled to a decoder 909-1. In a second signal processing channel, the measurement application device 900 comprises a signal acquisition interface 901-2 for acquiring a second analog input signal 999-2. The signal acquisition interface 901-2 is coupled to a first decimator 903-2 and a second decimator 907-2. The second decimator 907-2 is coupled to a decoder 909-2. The explanations provided above, regarding the measurement application device 800 apply mutatis mutandis.

The measurement application device 900 further comprises a signal bridge 925. The signal bridge 925 is coupled to the decoder 909-1 of the first signal processing channel and the decoder 909-2 of the second signal processing channel.

The signal bridge 925 serves to submit the decoded input signal 910-1 to the decoder 909-2, or the decoded input signal 910-2 to the decoder 909-1. This allows providing, for example, a clock signal that is decoded in one of the signal processing channels of the measurement application device 900 to the decoder in the signal processing channel that decodes the respective data signal and needs the clock signal for decoding the data signal.

It is understood, that the signal bridge 925 is not limited to being used with two signal processing channels. The signal bridge 925 may be used with any number of signal acquisition channels and may be coupled to any of the respective decoders.

In embodiments, the signal bridge 925 may also be coupled to the second decimators of the respective signal processing channels as indicated by a dashed line.

Figure 10:
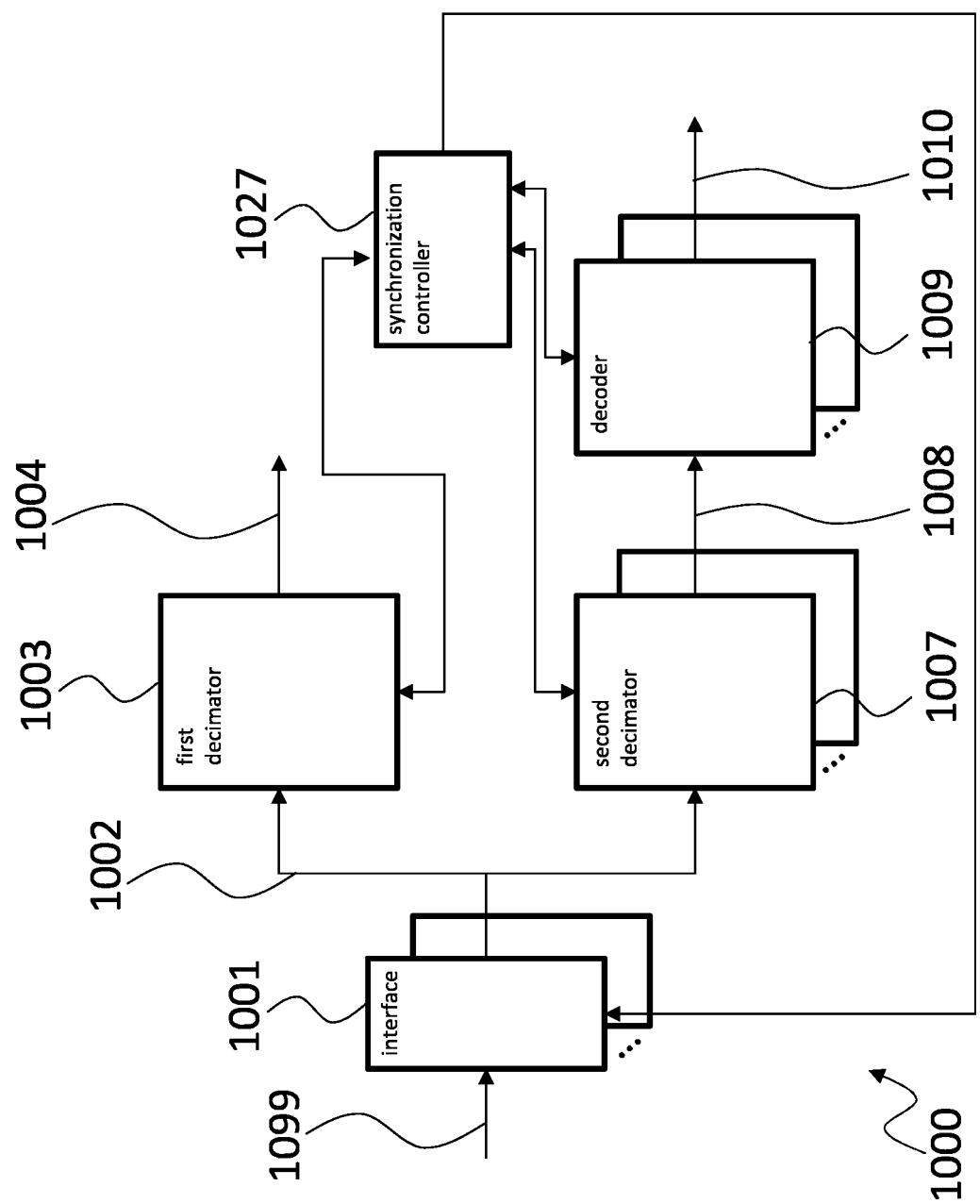
FIG. 10 shows a block diagram of a further embodiment of a measurement application device according to the present disclosure.

FIG. 10 shows a block diagram of a further measurement application device 1000. The measurement application device 1000 is based on the measurement application device 100. Therefore, the measurement application device 1000 comprises a signal acquisition interface 1001 that acquires the first analog input signal 1099 and that is coupled to a first decimator 1003 and a second decimator 1007. The second decimator 1007 is coupled to a decoder 1009. The explanations provided above, regarding the measurement application device 100 also apply to the measurement application device 1000 mutatis mutandis.

The measurement application device 1000 further comprises a synchronization controller 1027 that is exemplarily coupled to the signal acquisition interface 1001, the first decimator 1003, the second decimator 1007, and the decoder 1009. It is understood, that in other embodiments, the synchronization controller 1027 may be coupled to less elements of the measurement application device 1000. In embodiments, the synchronization controller 1027 may also be coupled to elements in different signal processing channels of the measurement application device 1000 to synchronize multiple signal processing channels.

The synchronization controller 1027 serves to synchronize at least one of the digital input signal 1002 via the signal acquisition interface 1001, the first decimated digital input signal 1004 via the first decimator 1003, the second decimated digital input signal via the second decimator 1007, and the decoded input signals via the decoder 1009.

Synchronizing may be performed in different ways, for example, by providing a system time, a time stamp or a clock signal to the respective elements in the measurement application device 1000. In alternative embodiments, the synchronization controller 1027 may operate on the first decimated digital input signal 1004, the second decimated digital input signal 1008, and the decoded input signal 1010 and provide any of these signals with a respective time stamp.

Figure 11:
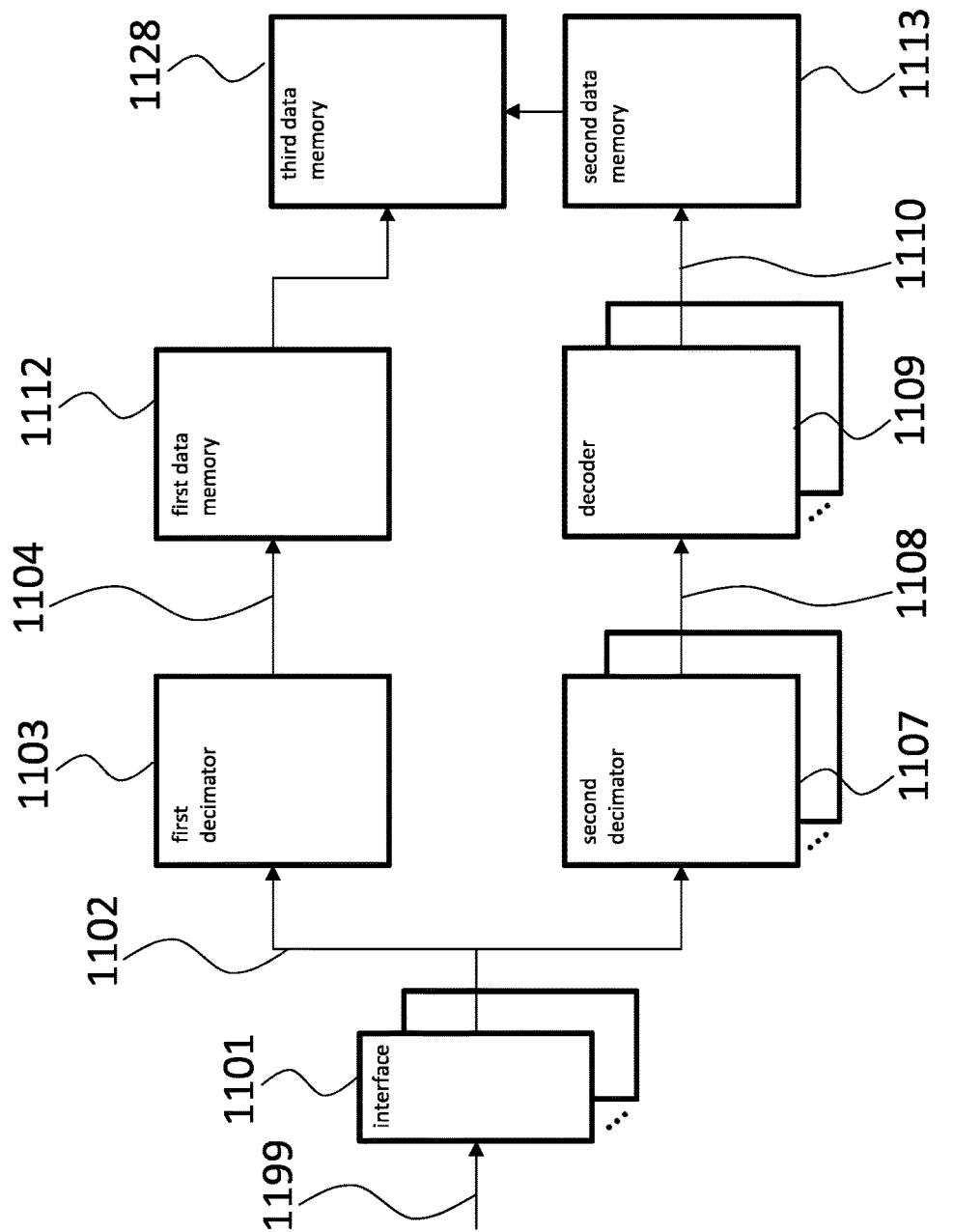
FIG. 11 shows a block diagram of an embodiment of a measurement application device according to the present disclosure.

FIG. 11 shows a measurement application device 1100 that is based on the measurement application device 200. Therefore, the measurement application device 1100 comprises a signal acquisition interface 1101 for acquiring the analog input signal 1199 and providing the digital input signal 1102. The signal acquisition interface 1101 is coupled to a first decimator 1103 that is coupled to a first data memory 1112. The signal acquisition interface 1101 is further coupled to a second decimator 1107 that is coupled to a decoder 1109. The decoder 1109 is coupled to a second data memory 1113. The explanations provided above, regarding the measurement application device 100 also apply to the measurement application device 200 mutatis mutandis.

The measurement application device 1100 further comprises a third data memory 1128 that is coupled to the first data memory 1112 and the second data memory 1113.

The third data memory 1128 serves for storing the first decimated digital input signal 1104 together with the decoded input signal 1110. This allows quickly reading both, the first decimated digital input signal 1104 and the decoded input signal 1110 from the third data memory 1128 for further processing.

Figure 12:
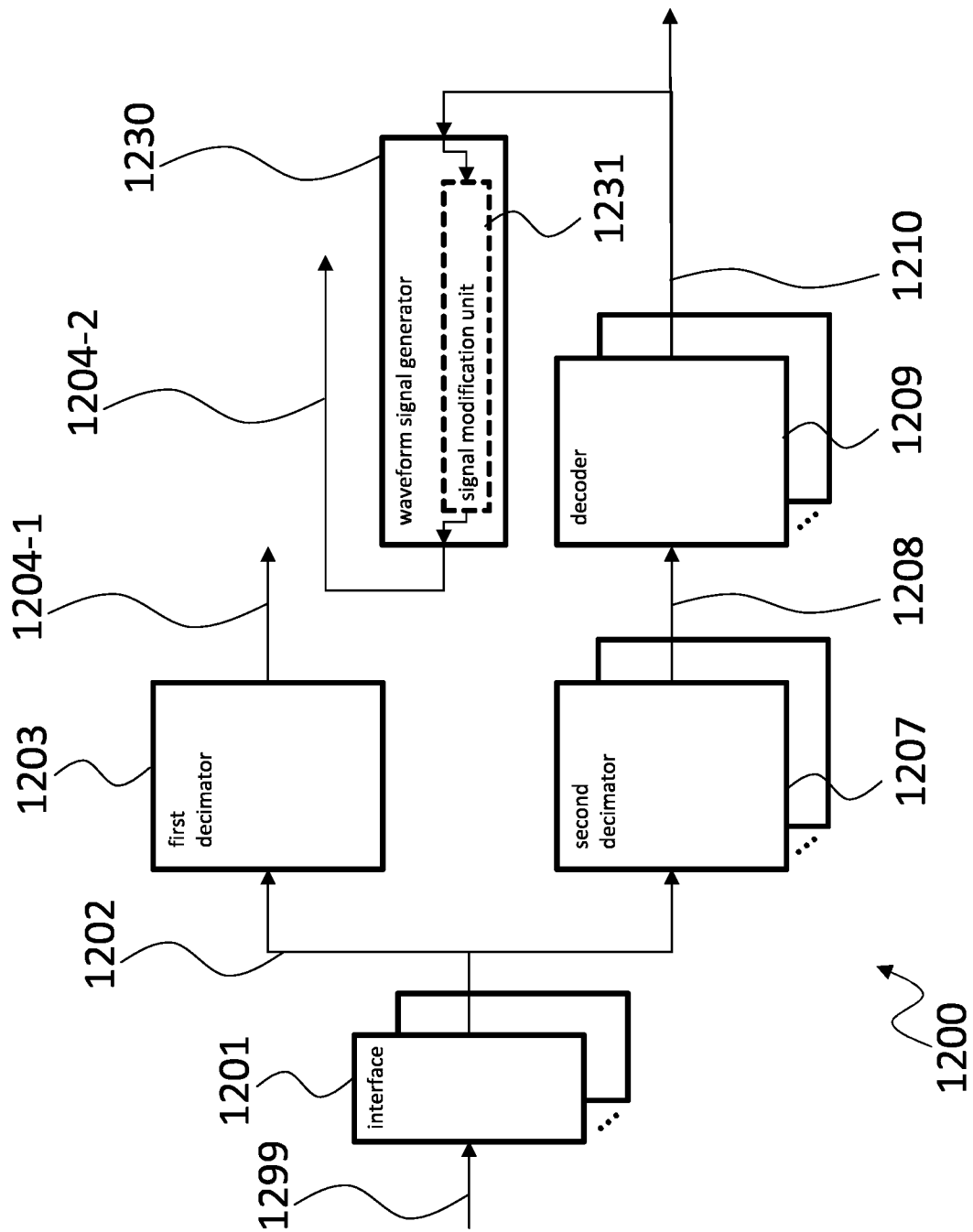
FIG. 12 shows a block diagram of another embodiment of a measurement application device according to the present disclosure.

FIG. 12 shows a block diagram of a measurement application device 1200 that is based on the measurement application device 100. Therefore, the measurement application device 1200 comprises a signal acquisition interface 1201 for acquiring the analog input signal 1299. The signal acquisition interface 1201 is coupled to a first decimator 1203 and a second decimator 1207. The second decimator 1207 is coupled to a decoder 1209. The explanations provided above, regarding the measurement application device 100 apply mutatis mutandis.

In addition, the measurement application device 1200 comprises a waveform signal generator 1230 that is coupled to the decoder 1209 to receive the decoded input signal 1210 and to generate a first decimated digital input signal 1204-2 based on the decoded input signal 1210.

The first decimated digital input signal 1204-2 may resemble a waveform of the specific values provided in the decoded input signal 1210, for example sensor-provided values that are provided in the decoded input signal 1210. To this end, the waveform signal generator 1230 may receive only the required data from the decoder 1209 or may extract the required data from the decoded input signal 1210. A respective protocol or data definition may be provided in the waveform signal generator 1230. The first decimated digital input signal 1204-2 may then be analyzed by a user individually or in parallel to first decimated digital input signal 1204-1.

In embodiments, a signal modification unit 1231 may be provided in the waveform signal generator 1230. The signal modification unit 1231 may apply a signal modification function to the first decimated digital input signal 1204-2. Such a signal modification function may refer to the signal being adapted to be more realistic instead of simply showing time and value discrete steps as provided by the decoded input signal 1210.

Figure 13:
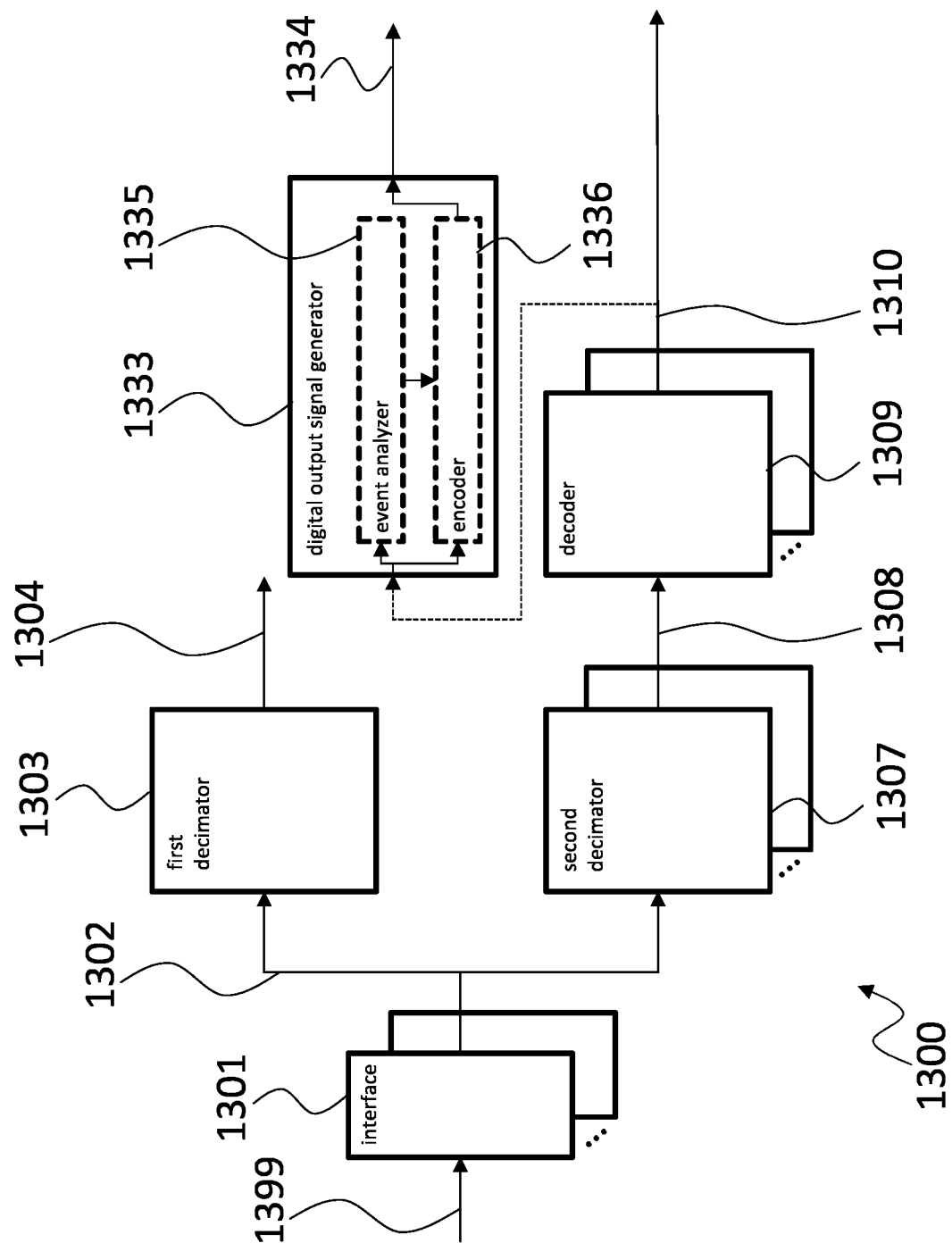
FIG. 13 shows a block diagram of a further embodiment of a measurement application device according to the present disclosure.

FIG. 13 shows a block diagram of a measurement application device 1300 that is based on the measurement application device 100. Therefore, the measurement application device 1300 comprises a signal acquisition interface 1301 for acquiring the analog input signal 1399. The signal acquisition interface 1301 is coupled to a first decimator 1303 and a second decimator 1307. The second decimator 1307 is coupled to a decoder 1309 that outputs the decoded input signal 1310. The explanations provided above, regarding the measurement application device 100 apply mutatis mutandis.

In addition, the measurement application device 1300 comprises a digital output signal generator 1333. The digital output signal generator 1333 may be coupled to the decoder 1309 to receive the decoded input signal 1310 or may operate as independent unit in the measurement application device 1300.

The digital output signal generator 1333 generates a digital output signal 1334 according to a predefined protocol. Such a digital output signal 1334 may be generated by the digital output signal generator 1333 without any further input e.g., from the decoder 1309. In such an embodiment, the digital output signal 1334 may serve as a test signal or baseline signal for a device or system under test.

In embodiments, the digital output signal 1334 may be generated by the digital output signal generator 1333 based on the decoded input signal 1310. The digital output signal generator 1333 may for example re-encode the digital output signal 1334 according to the predefined protocol.

In other embodiments, the digital output signal generator 1333 may comprise an encoder 1336 to encode the digital output signal 1334, wherein the encoder may be coupled to an event analyzer 1335. The event analyzer 1335 may analyze the decoded input signal 1310 for the occurrence of a single or multiple specific events and may then trigger the encoder 1336 to encode the digital output signal 1334 according to the predefined protocol.

For example, the event analyzer 1335 may be configured to identify a data packet that is addressed to a specific receiver, which in a test or development application may not be present. In such cases, the event analyzer 1335 may, after identifying the respective data packet, trigger the encoder 1336 to encode a response in the digital output signal 1334 that is expected by the sending device. The encoder 1336 may also be configured to encode erroneous data in the digital output signal 1334 to test the reaction of the sending device to the erroneous response.

Figure 14:
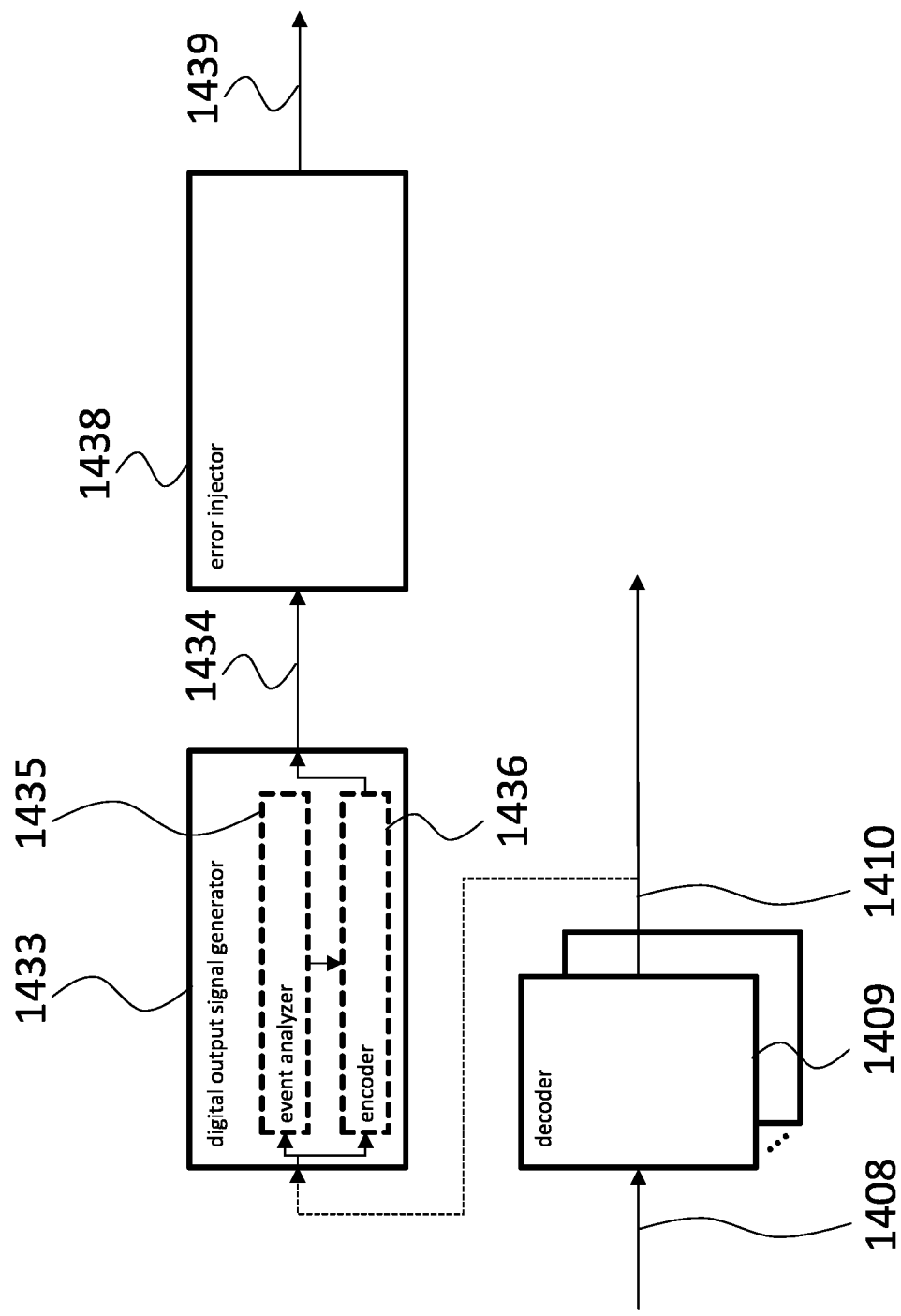
FIG. 14 shows a block diagram of a section of an embodiment of a measurement application device according to the present disclosure.

FIG. 14 shows a block diagram of a section of a measurement application device as it may be provided, for example, in the measurement application device 1300.

The section comprises the decoder 1409 that receives the second decimated digital input signal 1408 and outputs the respective decoded input signal 1410, and the digital output signal generator 1433 with the optional event analyzer 1435 and encoder 1436 that provides the digital output signal 1434.

In addition, an error injector 1438 is provided that receives the digital output signal 1434 and modifies the digital output signal 1434 to purposefully provide an erroneous digital output signal 1439.

The error injector 1438 may in embodiments also be provided in the encoder 1436.

Figure 15:
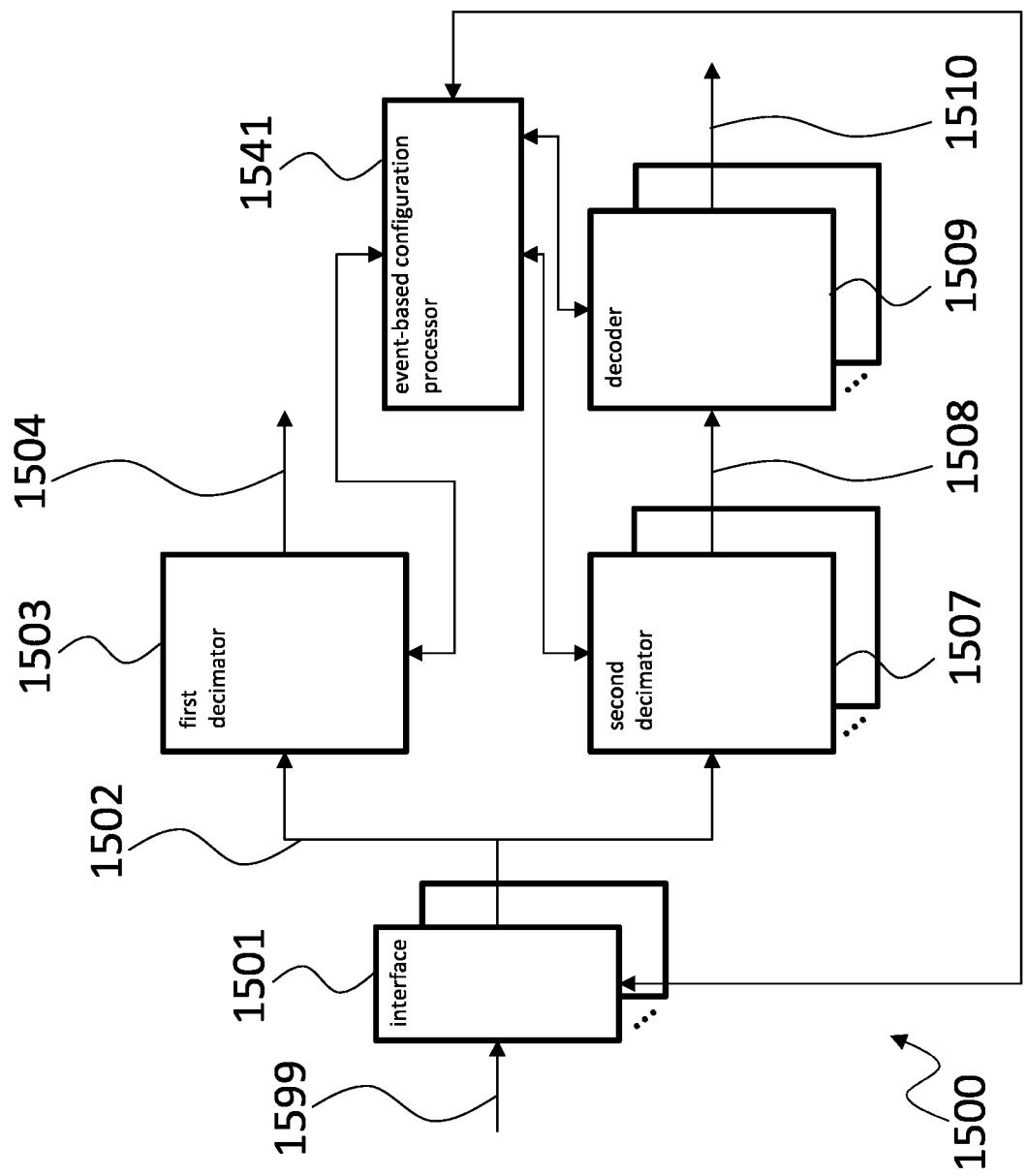
FIG. 15 shows a block diagram of an embodiment of a measurement application device according to the present disclosure.

FIG. 15 shows a block diagram of a measurement application device 1500 that is based on the measurement application device 100. Therefore, the measurement application device 1500 comprises a signal acquisition interface 1501 for acquiring the analog input signal 1599. The signal acquisition interface 1501 is coupled to a first decimator 1503 and a second decimator 1507. The second decimator 1507 is coupled to a decoder 1509 that outputs the decoded input signal 1510. The explanations provided above, regarding the measurement application device 100 apply mutatis mutandis.

In addition, the measurement application device 1500 comprises an event-based configuration processor 1541 that is communicatively coupled to the signal acquisition interface 1501, the first decimator 1503, the second decimator 1507, and the decoder 1509. The event-based configuration processor 1541 may configure any of these elements, units, and devices based on specific events that the event-based configuration processor 1541 may detect.

The event-based configuration processor 1541 may, for example, be configured to detect events in the decoded input signal 1510, or the first decimated digital input signal 1504, or the second decimated digital input signal 1508.

Regarding the detection of an event and the possible types of events, reference is made to the description provided throughout this disclosure, to prevent repetition.

The event-based configuration processor 1541 may in reaction to detecting such an event perform any adequate configuration of the respective elements, like setting protocols, protocol details, communication speeds, and the like.

Figure 16:
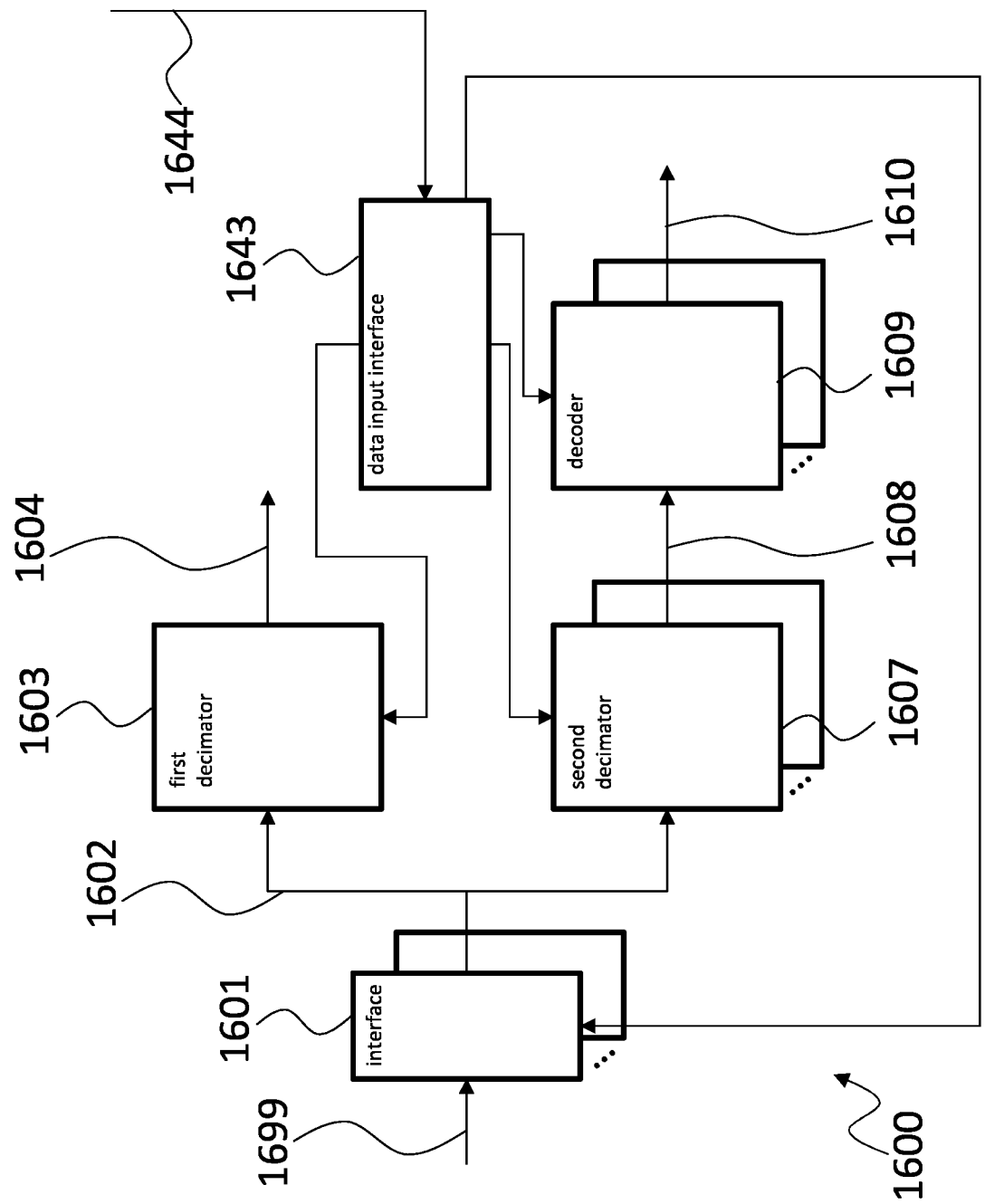
FIG. 16 shows a block diagram of another embodiment of a measurement application device according to the present disclosure.

FIG. 16 shows a block diagram of a measurement application device 1600 that is based on the measurement application device 100. Therefore, the measurement application device 1600 comprises a signal acquisition interface 1601 for acquiring the analog input signal 1699. The signal acquisition interface 1601 is coupled to a first decimator 1603 and a second decimator 1607. The second decimator 1607 is coupled to a decoder 1609 that outputs the decoded input signal 1610. The explanations provided above, regarding the measurement application device 100 apply mutatis mutandis.

In addition, the measurement application device 1600 comprises a data input interface 1643. The data input interface 1643 may be coupled to the signal acquisition interface 1601, the first decimator 1603, the second decimator 1607, and the decoder 1609. The data input interface 1643 mainly serves for configuring these elements, and may receive respective configuration data 1644 that specifies how these elements are to be configured.

It is understood, that the data input interface 1643 may in embodiments be comprised by or included in the event-based configuration processor 1541, or vice versa.

Figure 17:
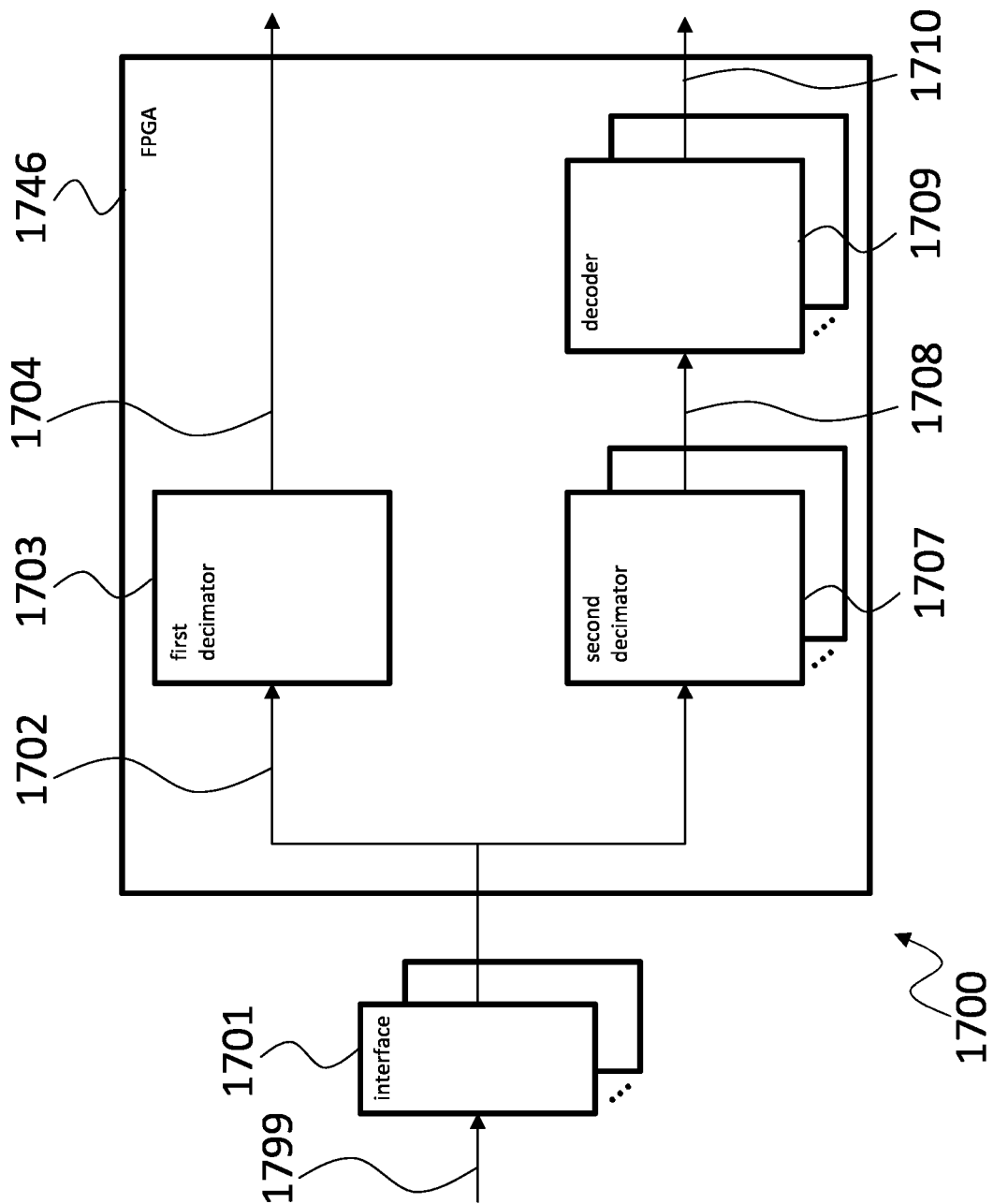
FIG. 17 shows a block diagram of a further embodiment of a measurement application device according to the present disclosure.

FIG. 17 shows a block diagram a measurement application device 1700 that is based on the measurement application device 100. Therefore, the measurement application device 1700 comprises a signal acquisition interface 1701 for acquiring the analog input signal 1799. The signal acquisition interface 1701 is coupled to a first decimator 1703 and a second decimator 1707. The second decimator 1707 is coupled to a decoder 1709 that outputs the decoded input signal 1710. The explanations provided regarding the measurement application device 100 apply mutatis mutandis.

In the measurement application device 1700, the first decimator 1703, the second decimator 1707, and the decoder 1709 are implemented in an FPGA 1746, while the signal acquisition interface 1701 is provided as separate entity. It is understood, that these partitioning of the measurement application device 1700 is just exemplarily shown.

It is especially indicated, that any of the elements or sub-elements of any of the embodiments of the measurement application device as disclosed herein may be implemented in a configurable logic device, like the shown FPGA 1746 if adequate.

Such reconfigurable logic device may, especially, allow reconfiguring specific sections, like the decoder 1709, during operation of the measurement application device 1700.

Figure 18:
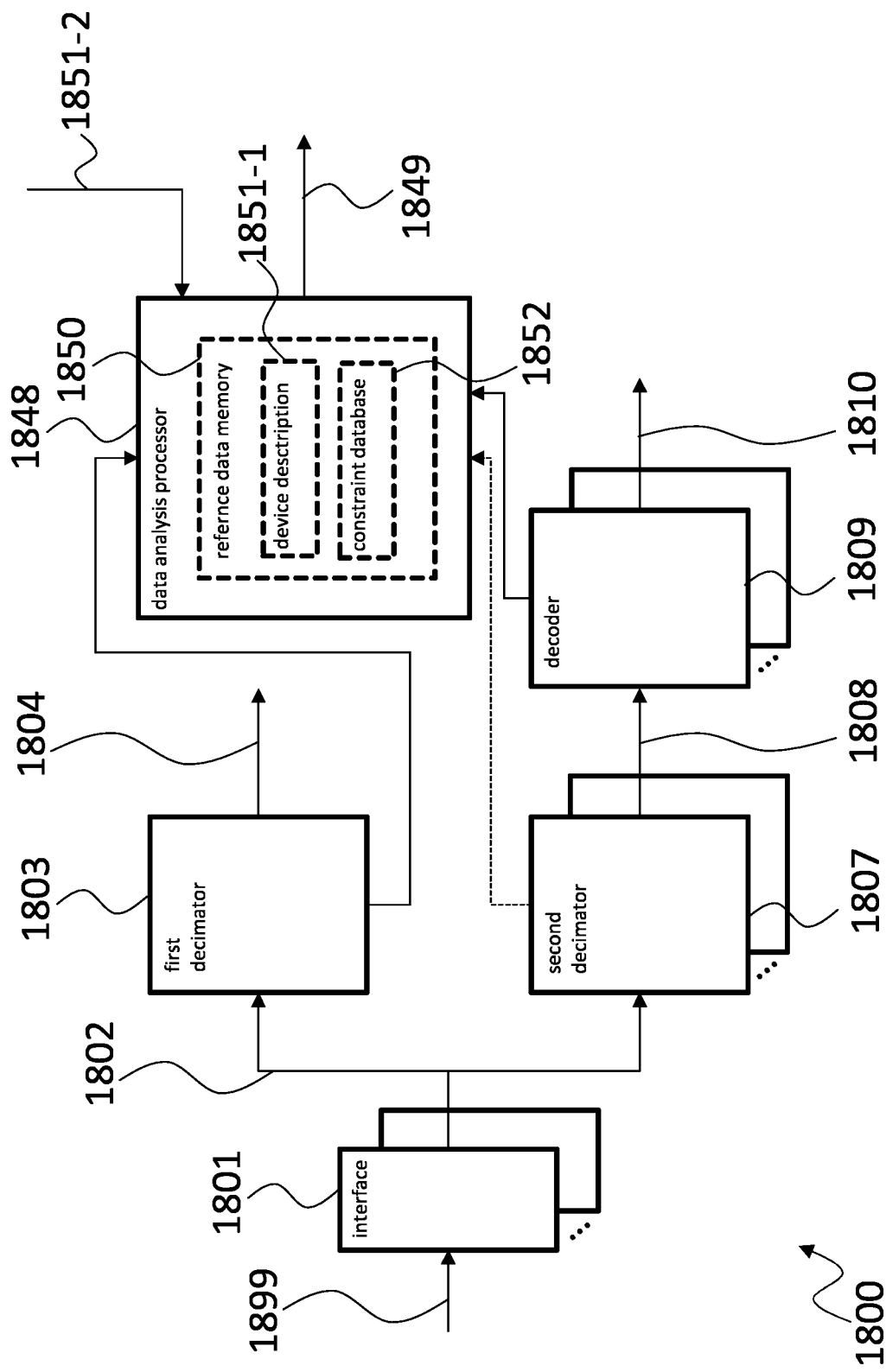
FIG. 18 shows a block diagram of another embodiment of a measurement application device according to the present disclosure.

FIG. 18 shows a block diagram of another embodiment of a measurement application device 1800 that is based on the measurement application device 100. Therefore, the measurement application device 1800 comprises a signal acquisition interface 1801 for acquiring the analog input signal 1899. The signal acquisition interface 1801 is coupled to a first decimator 1803 and a second decimator 1807. The second decimator 1807 is coupled to a decoder 1809 that outputs the decoded input signal 1810. The explanations provided above, regarding the measurement application device 100 apply mutatis mutandis.

In addition, the measurement application device 1800 comprises a data analysis processor 1848 that may provide a respective analysis result 1849. The data analysis processor 1848 may be coupled to different elements of the measurement application device 1800, for example, the first decimator 1803 for receiving the first decimated digital input signal 1804, the second decimator 1807 for receiving the second decimated digital input signal 1808, and the decoder 1809 for receiving the decoded input signal 1810.

The data analysis processor 1848 may comprise a reference data memory 1850. The reference data memory 1850 may store reference bus data that may serve the data analysis processor 1848 to perform the data analysis. For example, the data analysis processor 1848 may calculate a similarity characteristic between the stored reference bus data and the bus data provided in the decoded input signal, and output the similarity characteristic as analysis result 1849.

The data analysis processor 1848 may also output a warning as analysis result 1849 if the similarity characteristic is higher (or lower, depending on the implementation) than a predetermined threshold value.

In embodiments, the data analysis processor 1848 may filter the decoded input signal based on predefined filter criteria, and output the filtered decoded input signal as analysis result 1849. The data analysis processor 1848 may also analyze a bus health of a bus that provides the analog input signal 1899 by analyzing at least one of the first decimated digital input signal 1804, the second decimated digital input signal 1808, and the decoded input signal 1810, and output a bus health metric as analysis result 1849.

The data analysis processor 1848 may also analyze the content of the decoded input signal 1810, and determine functions performed in a receiving device of the content based on the received content, and output the determined functions as analysis result 1849. To this end, the data analysis processor 1848 may comprise a device description 1851-1 comprising information about specific content and the functions performed by the receiving device based on the received content. Such a device description 1851-2 may also be provided from a remote database to the data analysis processor 1848 e.g., via a data network.

The data analysis processor 1848 may also analyze bus member characteristics of at least one bus member that provides the analog input signal 1899 by analyzing at least one of the first decimated digital input signal 1804, the second decimated digital input signal 1808, and the decoded input signal 1810, and output a bus member characteristic data as analysis result 1849.

In embodiments, the data analysis processor 1848 may analyze a bus member state of at least one bus member that communicates over a bus that provides the analog input signal 1899 by analyzing the decoded input signal 1810, and output a bus member state information as analysis result 1849.

In further embodiments, the data analysis processor 1848 may analyze time-based relations between the first decimated digital input signal 1804 and the respective decoded input signal 1810. The data analysis processor 1848 may output information about the time-based relations as analysis result 1849. The data analysis processor 1848 may also comprises a constraint database 1852 that comprises constraints for the time-based relations. With such a constraint database 1852 the data analysis processor 1848 may output information about the time-based relations meeting the respective constraints or not as analysis result 1849.

Figure 19:
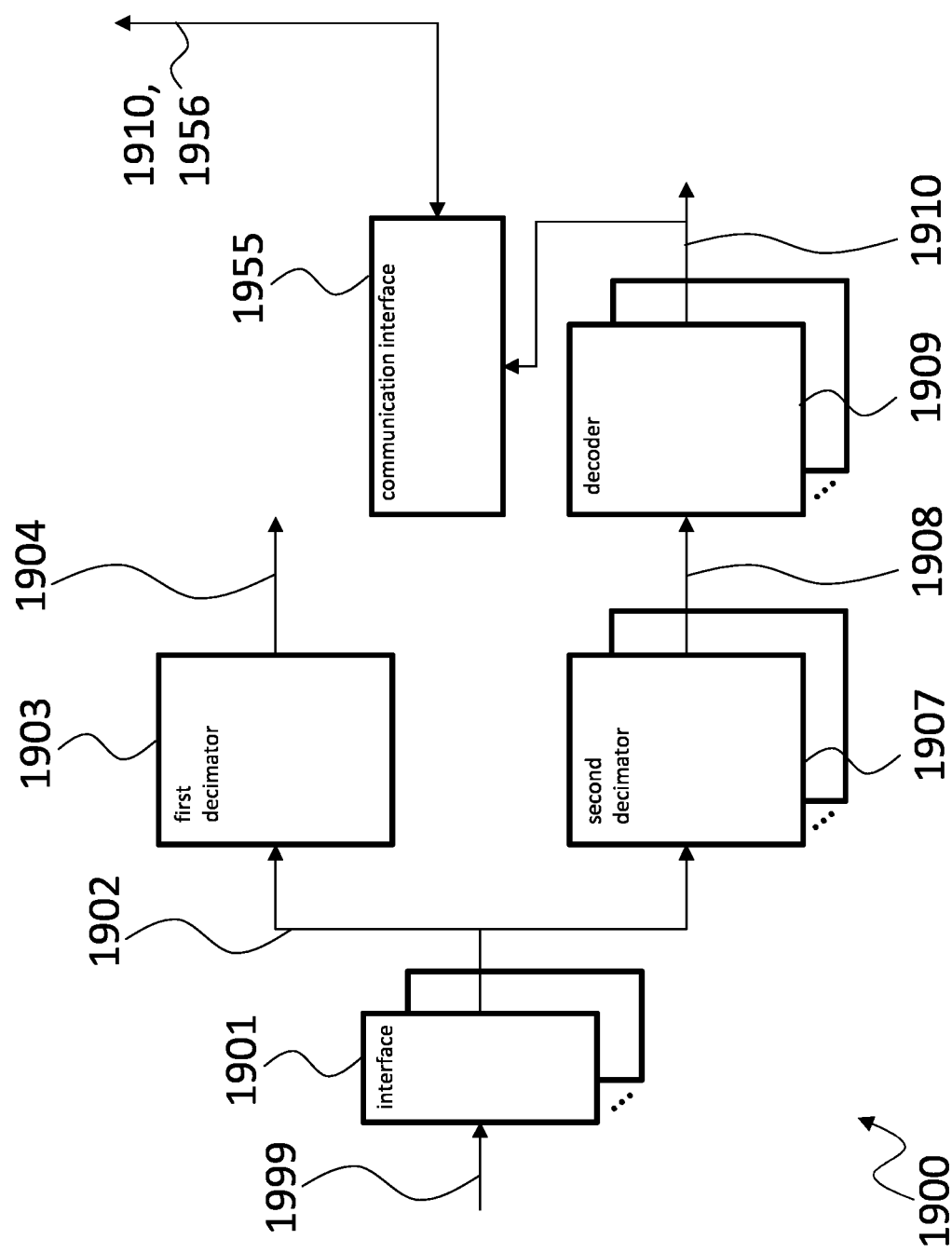
FIG. 19 shows a block diagram of a further embodiment of a measurement application device according to the present disclosure.

FIG. 19 shows a block diagram of a measurement application device 1900 that is based on the measurement application device 100. Therefore, the measurement application device 1900 comprises a signal acquisition interface 1901 for acquiring the analog input signal 1999. The signal acquisition interface 1901 is coupled to a first decimator 1903 and a second decimator 1907. The second decimator 1907 is coupled to a decoder 1909 that outputs the decoded input signal 1910. The explanations provided above, regarding the measurement application device 100 apply mutatis mutandis.

The measurement application device 1900 further comprises a communication interface 1955. The communication interface 1955 is coupled with the decoder 1909 for receiving the decoded input signal 1910 and outputting the decoded input signal 1910, for example, via a data network to a server, network storage, or cloud service. Instead of outputting the decoded input signal 1910, the communication interface 1955 may also serve to output information about events detected in the decoded input signal 1910, or the first decimated digital input signal 1904, or the second decimated digital input signal 1908. Such information that is output via the communication interface 1955 may be provided by any element in the measurement application device 1900.

The communication interface 1955 may also receive configuration commands 1956, especially in response to sending the decoded input signal 1910 to another entity via the communication interface 1955. The configuration commands 1956 may, for example, be provided from a server or cloud service that receives the decoded input signal 1910 to the measurement application device 1900.

It is understood, that the present disclosure explicitly is meant to disclose a server or cloud service that implements all functions regarding signal analysis or signal processing as described for any of the embodiments of the measurement application device, but for the signal acquisition. Such a server or cloud service may, especially, implement any of the embodiments of the method disclosed herein, but for the signal acquisition.

Figure 20:
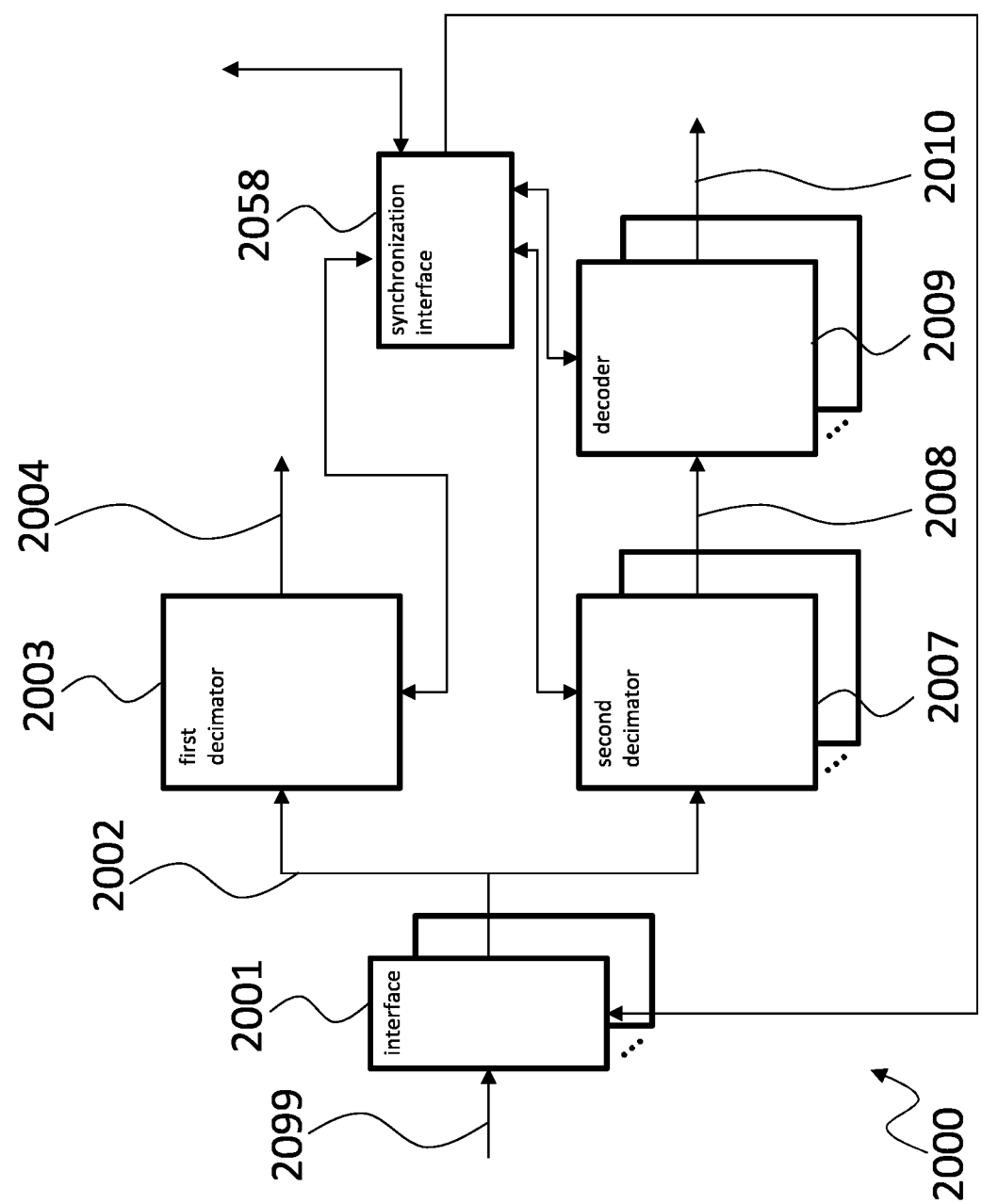
FIG. 20 shows a block diagram of another embodiment of a measurement application device according to the present disclosure.

FIG. 20 shows a block diagram of measurement application device 2000 that is based on the measurement application device 100. Therefore, the measurement application device 2000 comprises a signal acquisition interface 2001 for acquiring the analog input signal 2099. The signal acquisition interface 2001 is coupled to a first decimator 2003 and a second decimator 2007. The second decimator 2007 is coupled to a decoder 2009 that outputs the decoded input signal 2010. The explanations provided above, regarding the measurement application device 100 apply mutatis mutandis.

The measurement application device 2000 further comprises a synchronization interface 2058 that may be coupled to any of the signal acquisition interface 2001, the first decimator 2003, the second decimator 2007, and the decoder 2009.

The synchronization interface 2058 serves for synchronizing the measurement application device 2000 with other measurement application devices. The synchronization interface 2058 may, for example, use a discrete signal that implements a clock signal distribution via BNC-cable based connections. In other embodiments, the synchronization interface 2058 may implement network-based synchronization mechanism for Ethernet-based networks. The synchronization interface 2058 may in embodiments be provided as element of the synchronization processor 1027 or vice versa.

Figure 21:
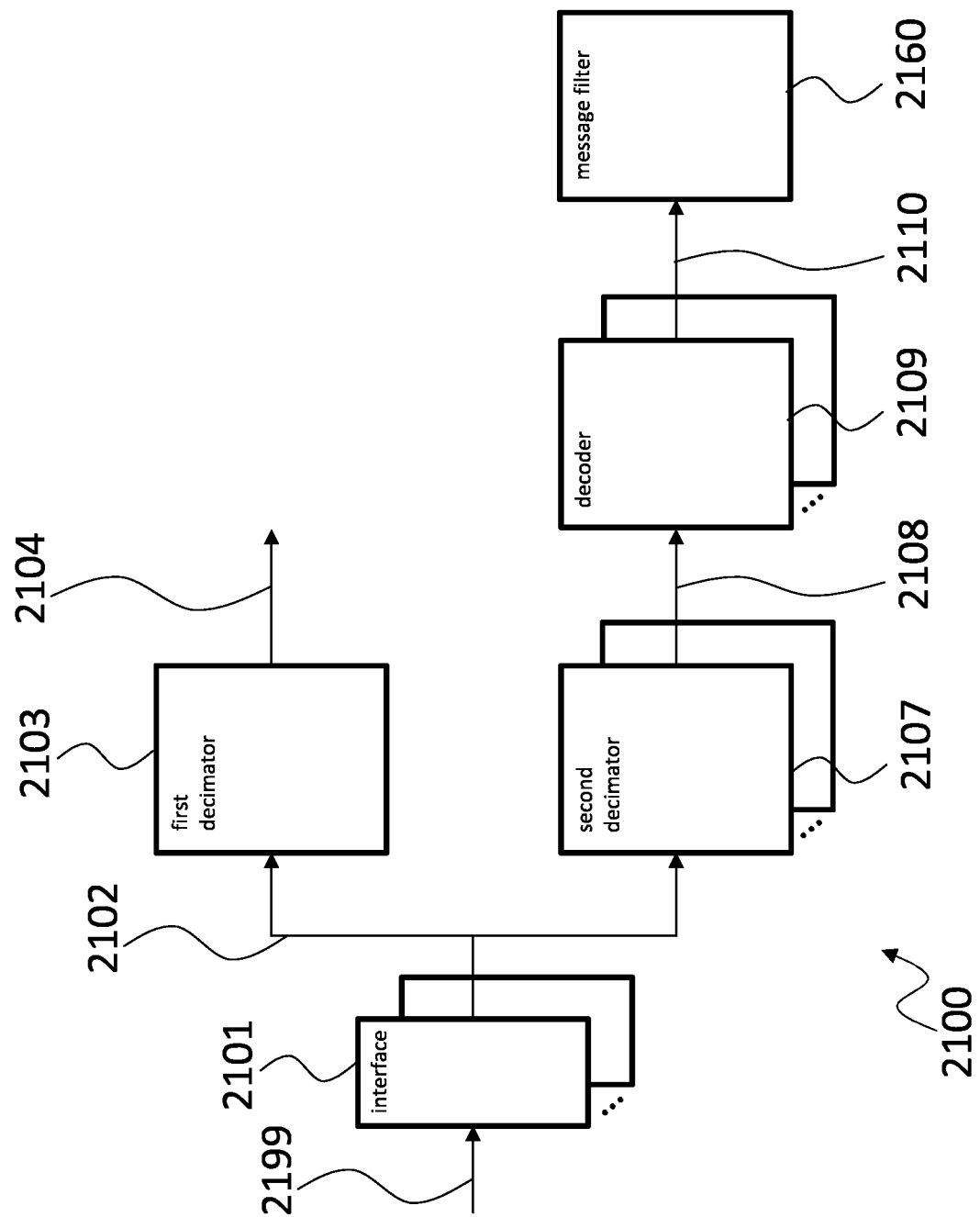
FIG. 21 shows a block diagram of a further embodiment of a measurement application device according to the present disclosure.

FIG. 21 shows a block diagram of a measurement application device 2100 that is based on the measurement application device 100. Therefore, the measurement application device 2100 comprises a signal acquisition interface 2101 for acquiring the analog input signal 2199. The signal acquisition interface 2101 is coupled to a first decimator 2103 and a second decimator 2107. The second decimator 2107 is coupled to a decoder 2109 that outputs the decoded input signal 2110. The explanations provided above, regarding the measurement application device 100 apply mutatis mutandis.

The measurement application device 2100 further comprises a message filter 2160 that is coupled to the decoder 2109 and receives the decoded input signal 2110. The message filter 2160 may filter unwanted data packets, messages or variables in messages out of the decoded input signal 2110 for efficient further processing in following signal processing stages.

Figure 22:
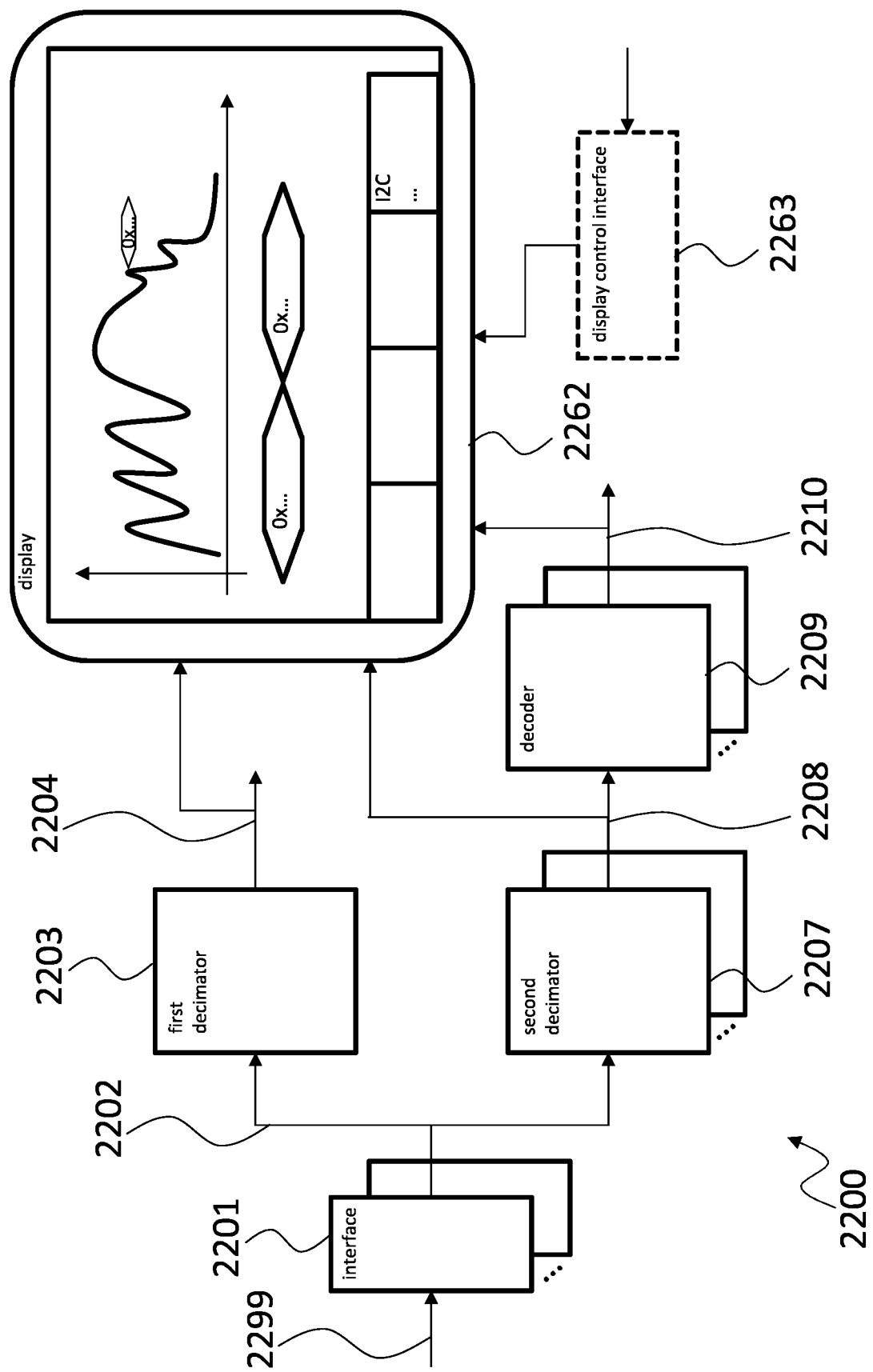
FIG. 22 shows a block diagram of another embodiment of a measurement application device according to the present disclosure.

FIG. 22 shows a block diagram of measurement application device 2200 that is based on the measurement application device 100. Therefore, the measurement application device 2200 comprises a signal acquisition interface 2201 for acquiring the analog input signal 2299. The signal acquisition interface 2201 is coupled to a first decimator 2203 that provides the first decimated digital input signal 2204, and to a second decimator 2207 that provides the second decimated digital input signal 2208. The second decimator 2207 is coupled to a decoder 2209 that outputs the decoded input signal 2210. The explanations provided above, regarding the measurement application device 100 apply mutatis mutandis.

The measurement application device 2200 further comprises a display unit 2262 for displaying information to a user. Such a display unit 2262 may, for example, be implemented as the display of an oscilloscope or a PC that receives the respective data from the measurement application device 2200.

The display unit 2262 may display a message sequence chart to the user based on the decoded input signal. Of course, the display unit 2262 may continuously update the display of the message sequence chart based on the decoded input signal e.g., by scrolling the message sequence chart accordingly.

The display unit 2262 may also display a communication protocol detected in the analog input signal and further information, like data content detected in the decoded input signal, a data rate of the decoded input signal, and to continuously update the display, as hinted at in the lower right of the display unit 2262.

The display unit 2262 may also display at least one of the first decimated digital input signal 2204 and the decoded input signal 2210, and information that is based on the decoded input signal 2210 in a timely synchronized fashion with the at least one of the first decimated digital input signal 2204 and the decoded input signal 2210. The information may, for example, be provided as marker at the waveform that represents the first decimated digital input signal 2204, as hinted at in the waveform in the display unit 2262.

The measurement application device 2200 may also comprise a display control interface 2263 that may receive a control commands indicating a time stamp. The control interface 2263 may control the display unit 2262 to display at least one of the first decimated digital input signal 2204, the second decimated digital input signal 2208, and the decoded input signal 2210 at the point in time as indicated by the time stamp.

Figure 23:
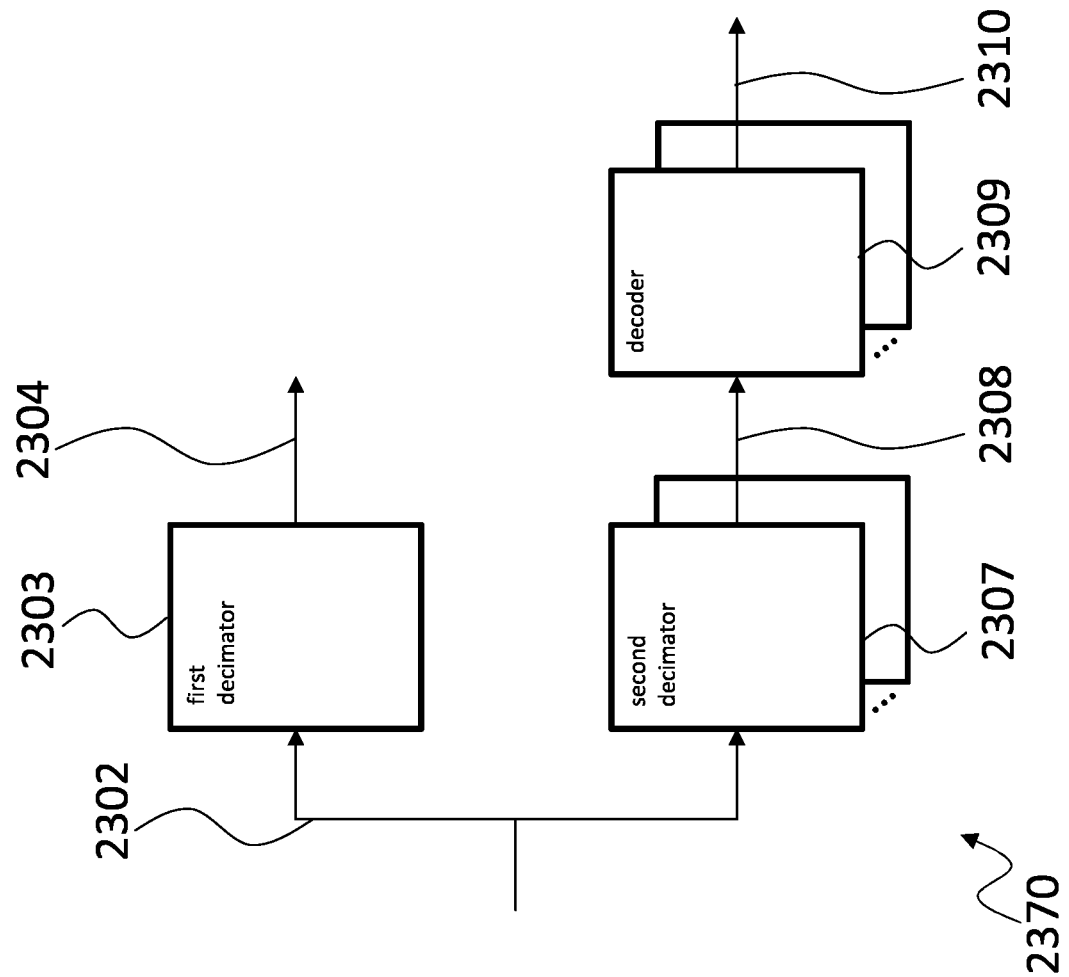
FIG. 23 shows a block diagram of an embodiment of a postprocessing device according to the present disclosure.

FIG. 23 shows a block diagram of a postprocessing device 2370. The postprocessing device 2370 is based on the measurement application device 100 but does not comprise any signal acquisition interfaces. Therefore, the postprocessing device 2370 comprises a first decimator 2303 that receives the digital input signal 2302 and provides the first decimated digital input signal 2304, and a second decimator 2307 that also received the digital input signal 2302 and provides the second decimated digital input signal 2308. The second decimator 2307 is coupled to a decoder 2309 that outputs the decoded input signal 2310. The explanations provided above, regarding the measurement application device 100 apply mutatis mutandis.

As already explained above, the postprocessing device 2370 may implement all functions of any of the embodiments of the measurement application device but for the signal acquisition. Instead, the postprocessing device 2370 may comprise a communication interface for receiving or loading the required data, i.e., the digital input signal 2302.

In other embodiments, the postprocessing device 2370 may also receive or load at least one of the first decimated digital input signal 2304, the second decimated digital input signal 2308, and the decoded input signal 2310.

Figure 24:
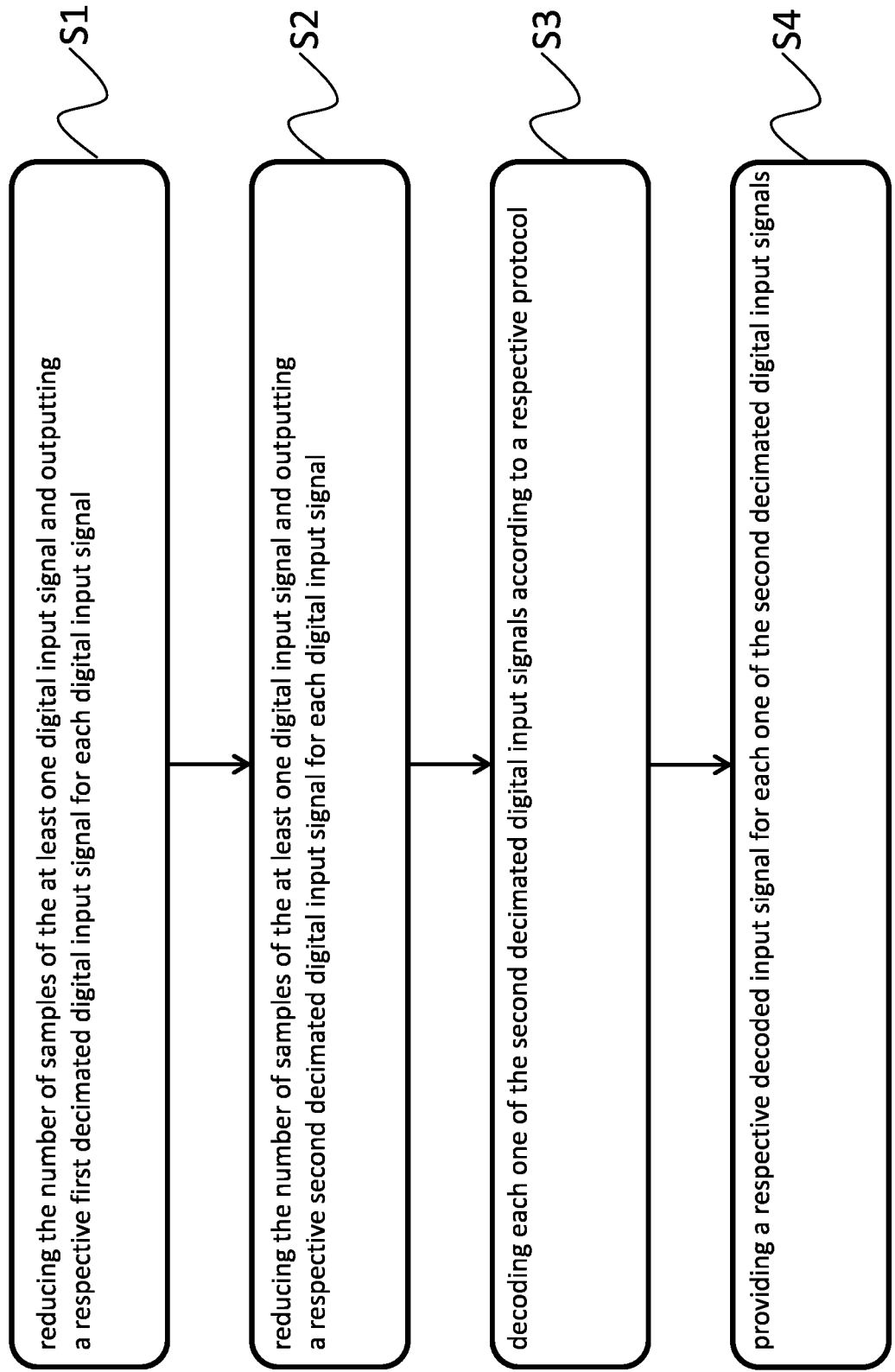
FIG. 24 shows a flow diagram of an embodiment of a method according to the present disclosure.

FIG. 24 shows a flow diagram of a method for processing at least one digital input signal acquired in a digital communication system.

The method comprises reducing S1 the number of samples of the at least one digital input signal and outputting a respective first decimated digital input signal for each digital input signal, reducing S2 the number of samples of the at least one digital input signal and outputting a respective second decimated digital input signal for each digital input signal, decoding S3 each one of the second decimated digital input signals according to a respective protocol, and providing S4 a respective decoded input signal for each one of the second decimated digital input signals.

In embodiments, unwanted data packets may be filtered from the decoded input signal prior to further processing the decoded input signal.

In an embodiment, the first decimated digital input signal may be generated with a first decimation factor, and the second decimated digital input signal may be generated with a second decimation factor. The second decimation factor may be higher than the first decimation factor. For example, two times higher, three times higher, five times higher, eight times higher, or ten times higher.

Of course, the first decimated digital input signal may be stored in a first data memory, especially a first data memory comprising an acquisition memory. The decoded input signal may be stored in a respective second data memory, which may also be implemented as a remote memory.

The second data memory may comprise a first memory section and a second memory section, wherein the decoded input signal may be alternatively stored in the first memory section and the second memory section, and may be read out from the memory section that is currently not written to during a read access to the second data memory. The method may also comprise generating a trigger signal for the second data memory based on the decoded input signal, wherein multiple trigger signals may be generated based on the same decoded input signal. In embodiments, a trigger controller may be provided to generate a combined trigger signal from multiple trigger signals. Combining may, for example, be performed with at least one of an OR function, an AND function, an IF function, a state machine, and a timer to the received input trigger signals to generate a combined trigger signal.

In embodiments, a trigger signal may also be generated based on the first decimated digital input signal for the first data memory for controlling data storage in the respective first data memory. A common trigger signal may be generated from the trigger signals being generated based on the decoded input signal and the first decimated digital input signal, especially based on logic functions, like at least one of an OR function, an AND function, an IF function, a state machine, and a timer to the received input trigger signals to generate a combined trigger signal.

If the method is applied to a system with multiple signal processing channels, at least the second decimated digital input signal from at least one of the signal processing channels may be provided to other signal processing channels, for example for decoding the second decimated digital input signal in the respective signal processing channel.

The method may also comprise timely synchronizing the decimation and the decoding or the signals resulting from the decimation or decoding e.g., by a clock signal or time-stamps.

In embodiments, the method may comprise generating a first decimated digital input signal based on at least part of one of the decoded input signals. Further, a modification function may be applied to the generated first decimated digital input signal.

The method may also comprise generating a digital output signal according to a predetermined protocol, especially based on the decoded input signal. The digital output signal may also be generated after analyzing the at least one decoded input signal for the occurrence of a specific event, if the specific event is detected. In embodiments, the method may also comprise encoding data according to a predetermined protocol and generating the digital output signal based on the encoded data. When generating the digital output signal, intentional signal deteriorations may be included in the digital output signal, wherein the signal deteriorations may comprise at least one of a physical signal deterioration or a logical signal deterioration.

The method may also comprise to analyze at least one of the decoded input signals or the first decimated digital input signal for the occurrence of a predefined event and configuring the decimation or decoding according to a predefined configuration setting, if the predefined event is detected in the respective decoded input signal or the first decimated digital input signal.

In embodiments, the method may also comprise analyzing at least one of the first decimated digital input signal and the decoded input signal, and output a respective analysis result. Analyzing may comprise storing reference bus data, and comparing the stored reference bus data with bus data provided in the decoded input signal. A similarity characteristic may be calculated between the stored reference bus data and the bus data provided in the decoded input signal, and the similarity characteristic may be provided as analysis result. Analyzing may also comprise warning if the similarity characteristic is higher or lower than a predetermined threshold value.

Another analysis function may include filtering the decoded input signal based on predefined filter criteria, and outputting the filtered decoded input signal as analysis result. A further analysis function comprises analyzing a bus health of a bus that provides the analog input signal by analyzing at least one of the first decimated digital input signal, and the decoded input signal. A bus health metric may be provided as analysis result.

In embodiments, the content of the decoded input signal may be analyzed to determine functions performed in a receiving device of the content based on the received content. Determined functions may be provided as analysis result. A device description comprising information about specific content and the functions performed by the receiving device based on the received content may be provided to this end.

The method may also comprise analyzing bus member characteristics of at least one bus member that provides the analog input signal by analyzing at least one of the first decimated digital input signal, and the decoded input signal, and outputting a bus member characteristic data as analysis result. Further, a bus member state of at least one bus member that communicates over a bus that provides the analog input signal may be analyzed by analyzing the decoded input signal, and a bus member state information may be provided as analysis result.

In embodiments, time-based relations may be analyzed between the first decimated digital input signal and the respective decoded input signal. Information about the time-based relations may be provided as analysis result. A constraint database that comprises constraints for the time-based relations may be provided, wherein information about the time-based relations meeting the respective constraints or not may be provided as analysis result.

The method may comprise displaying a message sequence chart based on the decoded input signal. The display of the message sequence chart may be continuously updated based on the decoded input signal.

Further, at least one of a communication protocol detected in the analog input signal, data content detected in the decoded input signal, and a data rate of the decoded input signal may be displayed and continuously updated.

Further, at least one of the first decimated digital input signal and the decoded input signal may be displayed, and information that is based on the decoded input signal may be displayed in a timely synchronized fashion with the at least one of the first decimated digital input signal and the decoded input signal.

Figure 25:
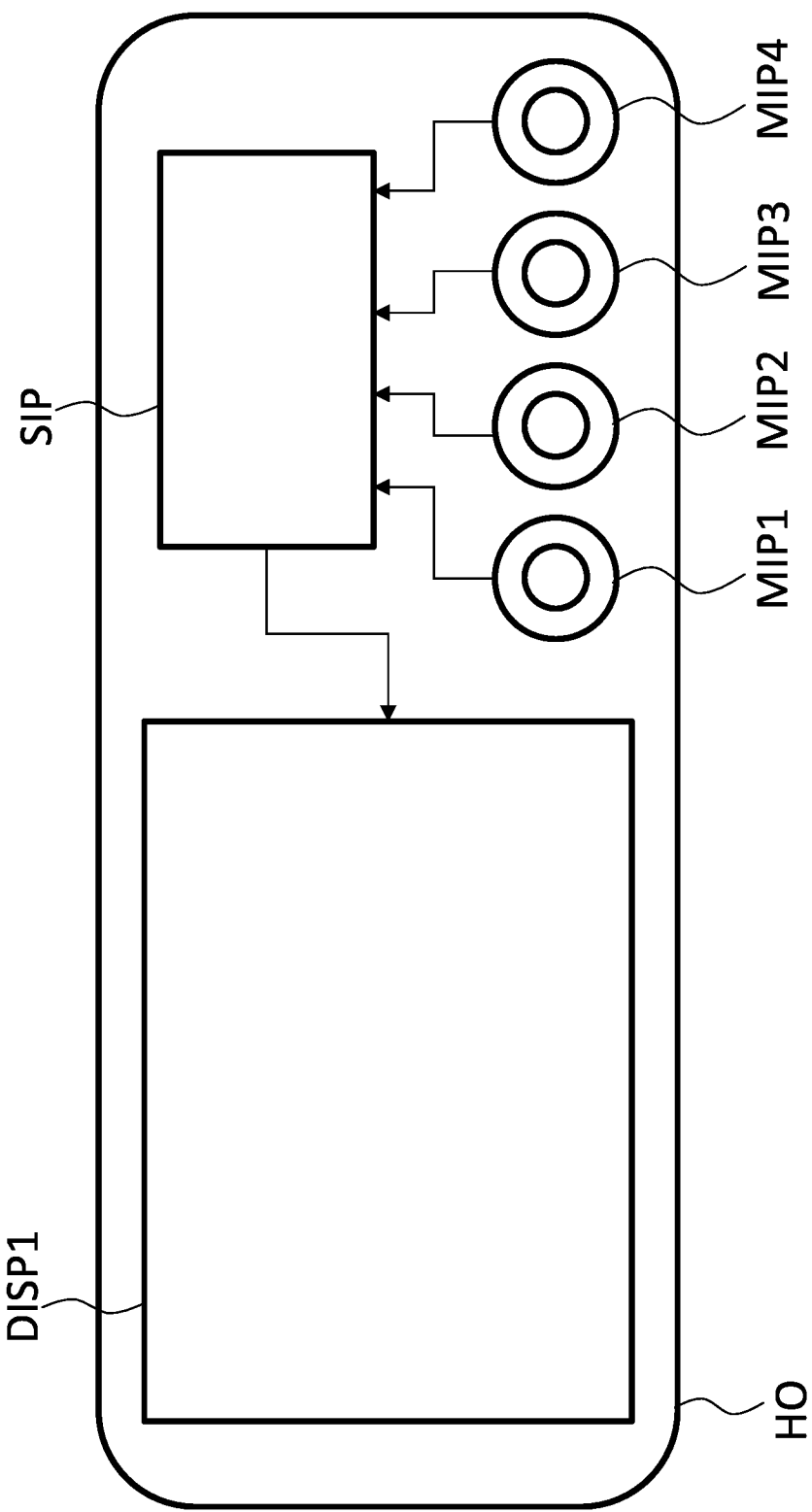
FIG. 25 shows a block diagram of an oscilloscope that may comprise an embodiment of a measurement application device according to the present disclosure.

FIG. 25 shows a block diagram of an oscilloscope OSC1 that may be used as an embodiment of a measurement application device according to the present disclosure.

The oscilloscope OSC1 comprises a housing HO that accommodates four measurement inputs MIP1, MIP2, MIP3, MIP4 that are coupled to a signal processor SIP for processing any measured signals. The signal processor SIP is coupled to a display DISP1 for displaying the measured signals to a user.

Although not explicitly shown, it is understood, that the oscilloscope OSC1 may also comprise signal outputs. Such signal outputs may for example serve to output calibration signals. Such calibration signals allow calibrating the measurement setup prior to performing any measurement. The process of calibrating and correcting any measurement signals based on the calibration may also be called de-embedding and may comprise applying respective algorithms on the measured signals.

It is understood, that a signal acquisition interface may be provided by each one of the measurement inputs MIP1, MIP2, MIP3, MIP4, and that any signal processing or signal analysis functions may be performed by the signal processor SIP. The display DISP1 may serve to display any information that the measurement application device may display to a user.

Figure 26:
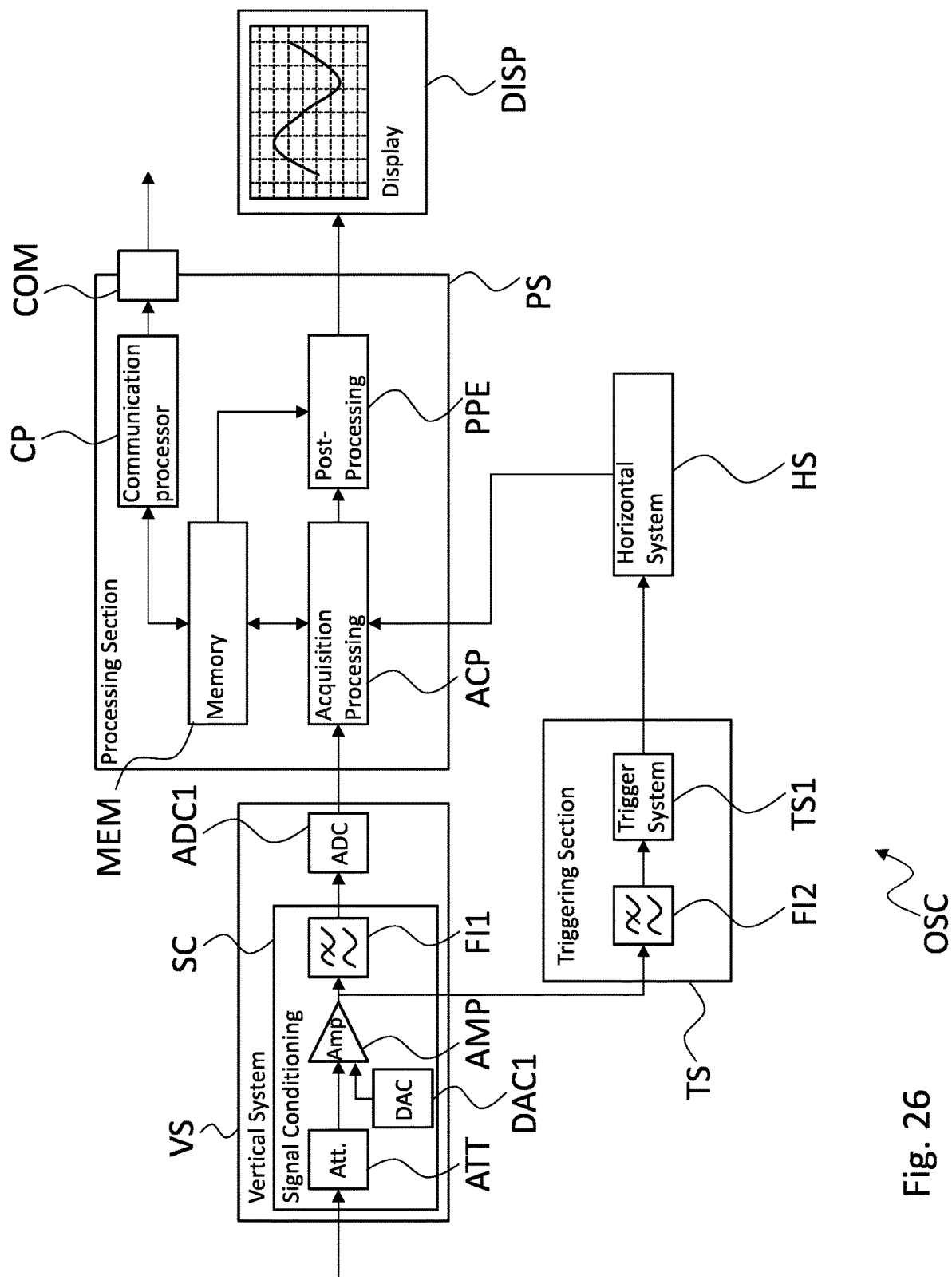
FIG. 26 shows a block diagram of another oscilloscope that may comprise an embodiment of a measurement application device according to the present disclosure.

FIG. 26 shows a block diagram of an oscilloscope OSC that may be an implementation of a measurement application device according to the present disclosure. The oscilloscope OSC is implemented as a digital oscilloscope. However, the present disclosure may also be implemented with any other type of oscilloscope.

The oscilloscope OSC exemplarily comprises five general sections, the vertical system VS, the triggering section TS, the horizontal system HS, the processing section PS and the display DISP. It is understood, that the partitioning into five general sections is a logical partitioning and does not limit the placement and implementation of any of the elements of the oscilloscope OSC in any way.

The vertical system VS mainly serves for offsetting, attenuating and amplifying a signal to be acquired. The signal may for example be modified to fit in the available space on the display DISP or to comprise a vertical size as configured by a user.

To this end, the vertical system VS comprises a signal conditioning section SC with an attenuator ATT and a digital-to-analog-converter DAC that are coupled to an amplifier AMP1. The amplifier AMP1 is coupled to a filter FI1, which in the shown example is provided as a low pass filter. The vertical system VS also comprises an analog-to-digital converter ADC1 that receives the output from the filter FI1 and converts the received analog signal into a digital signal.

The attenuator ATT and the amplifier AMP1 serve to scale the amplitude of the signal to be acquired to match the operation range of the analog-to-digital converter ADC1. The digital-to-analog-converter DAC1 serves to modify the DC component of the input signal to be acquired to match the operation range of the analog-to-digital converter ADC1. The filter FI1 serves to filter out unwanted high frequency components of the signal to be acquired.

The vertical system may implement at least part of the signal acquisition interface of the measurement application device and output the digital input signal with the analog-to-digital-converter ADC1.

The triggering section TS operates on the signal as provided by the amplifier AMP. The triggering section TS comprises a filter FI2, which in this embodiment is implemented as a low pass filter. The filter FI2 is coupled to a trigger system TS1.

The triggering section TS serves to capture predefined signal events and allows the horizontal system HS to e.g., display a stable view of a repeating waveform, or to simply display waveform sections that comprise the respective signal event. It is understood, that the predefined signal event may be configured by a user via a user input of the oscilloscope OSC.

Possible predefined signal events may for example include, but are not limited to, when the signal crosses a predefined trigger threshold in a predefined direction i.e., with a rising or falling slope. Such a trigger condition is also called an edge trigger. Another trigger condition is called "glitch triggering" and triggers, when a pulse occurs in the signal to be acquired that has a width that is greater than or less than a predefined amount of time.

In order to allow an exact matching of the trigger event and the waveform that is shown on the display DISP, a common time base may be provided for the analog-to-digital converter ADC1 and the trigger system TS1.

It is understood, that although not explicitly shown, the trigger system TS1 may comprise at least one of configurable voltage comparators for setting the trigger threshold voltage, fixed voltage sources for setting the required slope, respective logic gates like e.g., a XOR gate, and FlipFlops to generate the triggering signal.

The triggering section TS is exemplarily provided as an analog trigger section. It is understood, that the oscilloscope OSC may also be provided with a digital triggering section. Such a digital triggering section will not operate on the analog signal as provided by the amplifier AMP but will operate on the digital signal as provided by the analog-to-digital converter ADC1.

A digital triggering section may comprise a processing element, like a processor, a DSP, a CPLD, an ASIC or an FPGA to implement digital algorithms that detect a valid trigger event.

The trigger section TS may implement at least part of the second trigger signal generator for the first decimated digital input signal.

An additional trigger section may be provided for triggering on the decoded input signal.

The horizontal system HS is coupled to the output of the trigger system TS1 and mainly serves to position and scale the signal to be acquired horizontally on the display DISP.

The oscilloscope OSC further comprises a processing section PS that implements digital signal processing and data storage for the oscilloscope OSC. The processing section PS comprises an acquisition processing element ACP that is couple to the output of the analog-to-digital converter ADC1 and the output of the horizontal system HS as well as to a memory MEM and a post processing element PPE.

The acquisition processing element ACP manages the acquisition of digital data from the analog-to-digital converter ADC1 and the storage of the data in the memory MEM. The acquisition processing element ACP may for example comprise a processing element with a digital interface to the analog-to-digital converter ADC2 and a digital interface to the memory MEM. The processing element may for example comprise a microcontroller, a DSP, a CPLD, an ASIC or an FPGA with respective interfaces. In a microcontroller or DSP, the functionality of the acquisition processing element ACP may be implemented as computer readable instructions that are executed by a CPU. In a CPLD or FPGA the functionality of the acquisition processing element ACP may be configured in to the CPLD or FPGA opposed to software being executed by a processor.

The processing section PS further comprises a communication processor CP and a communication interface COM.

The communication processor CP may be a device that manages data transfer to and from the oscilloscope OSC. The communication interface COM for any adequate communication standard like for example, Ethernet, WIFI, Bluetooth, NFC, an infra-red communication standard, and a visible-light communication standard.

The communication processor CP is coupled to the memory MEM and may use the memory MEM to store and retrieve data.

Of course, the communication processor CP may also be coupled to any other element of the oscilloscope OSC to retrieve device data or to provide device data that is received from the management server.

The post processing element PPE may be controlled by the acquisition processing element ACP and may access the memory MEM to retrieve data that is to be displayed on the display DISP. The post processing element PPE may condition the data stored in the memory MEM such that the display DISP may show the data e.g., as waveform to a user. The post processing element PPE may also realize analysis functions like cursors, waveform measurements, histograms, or math functions.

Any of the calculations or signal analysis or processing functions described for any embodiment of the measurement application device may be implemented by the acquisition processing ACP or the post processing PPE. Additional processing elements may also be added to implement this functionality.

The display DISP controls all aspects of signal representation to a user, although not explicitly shown, may comprise any component that is required to receive data to be displayed and control a display device to display the data as required.

It is understood, that even if it is not shown, the oscilloscope OSC may also comprise a user interface for a user to interact with the oscilloscope OSC. Such a user interface may comprise dedicated input elements like for example knobs and switches. At least in part the user interface may also be provided as a touch sensitive display device.

It is understood, that all elements of the oscilloscope OSC that perform digital data processing may be provided as dedicated elements. As alternative, at least some of the above-described functions may be implemented in a single hardware element, like for example a microcontroller, DSP, CPLD or FPGA. Generally, the above-describe logical functions may be implemented in any adequate hardware element of the oscilloscope OSC and not necessarily need to be partitioned into the different sections explained above.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

LIST OF REFERENCE SIGNS 100, 200, 400, 800, 900, 1000, 1100 measurement application device
1200, 1300, 1500, 1600, 1700, 1800 measurement application device
1900, 2000, 2100, 2200 measurement application device
101, 201, 401, 801-1, 801-2 signal acquisition interface
901-1, 901-2, 1001, 1101, 1201 signal acquisition interface
1301, 1501, 1601, 1701, 1801, 1901 signal acquisition interface
2001, 2101, 2201 signal acquisition interface
102, 202, 402, 602, 702, 802-1, 802-2 digital input signal
902-1, 902-2, 1002, 1102, 1202 digital input signal
1302, 1502, 1602, 1702, 1802, 1902 digital input signal
2002, 2102, 2202, 2302 digital input signal
103, 203, 603, 703, 803-1, 803-2 first decimator
903-1, 903-2, 1003, 1103, 1203 first decimator
1303, 1503, 1603, 1703, 1803, 1903 first decimator 2003, 2103, 2203, 2303 first decimator
104, 204, 604, 704, 804-1, 804-2 first decimated digital input signal
904-1, 904-2, 1004, 1104, 1204-1, 1204-2 first decimated digital input signal
1304, 1504, 1604, 1704, 1804, 1904 first decimated digital input signal
2004, 2104, 2204, 2304 first decimated digital input signal
107, 207, 407, 807-1, 807-2 second decimator
907-1, 907-2, 1007, 1107, 1207 second decimator
1307, 1507, 1607, 1707, 1807, 1907 second decimator
2007, 2107, 2207, 2307 second decimator
108, 208, 408, 608, 708, 808-1, 808-2 second decimated digital input signal
908-1, 908-2, 1008, 1108, 1208 second decimated digital input signal
1308, 1408, 1508, 1608, 1708, 1808 second decimated digital input signal
1908, 2008, 2108, 2208, 2308 second decimated digital input signal
109, 209, 309, 409, 509, 609, 709 decoder
809-1, 809-2, 909-1, 909-2, 1009, 1109 decoder
1209, 1309, 1409, 1509, 1609, 1709 decoder
1809, 1909, 2009, 2109, 2209, 2309 decoder
110, 210, 310, 410, 510, 610, 710 decoded input signal
810-1, 810-2, 910-1, 910-2, 1010, 1110 decoded input signal
1210, 1310, 1410, 1510, 1610, 1710 decoded input signal
1810, 1910, 2010, 2110, 2210, 2310 decoded input signal
212, 612, 712, 1112 first data memory
213, 313, 413, 513, 613, 713, 1113 second data memory
315 first memory section
316 second memory section
418, 518-1, 518-2, 618, 718 first trigger signal generator
519 first trigger controller
621, 721 second trigger signal generator
722 second trigger controller
723 combined trigger signal
925 signal bridge
1027 synchronization controller
1128 third data memory
1230 waveform signal generator
1231 signal modification unit
1333, 1433 digital output signal generator
1334, 1434 digital output signal
1335, 1435 event analyzer
1336, 1436 encoder
1438 error injector
1439 erroneous digital output signal
1541 event-based configuration processor
1643 data input interface
1644 configuration data
1746 FPGA
1848 data analysis processor
1849 analysis result
1850 reference data memory
1851-1, 1851-2 device description
1852 constraint database
1955 communication interface
1956 configuration commands
2058 synchronization interface
2160 message filter
2262 display
2263 display control interface
2370 postprocessing device
99, 299, 499, 899-1, 899-2 analog input signal
999-1, 999-2, 1099, 1199, 1299, 1399 analog input signal
1599, 1699, 1799, 1899, 1999, 2099 analog input signal
2199, 2299 analog input signal
OSC1 oscilloscope
HO housing
MIP1, MIP2, MIP3, MIP4 measurement input
SIP signal processing
DISP1 display
OSC oscilloscope
VS vertical system
SC signal conditioning
ATT attenuator
DAC1 digital-to-analog converter
AMP1 amplifier
FI1 filter
ADC1 analog-to-digital converter
TS triggering section
AMP2 amplifier
FI2 filter
TS1 trigger system
HS horizontal system
PS processing section
ACP acquisition processing element
MEM memory
PPE post processing element
DISP display

What is claimed is:

1. A measurement application device comprising:
   at least one signal acquisition interface configured to acquire an analog input signal and output a digital input signal;
   a first decimator for each signal acquisition interface, each one of the first decimators being coupled to the respective one of the signal acquisition interfaces, each one of the first decimators being configured to reduce the number of samples of the respective digital input signal and output a first decimated digital input signal;
   at least one second decimator for each signal acquisition interface, each one of the second decimators being coupled to the respective one of the signal acquisition interfaces, each one of the second decimators being configured to reduce the number of samples of the respective digital input signal and output a second decimated digital input signal; and
   at least one decoder for each one of the second decimators, each one of the decoders being coupled to the respective one of the second decimators, and each one of the decoders being configured to decode the respective second decimated digital input signal according to a respective protocol and provide a respective decoded input signal.

2. The measurement application device according to claim 1, wherein each one of the first decimators operates on a first decimation factor, and wherein each one of the second decimators operates on a second decimation factor, wherein the second decimation factor is higher than the first decimation factor, especially two times higher, three times higher, five times higher, eight times higher, or ten times higher.

3. The measurement application device according to claim 1, further comprising for at least one of the first decimators a first data memory that is configured to store the respective first decimated digital input signal.

4. The measurement application device according to claim 3, wherein the first data memory comprises an acquisition memory of the measurement application device.

5. The measurement application device according to claim 3, further comprising:
   for each one of the decoders a second data memory that is configured to store the respective decoded input signal;
   a first trigger signal generator for at least one of the decoders that is coupled to the respective decoder for receiving the respective decoded input signal and to the second data memory for controlling data storage in the second data memory; and
   a second trigger signal generator for at least one of the first decimators that is coupled to the respective first decimator for receiving the respective first decimated digital input signal and to the respective first data memory for controlling data storage in the respective first data memory.

6. The measurement application device according to claim 5, further comprising a second trigger controller that is coupled to an output of at least one of the first trigger signal generators and an output of at least one of the second trigger signal generators, and that is configured to generate a combined trigger signal.

7. The measurement application device according to claim 6, wherein the second trigger controller comprises a second trigger logic circuitry that receives input trigger signals, and applies at least one of an OR function, an AND function, an IF function, a state machine, and a timer to the received input trigger signals to generate a combined trigger signal.

8. The measurement application device according to claim 3, further comprising a second data memory that is configured to store the respective decoded input signal for at least one of the decoders; and
   further comprising a third data memory that is coupled to one of the first data memories and one of the second data memories that store data that is based on the same digital input signal.

9. The measurement application device according to claim 1, further comprising for at least one of the decoders a second data memory that is configured to store the respective decoded input signal.

10. The measurement application device according to claim 9, wherein the second data memory comprises a remote memory that is coupled to the respective decoders via a data network.

11. The measurement application device according to claim 9, wherein the second data memory comprises a first memory section and a second memory section, wherein the second data memory is configured to alternatively store the respective decoded input signal in the first memory section and the second memory section, and output the respective decoded input signal from the memory section that is currently not written to during a read access to the second data memory.

12. The measurement application device according to claim 9, further comprising a first trigger signal generator for at least one of the decoders, wherein the first trigger signal generator is coupled to the respective decoder for receiving the respective decoded input signal, and to the second data memory for controlling data storage in the second data memory.

13. The measurement application device according to claim 12, comprising one of:
   at least two first trigger signal generators coupled to the same one of the decoders; or
   at least two decoders coupled to the same one of the second decimators, and a first trigger signal generator for each one of the at least two decoders.

14. The measurement application device according to claim 13, further comprising a first trigger controller that is coupled to an output of each one of the first trigger signal generators that are coupled to the same one of the decoders or to the at least two decoders that are coupled to the same one of the second decimators, and that is configured to generate a combined channel trigger signal.

15. The measurement application device according to claim 14, wherein the first trigger controller comprises a first trigger logic circuitry that receives input trigger signals, and applies at least one of an OR function, an AND function, an IF function, a state machine, and a timer to the received input trigger signals to generate a combined trigger signal.

16. The measurement application device according to claim 1, comprising:
   at least two signal acquisition interfaces;
   at least one second decimator for each one of the at least two signal acquisition interfaces; and
   at least one decoder for each one of the second decimators.

17. The measurement application device according to claim 16, further comprising one first decimator for each one of the at least two signal acquisition interfaces.

18. The measurement application device according to claim 16, further comprising a signal bridge that provides the second decimated digital input signal from at least one of the second decimators or the decoded input signal from the respective at least one decoder to at least one other of the decoders.

19. The measurement application device according to claim 1, further comprising a synchronization controller configured to timely synchronize at least one of the digital input signals, the first decimated digital input signals, the second decimated digital input signals, and the decoded input signals.

20. The measurement application device according to claim 1, further comprising a waveform signal generator that is configured to generate one of the first decimated digital input signals based on at least part of one of the decoded input signals.

21. The measurement application device according to claim 20, wherein the waveform signal generator comprises a signal modification unit configured to apply a modification function to the generated first decimated digital input signal prior to outputting the generated first decimated digital input signal.

22. The measurement application device according to claim 1, further comprising a digital output signal generator that is configured to generate a digital output signal according to a predetermined protocol.

23. The measurement application device according to claim 22, wherein the digital output signal generator is configured to generate the digital output signal based on at least one of the decoded input signals.

24. The measurement application device according to claim 23, wherein the digital output signal generator comprises an event analyzer configured to analyze the at least one decoded input signal for the occurrence of a specific event, and activate the signal generation by the digital output signal generator if the specific event is detected or deactivate the signal generation by the digital output signal generator if the specific event is detected.

25. The measurement application device according to claim 22, wherein the digital output signal generator comprises an encoder for encoding data according to the predetermined protocol and a waveform generator configured to generate the digital output signal based on the encoded data.

26. The measurement application device according to claim 25, further comprising an error injector that is configured to introduce intentional signal deterioration in the digital output signal, wherein the signal deterioration comprises at least one of a physical signal deterioration or a logical signal deterioration.

27. The measurement application device according to claim 1, further comprising an event-based configuration processor that is configured to analyze at least one of the decoded input signals or the first decimated digital input signal for the occurrence of a predefined event and configure the measurement application device according to a predefined configuration setting if the predefined event is detected in the respective decoded input signal.

28. The measurement application device according to claim 1, further comprising a data input interface configured to receive configuration data for the measurement application device and configured to configure the measurement application device according to the configuration data.

29. The measurement application device according to claim 28, wherein the data input interface is configured to receive a protocol definition and to configure at least one of the at least one second decimator and the at least one decoder according to the received bus definition.

30. The measurement application device according to claim 1, further comprising a reconfigurable logic element that is configured to implement in a reconfigurable manner at least one of:
the at least one signal acquisition interface;
the first decimator;
the at least one second decimator; and
the at least one decoder.

31. The measurement application device according to claim 1, further comprising a data analysis processor configured to analyze at least one of the first decimated digital input signal and the decoded input signal, and output a respective analysis result.

32. The measurement application device according to claim 31, further comprising a reference data memory configured to store reference bus data, wherein the data analysis processor is configured to compare the stored reference bus data with bus data provided in the decoded input signal, and output a respective analysis result.

33. The measurement application device according to claim 32, wherein the data analysis processor is configured to calculate a similarity characteristic between the stored reference bus data and the bus data provided in the decoded input signal, and output the similarity characteristic as analysis result.

34. The measurement application device according to claim 33, wherein the data analysis processor is configured to output a warning if the similarity characteristic is higher than a predetermined threshold value; or to output a warning if the similarity characteristic is lower than a predetermined threshold value.

35. The measurement application device according to claim 31, wherein the data analysis processor is configured to filter the decoded input signal based on predefined filter criteria, and output the filtered decoded input signal as analysis result.

36. The measurement application device according to claim 31, wherein the data analysis processor is configured to analyze a bus health of a bus that provides the analog input signal by analyzing at least one of the first decimated digital input signal, and the decoded input signal, and output a bus health metric as analysis result.

37. The measurement application device according to claim 31, wherein the data analysis processor is configured to analyze the content of the decoded input signal, and determine functions performed in a receiving device of the content based on the received content, and output the determined functions as analysis result.

38. The measurement application device according to claim 37, wherein the data analysis processor comprises a device description comprising information about specific content and the functions performed by the receiving device based on the received content.

39. The measurement application device according to claim 38, wherein the data analysis processor is coupled to a device description database and is configured to retrieve a respective device description via the device database.

40. The measurement application device according to claim 31, wherein the data analysis processor is configured to analyze bus member characteristics of at least one bus member that provides the analog input signal by analyzing at least one of the first decimated digital input signal, and the decoded input signal, and output a bus member characteristic data as analysis result.

41. The measurement application device according to claim 31, wherein the data analysis processor is configured to analyze a bus member state of at least one bus member that communicates over a bus that provides the analog input signal by analyzing the decoded input signal, and output a bus member state information as analysis result.

42. The measurement application device according to claim 31, wherein the data analysis processor is configured to analyze time-based relations between the first decimated digital input signal and the respective decoded input signal, and output information about the time-based relations as analysis result.

43. The measurement application device according to claim 42, wherein the data analysis processor comprises a constraint database that comprises constraints for the time-based relations, wherein the data analysis processor is configured to output information about the time-based relations meeting the respective constraints or not as analysis result.

44. The measurement application device according to claim 1, further comprising a communication interface that is at least one of:
coupled at least to the at least one decoder and configured to output the respective decoded input signal; and
configured to output information about predefined events that are present in the decoded input signal.

45. The measurement application device according to claim 44, wherein the communication interface is further configured to receive configuration commands in response to the data that is output.

46. The measurement application device according to claim 1, further comprising a synchronization interface configured to synchronize the measurement application device with at least one further measurement application device.

47. The measurement application device according to claim 1, further comprising a message filter configured to filter out unwanted data packets from the decoded input signal.

48. The measurement application device according to claim 1, further comprising a display unit configured to display a message sequence chart based on the decoded input signal.

49. The measurement application device according to claim 48, wherein the display unit is further configured to continuously update the display of the message sequence chart based on the decoded input signal.

50. The measurement application device according to claim 1, further comprising a display unit configured to display at least one of a communication protocol detected in the analog input signal, data content detected in the decoded input signal, a data rate of the decoded input signal, and to continuously update the display.

51. The measurement application device according to claim 1, further comprising a display unit configured to display at least one of the first decimated digital input signal and the decoded input signal, and to display information that is based on the decoded input signal in a timely synchronized fashion with the at least one of the first decimated digital input signal and the decoded input signal.

52. The measurement application device according to claim 1, further comprising a display control interface configured to receive a control command indicating a time stamp and to control a display unit of the measurement application device to display at least one of the first decimated digital input signal, the second decimated digital input signal, and the decoded input signal at the point in time as indicated by the time stamp.

53. A postprocessing device for processing at least one digital input signal acquired in a digital communication system, the postprocessing device comprising:
  a first decimator for each digital input signal, each one of the first decimators being configured to reduce the number of samples of the respective digital input signal and output a first decimated digital input signal;
  at least one second decimator for each digital input signal, each one of the second decimators being configured to reduce the number of samples of the respective digital input signal and output a second decimated digital input signal; and
  at least one decoder for each one of the second decimators, each one of the decoders being coupled to the respective one of the second decimators, and each one of the decoders being configured to decode the respective second decimated digital input signal according to a respective protocol and provide a respective decoded input signal.

54. A method for processing at least one digital input signal acquired in a digital communication system, the method comprising:
  reducing the number of samples of the at least one digital input signal and outputting a respective first decimated digital input signal for each digital input signal;
  reducing the number of samples of the at least one digital input signal and outputting a respective second decimated digital input signal for each digital input signal;
  decoding each one of the second decimated digital input signals according to a respective protocol; and
  providing a respective decoded input signal for each one of the second decimated digital input signals.

55. A non-transitory computer-readable medium comprising instructions that when executed by a processor cause the processor to:
  reduce the number of samples of the at least one digital input signal and output a respective first decimated digital input signal for each digital input signal;
  reduce the number of samples of the at least one digital input signal and output a respective second decimated digital input signal for each digital input signal;
  decode each one of the second decimated digital input signals according to a respective protocol; and
  provide a respective decoded input signal for each one of the second decimated digital input signals.

* * * * *